(12) United States Patent
Egan

(10) Patent No.: US 7,754,955 B2
(45) Date of Patent: Jul. 13, 2010

(54) VIRTUAL REALITY COMPOSER PLATFORM SYSTEM

(76) Inventor: Mark Patrick Egan, c/o S Pal Asija, 7 Woonsocket Ave., Shelton, CT (US) 06484

( * ) Notice: Subject to any disclaimer, the term of this patent is extended or adjusted under 35 U.S.C. 154(b) by 414 days.

(21) Appl. No.: 11/934,259

(22) Filed: Nov. 2, 2007

(65) Prior Publication Data

US 2009/0114079 A1    May 7, 2009

(51) Int. Cl.
  *G10H 1/00* (2006.01)
  *G10H 7/00* (2006.01)

(52) U.S. Cl. ............... 84/600; 84/483.2; 84/471 R; 84/464 R; 84/645

(58) Field of Classification Search ............ 84/600, 84/464 R, 645, 745, 723, 483.2, 470 R, 471 R
See application file for complete search history.

(56) References Cited

U.S. PATENT DOCUMENTS

| | | | | |
|---|---|---|---|---|
| 5,990,405 | A * | 11/1999 | Auten et al. | 84/609 |
| 6,388,183 | B1 * | 5/2002 | Leh | 84/645 |
| 7,241,945 | B1 * | 7/2007 | Egan | 84/483.2 |
| 7,378,585 | B2 * | 5/2008 | McGregor | 84/600 |
| 7,423,213 | B2 * | 9/2008 | Sitrick | 84/477 R |
| 7,563,975 | B2 * | 7/2009 | Leahy et al. | 84/619 |
| 2002/0144587 | A1 * | 10/2002 | Naples et al. | 84/609 |
| 2004/0007118 | A1 * | 1/2004 | Holcombe | 84/483.2 |
| 2004/0240686 | A1 * | 12/2004 | Gibson | 381/119 |
| 2005/0016359 | A1 * | 1/2005 | Berens | 84/470 R |
| 2007/0044638 | A1 * | 3/2007 | Egan | 84/483.2 |

* cited by examiner

*Primary Examiner*—Jeffrey Donels
(74) *Attorney, Agent, or Firm*—Our Pal LLC; Pal Asija; Robert Johnson

(57) ABSTRACT

A virtual reality composer platform and system (VRCPS) includes a plurality of user input/output devices and signal input/output controllers interfaced to a central processing unit complete with plurality of memory means, a butterfly morpheus musical instrument with plurality of manual input means each with a first unique visible indicia interfaced to said central processing unit, a plurality of finger adapters each with a second unique visible indicia donned on respective fingers and at least one custom butterfly morpheus music notation computer interface. The system is particularly suited for composing music for self-learning and teaching for all types of musical instruments for optimal virtual reality multimedia experience. The VRCPS platform and concepts disclosed are vari-dimensional acoustic environments, which are equally suited to all types of electronic learning and composing systems, game systems and computers. It is suitable for all levels of Do-It-Yourself learning from learning Beginners to Virtuoso Levels.

33 Claims, 28 Drawing Sheets

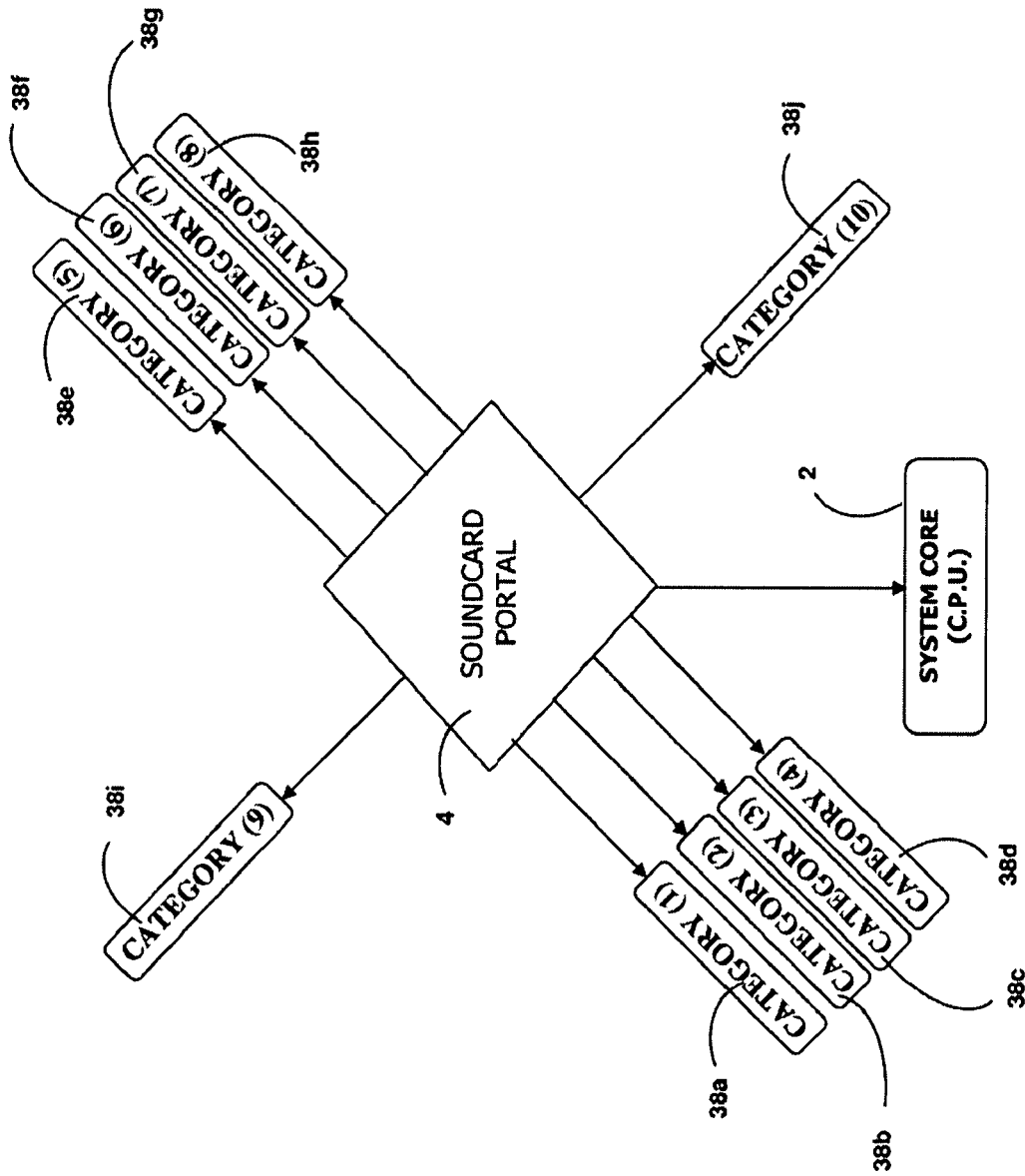

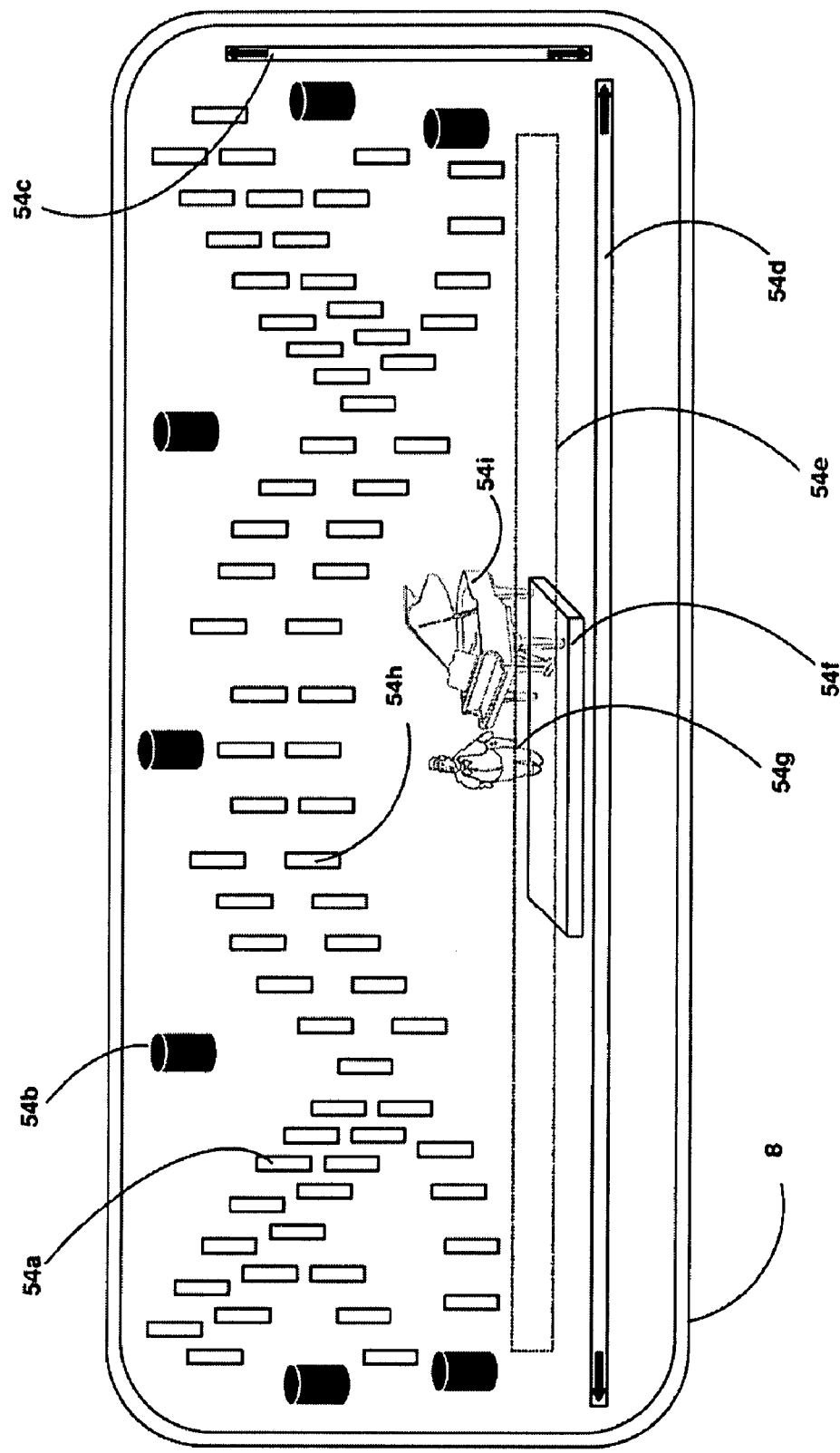

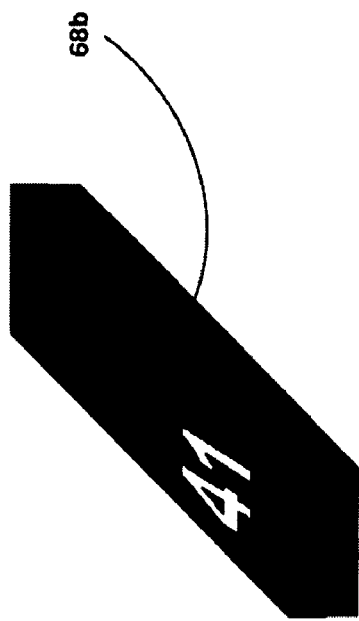
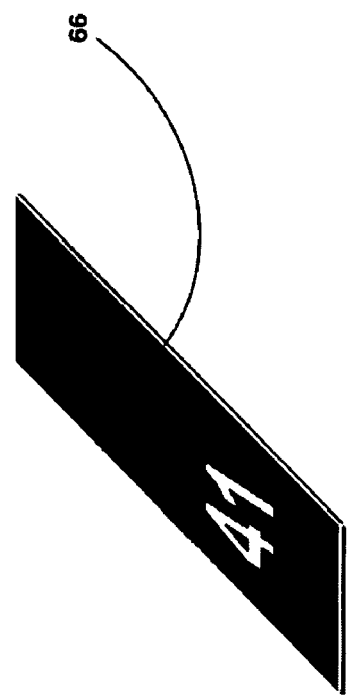

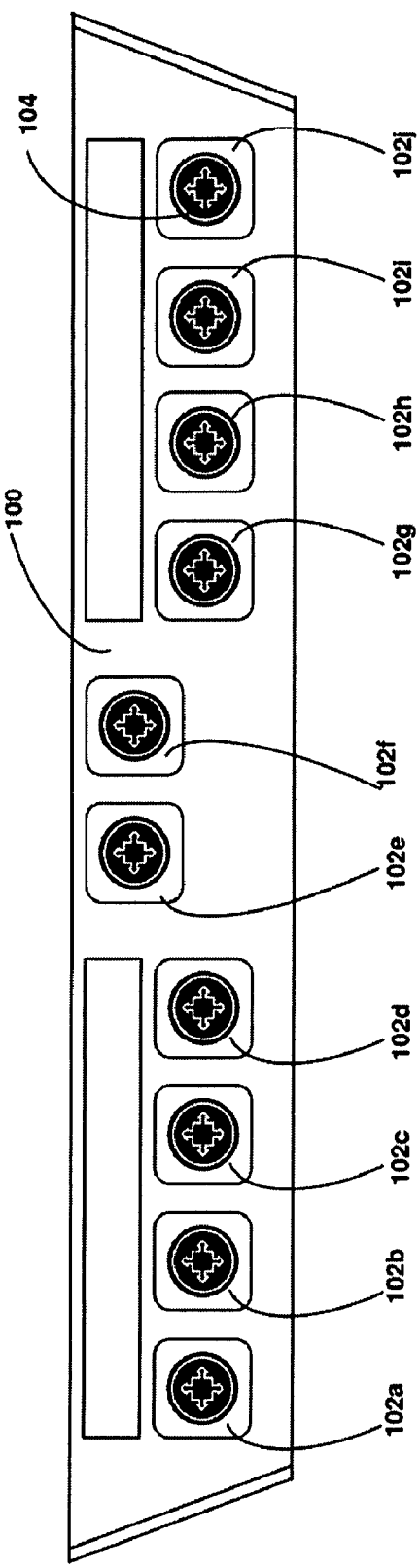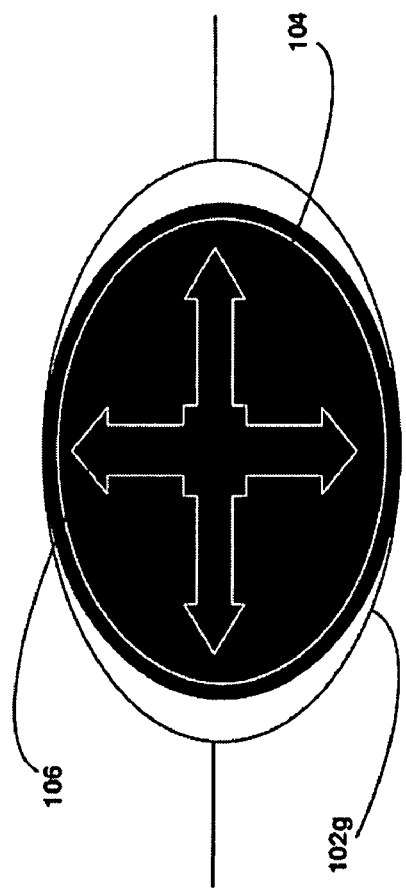

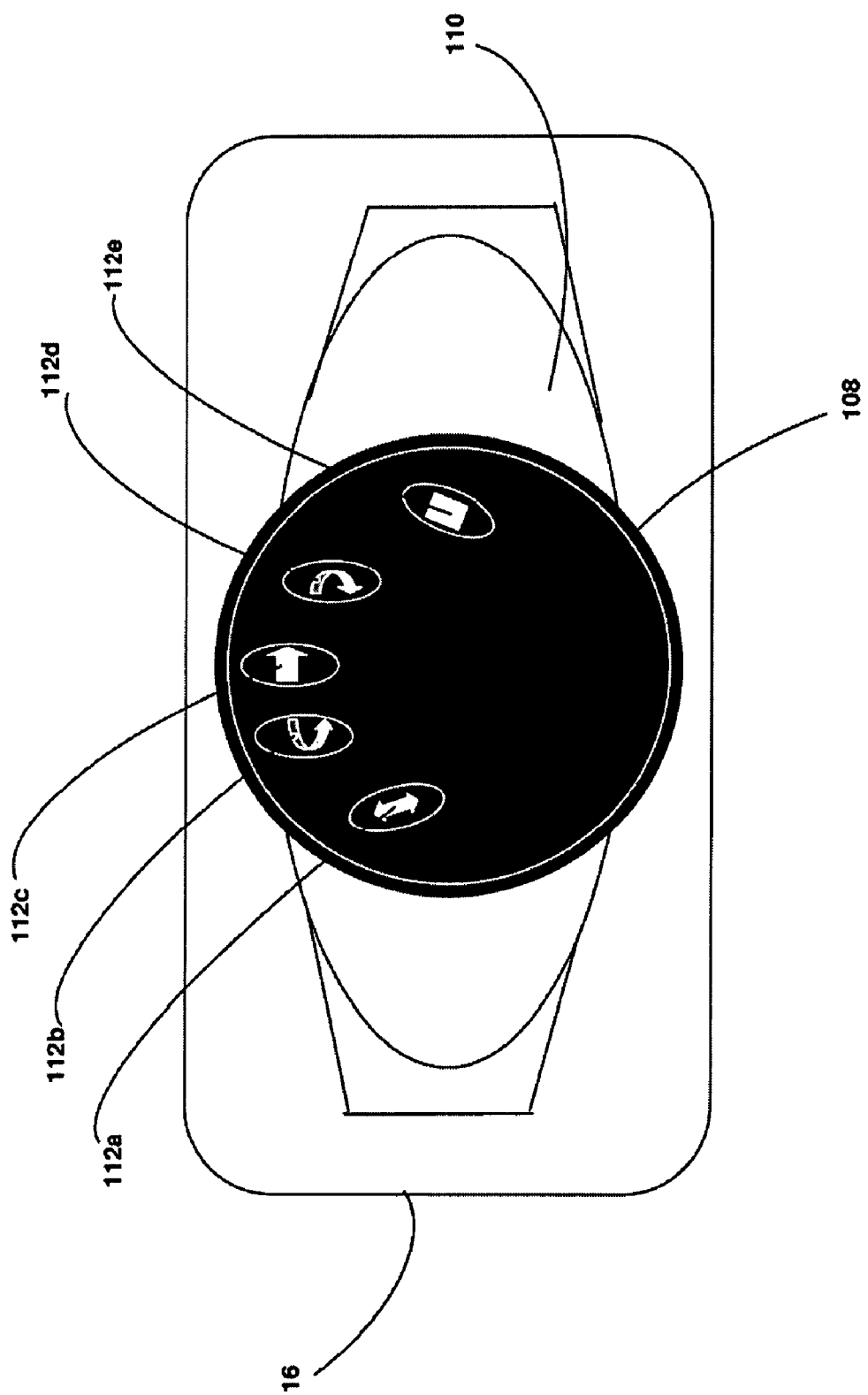

FIG. 11
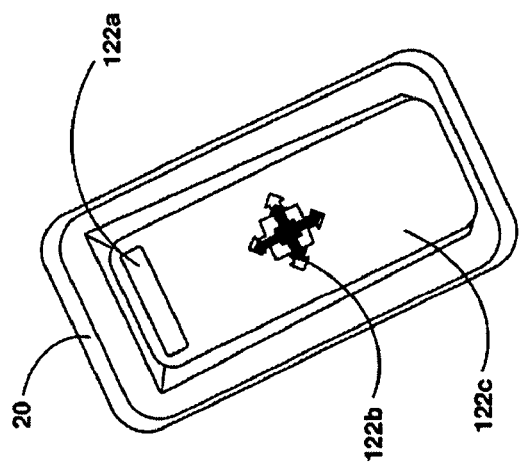
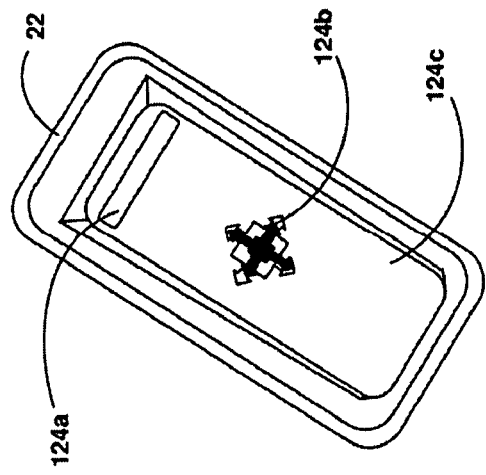
FIG. 12
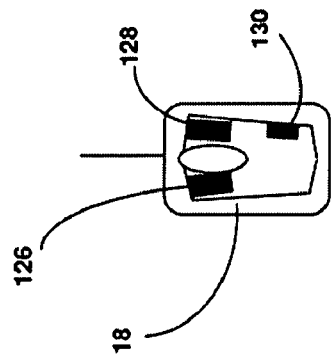
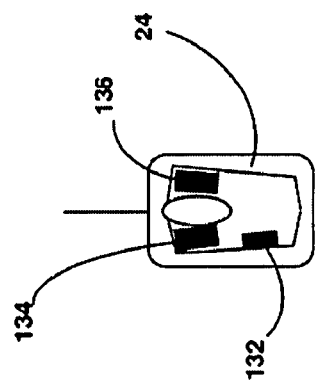

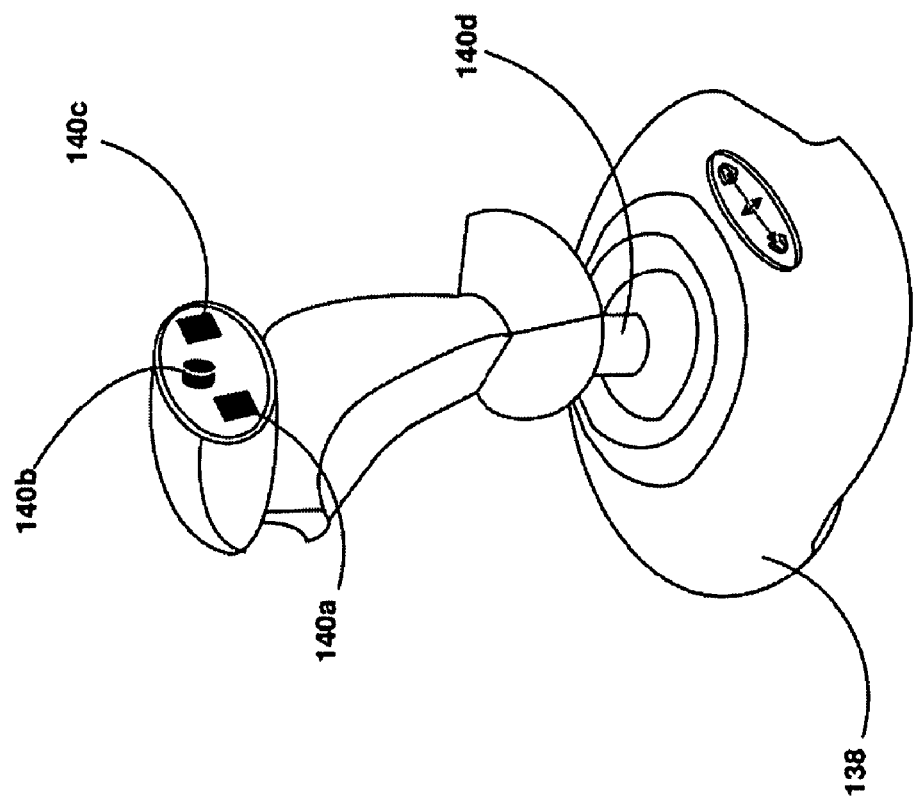

VIRTUAL REALITY COMPOSER PLATFORM SYSTEM

BACKGROUND

This invention relates to user input/output devices and signal input/output controllers, for use within a virtual reality multimedia learning and composer experience. This is applicable in vari-dimensional acoustic environments such as electronic learning and composing systems, game systems and computers. More particularly it relates to teaching, self-learning and composition of music from Beginners to Virtuoso Levels. Even more particularly it relates to a DIY (Do-It-Yourself) virtual reality medium, using the fundamentals proposed within U.S. application Ser. No. 11/016,438 & PCT Application No. PCT/US-07/12751 via new generation music notation design, special purpose apparatus, devices and controllers for creating highly complex music for a vast number of instruments.

THE PROBLEM

Currently, within society there is a major decline in Classical Music all across the world, both within the general public and also within the Education Systems of schools, colleges and academies. This major decline has been analyzed by various organizations, highlighting the enormous inconsistency afforded to these same schools, colleges and academies to even try and fix the problem. Music is one of the most important aspects of modern living, where thousands of studies have shown how a society grows and expands via the fundamentals of music. Not only are there advantages to the general public as a whole from the health benefits of playing and listening to music, but also in the relief of pain for the sick and unhealthy in hospitals, nursing homes and within their own homes. Many international newspapers have highlighted this enormous decline.

Article One

As examples, the New York Times published an article on Jun. 25, 2005 with the title "Decline in Listeners Worries Orchestras". In this article it examined the Chicago Symphony Orchestra reporting on quote.

"that its events had fallen by one-third since 1990. All over the Western world, the alarm is sounding that Classical Music is in trouble. Orchestra subscription sales are dropping widely, in some cases by as much as two percentage points per year. Ensembles are not balancing their budgets. Audiences are getting older; young people are turned off by classical music."

Article Two

Another article was published by the Music for All Foundation in September 2004 with the title "The Sour and Unprecedented Decline of Music Education in California Public Schools. In this article it examined the entire State of California and its public schools reporting on quote.

"unveiled a 50 percent decline in the percentage of students in music education programs over the past five years, representing an actual student loss of over one-half million students. Over the same period, the number of music teachers has declined 26.7 percent for an actual loss 1,057 teachers. The declines in music education enrollment and teaching positions far exceed those in any other subject. The new report, produced by the Music for All Foundation, examined actual enrollment data from the California Department of Education covering the period 1999-2000 school year thru the 2003-2004 academic year."

Article Three

Another further article was published by The San Diego Union-Tribune in Nov. 19, 2004 with the title "Low note sounds for music education". In this article it reported on quote.

"Music instruction is in free fall. Enrollment in music classes in San Diego County public schools has declined by a third—from 45,0000 to 30,000—in four years. Music mortality rate is even greater statewide. Enrollment in music classes is down fifty percent from 1999-2000 to last school year. Some local school boards have eliminated music teachers as part of millions of dollars in budget cuts".

The articles mentioned above are only the tip of the iceberg, in which studies are being published globally on an annual basis regarding the rapid degeneration of music education within society.

As well as these funded studies there have been many reports of what exactly makes a Pop Artist today. A documentary titled "Before The Music Dies" by Andrew Shapter and Joel Rasmussen released in 2006, analysed the rapid decline of quality and standard in music throughout the world, in which pop artists are manufactured by record companies more so than any time in music history. These pop artists among numerous avenues, have little if any talent in singing or playing their musical instruments, whereby record companies can now use digital technology within a recording studio, permitting them to enhance the quality of these pop artists. This deceives the general public into actually thinking that these artists have earned their status to be signed to the record company in the first place. Nothing could be further from the truth unfortunately.

The present invention captures the fundamentals of U.S. application Ser. No. 11/016,438 and PCT Application No. PCT/US-07/12751 and applies these specific fundamentals to a Virtual Reality environment, using highly sophisticated technology in bringing music learning and composing into the $21^{st}$ Century. The apparatus, devices and controllers comprise of an eleven part fundamental design, which allows maneuverability between two, three and four dimensional environments via a virtual reality experience. It would also permit input slots to accept and send data to other devices, which in turn connect to a structured experience for stand-alone users and within a LAN or WAN network.

As shown in FIG. 1, this platform consisting of all eleven parts of the fundamental design, gives the foundation required for any individual to write and compose highly sophisticated music, using an enormous variety of instruments at their fingertips. The eleven parts are specified as follows:

I. System Core 2
II. Virtual Music Orchestra Interface 8
III. Virtual Sheet Music Processor Interface 10
IV. Acoustic Surround Sound Processor 32
V. Effects Processor 34
VI. Hardisk Mainframe 36
VII. Virtual Synthesizer 6
VIII. Graphics Tablet Touch Screen Control Canter 74
IX. External Controllers 82
X. Instrument Category Select 70
XI. Soundcard Portal 4

The entire systems' fundamental would in essence, be a composer and conductor of a virtual reality environment utilizing virtual musicians, to play their music by way of a non complex new generation music notation system (N.G.M.N.S.). The System Core 2 is the heart of the platform, in which two interfaces called the Virtual Music Orchestra 8 & Virtual Sheet Music Processor 10 display the characteristics, created by the other eight parts of the fundamental design. These eleven characteristics of the platform can be separated into six specific elements described as follows:

a) System Core & CPU (50)
    b) Virtual Reality Interfaces (40)
    c) Sound Design (48)
    d) Controllers (46)
    e) Acoustic Effects (42)
    j) Hardisk Mainframe (44)

System Core & CPU

Consists of System Core 2 which includes the highly sophisticated Central Processing Unit (CPU).

Virtual Reality Interfaces

Consists of the Virtual Music Orchestra 8 and Virtual Sheet Music Processor 10.

Sound Design

Consists of Soundcard Portal 4 and Instrument Category Select 70.

Controllers

Consists of the Virtual Synthesizer 6, along with a collective representation of all external controllers 82, which are made up of Expressive Vari-Controller 16, Graphics Tablet Touch Screen Control Center 74, Digital Stylus 78, Optical Mice 18 and 24, External Foot Pedals 20 and 22, and an optional Joystick Controller 138 for individuals with or without sight.

Acoustic Effects

Consists of Acoustic Surround Sound Processor 32 and Effects Processor 34.

Hardisk Mainframe

It essentially comprises the Hardisk Mainframe 36

SUMMARY

The first skills learned in school by children are the alphabet and the ability to count to one hundred. So by default by the age of five or six 90% of the world population are adept in these two skills. Alphabet & Numbers create a simple environment to work with and through this fundamental comes an enjoyable electronic environment, which is created via this new virtual learning and music composing platform and system, where specific platforms can be manufactured for various age categories in children and adults as follows:

| a) | Infants | 4-7 years of age |
| b) | Children | 8-12 years of age |
| c) | Teenagers | 13-18 years of age |
| d) | Adults | 18+ |

These four age categorized platforms however would have similar characteristics, enabling each age category to develop a foundation as they grow from infants to children into adults. These platforms would in essence, become part of every child's learning environment and everyday life using music as a medium. However, due to the sophistication and technology put forward within this application for the fundamental platform, adults will be the age category that will benefit most from the system in early attempts at its development and design.

The Virtual Reality Composer Platform will be developed, consisting of six specific elements described in summary as follows:

System Core (50)

This element 50 comprises a System Core 2 that includes the highly sophisticated Central Processing Unit (CPU). This is the heart of the system platform 50, where all other elements below-interface with the system processor, using input and output data from highly technological advanced mediums. This data is then processed and distributed by the CPU to the other relevant elements within the users virtual environment.

Virtual Reality Interfaces (40)

This element 40, consists of the Virtual Music Orchestra 8 and Virtual Sheet Music Processor 10. These two interfaces are the display mediums for the System Core inputs and outputs and are in itself a display medium for the design, enabling a user to actually see the data they are creating. Both interfaces integrate with the Graphics Tablet 74 via the System Core 2. The first Virtual Music Orchestra 8 interface would be a screen of size from a 17" monitor all the way up to a 64" or higher wide screen interface. Larger the interface, the more data can be displayed.

This data is different to the data that is displayed within the other interface Virtual Sheet Music Processor 10. The fundamental design of the Virtual Music Orchestra (V.M.O.) 8 allows the user to conduct and manipulate specific characters as examples: 54*a*, 54*g*, 54*h* within the interface 8 via the Graphics Tablet 74 and Digital Stylus 78, which include a composer or user 28, who then writes a piece of music with the help of other characteristics of the platform. They then communicate with the character 54*h*, requesting via a sensor microphone 12, to come forward to position 54*f* on interface and play the piece related to a specific instrument within the orchestra. Virtual Reality manipulation of each individual character 54*a*, 54*g*, 54*h* within the orchestra is possible, where they can be asked to move to a different area within the acoustic field 54*b* as well as a myriad of other commands from the user 28, during the composition of their music.

The Virtual Sheet Music 10 interface is similar in fundamental design to 8, in that a screen of size from a 17" monitor all the way tip to a 64" or higher wide screen interface is manufactured. Again, larger the interface, the more data can be displayed. This data is different to the data that is displayed within the other interface Virtual Music Orchestra 8. The fundamental design of the Virtual Sheet Music Processor (V.S.M.P.) 10 allows the user to compose music for all instruments. The designs put forward using the aforementioned US patent & PCT Applications from the author, authorize this interface 10 to display specialized new generation digital sheet music, switch-able between various instruments as the user 28 creates the music.

Both 8 and 10 are co-related and work in digital synchronization with the user 28, allowing 28 to have complete control of the composition, recording and presentation of what their music should sound like, feel like and look like within a virtual orchestra. So in essence what is occurring is that the user 28 has complete artistic control over a set of virtual reality mechanisms in the construct of their music. This is not possible with real orchestras as a weak conductor or composer will not be able to lead the orchestral musicians, what way they wish a certain piece of music to be played by the musicians within the orchestra. The music that is then composed using this Virtual Reality system can supply the foundations of the piece of music to the real musicians, who can then clearly hear what way the composer wishes the music to sound like and feel like. This has a tremendous advantage because the composer or conductor has written the piece the way they have envisioned it to be. Music is an art as well as being an emotion and some of the greatest composers were at a disadvantage in trying to explain to musicians, how they wished their music to be played. Words cannot describe the majority of the greatest pieces ever written, as they are coming from within the composer. As the saying goes "music comes from the heart, not from the brain".

Sound Design (48)

This element 48 comprises a Soundcard Portal 4 and Instrument Category Select 10. The user 28 while composing their music uses a wide variety of acoustic and electronic instruments. Using the foundations described in prior US & PCT Applications each of these musical instruments are separated into ten specific categories. They can be analyzed in their entirety from U.S. application Ser. No. 11/016,438. As a recap they are summarized as follows:

1.) Category One: Pianos, Keyboards, Organs, Harpsichords, Clavichords, Pianofortes, Pipe Organs, and Synthesizers.
2) Category Two:
   Dulcimers, Vibraphones, Xylophones, Cimbaloms
3) Category Three:
   Accordions
4) Category Four:
   Guitars (1-12 Strings), Mandolins, Banjos, Sitars
5) Category Five:
   Cellos, Violins, Violas, Double Bass, Fiddles
6) Category Six:
   Harps
7) Category Seven:
   Recorders, Flutes, Tin Whistles, Piccolos
8) Category Eight:
   Clarinets, Bassoons, Bagpipes, Saxophones, Trumpets, Oboes, French Horns, Trombones, Baritone Horns, Tubas
9) Category Nine:
   Standard Non Artificial Drum Kit (DK1)
10) Category Ten:
   Artificial Synthesized Drum Kit (DK2)

Each of these Categories are represented by 10a, 10b, 10c, 10d, 10e, 10f, 10g, 10h, 10i, 10j respectively upon the Virtual Synthesizer 6. Both 4 and 10 work in unison with each other, in that a user 28 can purchase specialized Instrument Category Select 10 soundcards 38a, 38b, 38c, 38d, 38e, 38f, 38g, 38h, 38i, 38j which are then placed into the specially designed slots of the Soundcard Portal 4. So in summary if all Instrument Category Select 10 soundcards 38a, 38b, 38c, 38d, 38e, 38f, 38g, 38h, 38i, 38j are fully functional within the Sound Card Portal 4, the user 28 has all instruments available to him or her, while they compose their music. So for example a symphony would require a complete orchestra, which would then lead a user 28 to require all Instrument Category Select 10 soundcards. The user 28 is reliant on the amount of soundcards placed into the slots of the Soundcard Portal 4. A more economical way of applying this technology could be designed, especially in the creation of platforms for children and teenagers, in that the soundcards would be non-professional for children and teenagers and professional for adults.

Controllers (46)

This element 46, comprises a Virtual Synthesizer 6, Expressive Vari-Controller 16, Graphics Tablet Touch Screen Control Center 74 & Digital Stylus 78 and External Controllers 18, 20, 22, 24 and 138. The Virtual Synthesizer 6 will be a new and advanced technological leap into the future of musical instruments. Using the fundamentals of earlier proposed U.S. application Ser. No. 11/016,438 this new instrument would instead contain one hundred and seventy six specific keys split into two areas 56 & 62 on the machine 6. Both 56 and 62 would however be adjoining each other, so the Virtual Synthesizer 6 would resemble a standard piano keyboard, but there would be many more keys available to the musician than the conventional keyboard length. All these keys would be playable upon touch sensitive keys, examples 64 and 66 allowing a user 28 to play various musical instruments where applicable, in the form that they are physically played in using the real instrument itself, for example the uninterrupted sound of a non fretted instrument. These specially designed keys would allow the user 28 to play the keys of the Virtual Synthesizer 6 in the format, where the audible ear would not be able to differentiate between the real instrument and virtual electronic representation of these same instruments, using highly advanced digital technology.

For example: A violin contains no fret-board and the sounds that are produced by a violin are composed of more or less smooth sounds consisting of uninterrupted tones. As a complete opposite of this, a piano contains interrupted sounds, in that the a pianist would depress one key 68a, raise their finger and then depress a subsequent key 68b. The characteristics of the keys on a standard piano do not permit a flowing movement while playing the instrument. In other words, the fingers do not slide along the keys, which would produce a flowing movement like a violinist moving up an unfretted fret-board, from a low note to a high note. The current sound frequency range of a standard Classical Piano is between 27.5 Hz to 4186.01 Hz. The human hearing range is between 20 Hz to 20,000 Hz.

What is being proposed is that this Virtual Synthesizer 6 have additional frequencies beyond the 4186.01 Hz, beginning at the eighty-ninth key of the instrument, enabling sound frequencies of violins and other string instruments to be replicated. The Note eighty-eight on a conventional piano has a frequency of 4186.01 Hz. The eighty-seventh note on a conventional piano has a frequency of 3951.07 Hz. This gives a difference of 234.94 Hz. So by looking at the frequency differences between each note on a conventional piano a new set of frequencies could be internationally agreed upon, to assign a set amount of frequencies to accommodate harmonics and fundamental tones beyond the eighty eight key on the Virtual Synthesizer 6. String instruments have the ability to play in any pitch which, in the hands of great players, leads to wonderful range of harmonic coloring, making it possible for the instruments to be very expressive. The author references the acoustics achieved by an electronic violin, which is equipped with an electric signal output of its sound. These same digital frequencies should be possible in the construction of the new generation sound cards, permitting sounds undistinguishable from the real instrument itself.

As well as the Virtual Synthesizer 6 actually creating the sounds that are playable by the musician or composer, this virtual reality recording console as it is, could have several audio inputs in which a host of external real instruments could be recorded, along with the vocals of male and female singers. For example a separate programming language package could permit the internal recording console to be connected to the make up of a drum kit or the standard XLR connector of a vocalists microphone. Other software packages currently used within the recording industry could also be uploaded into the system which allow for example: drum loop programming software, audio sampling software like those by the manufacturer AKAI and audio manipulation tuning software that correct using digital technology a vocalists out of tune singing, within this virtual recording console.

The nine fundamental components of sound are Pitch, Timbre, Harmonics, Loudness, Rhythm, Attack, Sustain, Decay and Speed. These components are represented within the design of the Virtual Synthesizer 6 by way of a varidimensional controllers patch 100 which allow multi-directional variants of Pitch 102a, Timbre 102b, Harmonics 102c, Loudness 102d, Rhythm 102e, Attack 102f, Sustain 102g, Decay 102h, Speed 102i, Virtual Reality Main Menu Select 102j. These variants can be then applied to each instrument on the ten categorized sound cards 38a, 38b, 38c, 38d, 38e, 38f, 38g, 38h, 38i, 38j. As an example using a controller for Pitch 102a the variants applicable could be used to change the frequency of a particular musical instrument. Another example would be Timbre 102b which would allow a controller to alternate between variants of Timbre i.e. altering the complex sound spectrum and envelope of a specific musical instrument. In summary the Virtual Synthesizer 6 would allow advanced technological acoustical control over each specific instrument within the world today and into the future.

The other External Controllers are Expressive Vari-Controllers 16, a controller touch sensitive mechanism allowing playback and record and Optical Mouse Controllers 18 and 24. As well as this there is the Graphics Tablet Touch Screen Control Center 74 & Digital Stylus 78. All of these input and output controllers work in conjunction with manipulating the complex frequencies, linear motion control and digital editing of an enormous amount of musical instruments, along with atmospheric, marine and natural special effects. The Graphics Tablet 74 allows input of specific numeric values, which correspond to keys of an instrument and using the Digital Stylus 78, the user enters the data upon the Graphics Tablet utilizing pressure sensitive inputting and voice recognition input data.

Acoustic Effects (42)

This element 42, comprises an Acoustic Surround Sound Processor (A.S.S.P.) 32 and Effects Processor 34. The A.S.S.P. 32 is very similar to the Dolby Surround Sound System in which the origin of sound and its perspective is manipulated around the stereo field. Another type of perspective in surround sound is the THX format. The preferred process consists of between seven or eight specially designed speakers 26a, 26b, 26c, 26d, 26e, 26f and 26g which are placed around the user 28 environment that they are composing their music in. So for example between both of the main interfaces 8 and 10 a Center Speaker 26a is placed. As another specific example behind the user 28 rear left, another speaker Rear Left Speaker 26e is placed. All of these speakers are aligned and connected to the A.S.S.P. 32, and the sound signals received from the composition of music is outputted to this acoustic speaker system 26a, 26b, 26c, 26d, 26e, 26f and 26g via the A.S.S.P. 32.

The Virtual Music Orchestra interface 10 also has a representation of this acoustic environment. It is indicated within the interface by indicators like 54b, where the composer can clearly see in direct virtual reality relationships, as to where the musician or character 54a, 54g, 54h is playing the music from. This interfacing between the user 28 via its microphone 12 has complete acoustic control over the origins of each sound for each specific instrument within the surround sound environment. The Effects Processor 34 is an entire Special Effects processor in which a vast array of sound effects can be applied to any instrument, anywhere within the acoustic field. Every musician or character 54a, 54g, 54h are acoustically controlled by serial and parallel special effects, whether its the sound of water flowing along a stream or applying a reverb effect. So if the virtual orchestra consisted of one hundred virtual musicians, then the user 28 would have the controllers to apply a serial effect to all characters individually, or a parallel effect to all characters collectively. This virtual reality world would require advanced technology. It would allow unprecedented sound effect manipulation, with one virtual musician producing sound through a train station special effect and another virtual musician producing sound through a water special effect.

Hardisk Mainframe (44)

The element 44, consists of the Hardisk Mainframe 36. This works in digital synchronization with the System Core 4 and records all input and output data through the entire Virtual Reality Composer Platform 40, 42, 44, 46 and 48. It is much like the standard hard-drive of a computer where in this case, all memory for all applications used within the platform is stored in the Hardisk Mainframe 36. It will allow backup through CD-ROM & DVD-ROM and other mediums that allow high capacity content either invented as present or due to be invented into the future. Ideally a new medium could be invented which would allow all virtual reality musicians to be recorded in serial tracks, which could then be manipulated at Mastering of the produced Symphony or Concerto as examples. So, in theory what is being proposed is a Digital or other fundamental record-able medium that would be Virtual Reality Record-able Mediums. In essence being allowed to manipulate the tracks on the new medium in the same format as could be done through the construct of the Virtual Reality Composer Platform i.e., take one of the tracks and apply a different acoustical effect or placement within a surround sound field. During Mastering a complete Symphony could be manipulated to the best quality possible. This manipulation should also be controlled on the mastering suite of the entire platform also.

The difference would be that at Mastering, a new medium containing all the serial tracks could be brought away from the Department that initially recorded the Symphony and a separate Mastering & Production Department would complete the symphony, using very little electronic equipment. Like for example a musician using the Yamaha SY99 professional synthesizer has the option to purchase the TG77 Synth Module, which contains all the electronics, sounds, special effects of the SY99 without the actual keyboard. This module can be placed within a rack in a Sound Engineer's studio, which can then use a MIDI instrument to play the electronics from the Module. This further allows a musician or engineer to have several different types of professional synthesizers in the form of Synth Modules without the extra space required if the actual keyboards were purchased.

To be specific on the analogy, the Virtual Reality Composer Platform 40,42,44,46 and 48 could if electronic capabilities allow, be represented in one computer hard-drive, one MIDI type keyboard and one monitor. I think that this would be a major technological advancement in Digital technology if the entire design of the platform could be narrowed down to this analogy i.e., in the form of some sort of Module, especially at the Mastering stage in the final production of the composition.

This digital virtual reality experience spreads its adaptability into all musical instruments featured in prior mentioned Applications from the author, including but not limited to Keyed, String (fret and non-fret), Wind and Percussion in their various incarnations.

PRIOR ART

Following is a survey of the prior art patents listed in chronological order according to geographical listed patent documents for ready reference of the reader.

a) Kawashima (U.S. Pat. No. 5,189,240) granted in February 1993 is disclosed as "A breath controller for musical instruments includes a mouth piece for blowing the air into an air chamber. Blowing the air makes an air pressure increase in the air chamber, thus an elastic member is displaced corresponding to the air pressure. At the same time, the displacement of a reflection surface changes an amount of light to reflect an emitted light from a light-emitting element to a light-receiving element. The light-receiving element then controls a signal corresponding to the amount of light, thus making the signal change to a musical tone signal."

Within the authors' application it is mentioned that an external device like a Breath Controller could be connected to the V.R.C.P. to control the expressive nature of a particular musical instrument like a Saxophone for example. The above mentioned US patent could be used in conjunction with Virtual Reality Composer Platform.

b) Falacara, Cunningham, Tamashiro, Alvarado, Warwick, Needham (U.S. Pat. No. 6,377,263) granted in April 2002 is disclosed as "A system and method for creating a virtual reality is defined. The virtual reality is efficiently constructed by providing a framework, or paradigm, in which the various aspects of the virtual world may be separately constructed, and then brought together at runtime to create the desired virtual reality. The framework includes views, which are windows into a virtual world, virtual worlds, which are complete 3D models of the virtual reality, and modular components, which are beings (or entities or creatures) that populate the virtual world. The components have both a graphical (visual) model and a behavioral model. The graphical model and behavioral model are independent software modules that may be reused with other components. Included with the modules are attributes, rules, and other parameters that may be used to affect the basic visual appearance and behavior of a component. Components may inherit from other components. The graphical model of a component is constructed from a hierarchy of parts."

Within the authors' application it is mentioned that the Virtual Interfaces 8 and 10 serve as a display medium during the composition of music within a Virtual Reality environment. Virtual Reality in essence allows a user to manipulate the environment around them, as well as the characters that are within this environment. However, what's being proposed within this application is relaying commands to virtual musicians upon an interface and manipulating them into doing in real-time, what a user 28 is composing. So for example, a user 28 requests a virtual musician via voice technology to prepare for a performance. The Virtual Musician appears at the forefront of the interface and awaits instructions either holding their specific musical instrument, or sitting in front of it. The user 28 then commands via the playback mechanism to play either the inputted data via 74 and 78, or in real-time plays the music the composer is playing upon the Virtual Synthesizer 6.

In other words, the Virtual Musicians or characters within the virtual interface are under the complete control of the composer, following in real-time their exact actions upon the virtual synthesizer 6. Positions within the virtual reality environment are also manipulated, where the user 28 can command several hundred musicians within several orchestras, to do what the user 28 inputs in a musical manner and with the manipulation of various special effects. This permits the user 28 to hear on playback the result. This V.R.C.P. would also contain a real-time learning intelli-brain, which would create a device that contains an internal memory that continues to expand as the user 28 becomes more adept in the composition of music. The interface being proposed will contain various virtual reality backgrounds, but the characters themselves become in essence a musician within an orchestra and through voice commands interface between alternate orchestral levels, within the system. That is a violinist in a specific orchestra could be commanded to play in a traditional music orchestra. All Virtual Musicians will have an infinite ability in that, whatever the user 28 plays or composes they will be able in real-time to mimic it. Music the composer inputs via 74 and 78 are also manageable, where the user 28 can listen to what a certain phrase of music would sound like at, for example two hundred and twenty beats per second or four hundred beats per second. This direct relationship with virtual characters will be a advanced leap into the future of composing music and will be so realistic that composers will prefer this environment, to an environment masked in politics like real orchestras are today.

c) Meisel (U.S. Pat. No. 6,444,885) granted in September 2002 is disclosed as "The key actuation system is designed for use with a keyboard instrument of the type that has a key fulcrum which pivotally supports multiple keys. Each key has a front end forward of the fulcrum which is to be depressed by a player, and a rear portion which is positioned rearward of the fulcrum and it pivots upwardly when the front end is depressed. The key actuation system includes a pull solenoid with a coil portion and a piston. When the coil portion of the solenoid is energized, the piston is drawn into the coil portion. The solenoid is mounted such that the coil portion is above one of the keys and behind the key fulcrum. The piston is in mechanical communication with the rear portion of the key so that when the coil portion is energized and the piston is drawn into the coil portion, the rear portion of the key is lifted upwardly."

Within the authors' application it is mentioned that the Virtual Synthesizer 6 serves a medium to compose music. While Meisel is building upon conventional piano mechanisms and their measurements, this application proposes a musical instrument containing one hundred and seventy six keys, each with a visible numeric indicia either embossed or etched upon piano keys. These keys are all of the same vertical height off the base of the keyboard. There is no visual difference in height between the black and white keys of this new device 6. These keys of which measurements are disclosed within this application with visible first indicia, allow the player to play linear patterns of music, like those produced by violins and other non-fretted musical instruments. A new set of musical frequencies is assigned to keys above the eighty-eight key and harmonic elements of acoustic instruments can be created.

d) Yonezu, Osaki, Ito (U.S. Pat. No. 6,915,104), granted in July 2005 is disclosed as "An education system includes a network, individual learning terminals, a group learning terminal and a learning management server. The individual learning terminals are connected with the network and are provided for individual learning of students. The group learning terminal is connected with the network and provided for group learning of a group of the students. The learning management server is connected with the network to provide first education modules for the individual learning to the individual learning terminals and second education modules for the group learning to the group learning terminal."

This above Patent document relates to enrolling a set of students, dividing them up by utilizing theory tests according to their skillability levels and then teaching them through a management server a selection of various education formats. It does not self teach the student in that the student is under the direction of a teacher. The author discloses an initial embodiment fundamental for a new language in music in U.S. application Ser. No. 11/016,438. This fundamental language allows students and the general public to create and learn any musical instrument outside the walls of the conventional government education systems. Within this application the author discloses embodiment utilizing the original language disclosed in U.S. application Ser. No. 11/016,438 in which a virtual reality environment is created for the user of the V.R.C.P. Even though Yonezu, Osaki and Ito are referencing a Virtual Teaching System, the Virtual embodiment caters for a set of students or people who are connected to a server. This connection outputs the information and the students or people receive the input and learn accordingly. This is not true Virtual environments. The authors' application creates a Virtual Reality environment for the user who is using the V.R.C.P., in which a myriad of experiences are relayed to him or her as they learn, compose and create music. This is all achieved without the interference from third party entities like schools, teachers or management servers.

e) Charlier (U.S. Pat. No. 6,985,138) granted in January 2006 is disclosed as "A writing stylus (100) having a motion sensor (204) for sensing the movement of at least one end 110 of the stylus relative to an adjacent surface is described. The stylus has an elongated housing (104) and a cap (102). The motion sensor generates signals corresponding to the relative motion of the surface to the sensor. The cap is removeably carried on at least one portion of the housing, which also has the motion sensor. The cap comprises a light passage (118) adapted to allow the motion sensor to sense the translation of the surface adjacent to the cap, through the cap. In a first input mode the motion sensor is used for sensing manual hand writing motion. In a second mode, when the cap is carried on the housing and is placed over at least the motion sensor, the motion sensor senses the motion of a surface adjacent to the cap such as a users finger. In this mode, the stylus functions a multiple axis input device such as a thumbwheel."

Within the authors' application it is mentioned that the Graphics Tablet 74 and Digital Stylus 78 serve as input mediums during the composition of music within a Virtual Reality environment. Charlier proposes a medium, which improves on prior technology using a "motion detection system with increased flexibility and functionality". However, the custom built 74 and 78 disclosed within this application utilizes the fundamentals proposed in U.S. application Ser. No. 11/016, 438. These fundamentals specifically deal with the composition of music, using a new generation music notation. These fundamentals can either be performed upon the Virtual Synthesizer 6 or inputted directly by the user 28 upon 74 and 78. So for example: the user wishes to transcribe a conventional sheet music piece for specifics "Prelude Op. 28" by Frederic Chopin. To do this, the user 28 would need to translate every note upon the conventional sheet music into the new generation music notation and then place these values upon the correct horizontal lines, to indicate correct finger coordination. While doing this user 28 takes into account the correct note lengths, that is whether the note is a crotchet or a quaver. Utilizing the color designation formula the user 28 alters the values colors, while also taking into account other basic elements of conventional sheet music like ties, slurs and trills to name a few. This custom Graphics Tablet and Digital Stylus would enable the user 28 to do such things in an economical and quick process, not unlike how conventional sheet music scores are transcribed quickly using computer software by present Score-Writers.

f) Groff (U.S. Pat. No. 7,005,571) granted in February 2006 is disclosed as "A MIDI controller pedal-board for composing and playing music such as pipe organ music is disclosed. The MIDI controller pedal-board provides pedals, and switches for the playing of notes and the manipulation of sound data in a MIDI format. The present invention accomplishes these means by providing a plurality of easy accessible swell shoes/volume pedals, sustain pedal, switches, a dial and note pedals for the manipulation of MIDI signals and advancement of such MIDI signals to attached MIDI devices"

Within the authors' application it is mentioned that External Controllers 12, 18, 20, 22, 24, 74, 78 as well as 6 relay input and output data to 2. This data comes in several mediums of which for specifics are audio signals, video signals, optical signals and MIDI signals during the composition of music within the V.R.C.P.S. With regard to MIDI signals a new and revolutionary set of MIDI signals are proposed using the fundamentals of the U.S. application Ser. No. 11/016,438. These fundamentals revolve around a new and unique language in music, in which all musical instruments have been divided into ten specific categories and thirty-six different notation systems developed. This enables any person to play any musical instrument instantly, without learning conventional music notation or tuition from music teachers. Groff proposes elements using the conventional music notation system, where the inventor's application is proposing new fundamental elements in the manipulation of input and output of MIDI signals.

g) Franz, Henzinger, Brin, Milch (U.S. Pat. No. 7,027,987) granted in April 2006 is disclosed as "A system provides search results from a voice search query. The system receives a voice search query from a user, derives one or more recognition hypotheses, each being associated with a weight, from the voice search query, and constructs a weighted Boolean query using the recognition hypotheses. The system then provides the weighted Boolean query to a search system and provides the results of the search system to a user."

Within the authors' application it is mentioned that the Optical Microphone 12 serve as a voice recognition medium during the composition of music. While Voice Recognition technology has been around for many years, the main disadvantages of the technology has been the significant ratio of error results returned by the sensors involved. The above U.S. Pat. No. 7,027,987 maybe the first technology that has solved this problem. The disclosure outlined in the authors' application proposes the idea, in which the user 28 integrates with a virtual reality environment and a catalogue of commands is collected within the database. These commands are then selected using voice recognition technology and the virtual characters within the virtual interfaces 8 and 10 obey the commands given. This catalogue of commands centers around standard language commands like "Play Bar Four ten milliseconds faster", new interfaced virtual language commands like "Virtual Musician X or Y move back to the Rear Left of stereo field" and also language commands containing specific alphanumeric values, which enable user 28 to create compositions, without having to input the notes of music by physically playing the musical instrument.

These commands happen in real-time within the Virtual Reality environment and create an experience not unlike the commands issued by a conductor of a musical orchestra. Except in this instance the conductor, instead of hundreds of musicians to control via a conventional orchestra dealing with a variety of personalities, the user 28 has complete control over the virtual environment and when commands are issued to the Virtual musicians they obey them instantly. This V.R.C.P. device would in essence not require a Music Teachers Union to decide what pay a certain orchestra should get for a certain performance, in that composers and conductors are no longer held to ransom by professional musicians and their unions. The enormous amount of time that could be saved through such a device in the early composition phase would be an unprecedented advantage to a composer or conductor. When the composition has been completed to the exact specification, it would be learned and then played by a real orchestra. Voice Recognition technology would need to be advanced within the V.R.C.P., to prevent errors in composition of music.

h) Nishiumi, Koshima, Miyamoto, Nishida (U.S. Pat. No. 7,102,618) granted in September 2006 is disclosed as "Three-dimensional image display game system and method for use with a display for displaying an object in a three-dimensional space, including an operation controlling device including an operating member having a base end rotatably supported and a free end operable by an operator. The operation controlling device includes an inclination amount data output detector, which detects an inclination amount of the operating member to output inclination amount data. The system further includes direction determining circuitry operable to determine a direction that corresponds to an inclination direction of the operating member based on the inclination amount data, and moving object direction determining circuitry which determines a moving direction of the object in three-dimensional space based upon the direction determined by the direction determining circuitry and a point of view angle at which the object is being viewed by the operator in three-dimensional space. A direction in which the operating member must be moved to cause forward movement of the object is offset from a forward direction of the operation controlling device by an angle corresponding to the point of view angle."

Within the authors' application it is mentioned that the Virtual Interfaces 8 and 10 serve as display mediums during the composition of music within a Virtual Reality environment. Specifically with regards to displaying the authors' fundamentals of U.S. application Ser. No. 11/016,438 upon interface 10, this novel and revolutionary new generation music notation, enables any person to play any musical instrument instantly. Upon interface 8, a novel method is proposed in which hundreds of virtual musicians or characters either in serial or parallel, can be manipulated to mimic a real-time musical performance.

Within U.S. Pat. No. 7,102,618 a method is proposed which is not unlike the manipulation that game consoles have over characters like racing cars, spaceships, fighter jets and game characters like Super Mario that move under the direction of a joystick or other operating medium. All within a specific two or three dimensional constructed environment. Specific buttons and switches upon these joysticks permit users to perform various functions like "to launch a missile in a shooting game, or designate various actions such as jumping, kicking, or controlling an action game in many different ways". While disclosure within the authors' application enables a device like a joystick to manipulate a specific character to move within a 360 degree environment using positional coordinates, the novelty occurs when commands are issued to a virtual character 54g as an example. The character then awaits to begin the real-time performance of the piece of music that the user 28 will play upon the virtual synthesizer 6. This integration is revolutionary whereby a user 28 is using specific virtual characters within interface 8, to act out in real-time the actions they are performing in synchronization upon device 6. The user 28 can zoom in to the specific virtual character before a performance begins and accordingly as the user 28 depresses piano keys upon 6, the virtual character mimics exactly in synchronization what user 28 is playing. So for example: the user 28 has chosen from the soundcard select—to play a drum pattern. The keys on the instrument 6 are assigned a collection of percussion sounds. The user 28 selects the virtual musician who comes forward with a virtual representation of a drum kit. It awaits instruction and upon recording the user 28 depresses a snare drum upon device 6 and in synchronization the virtual musician with its virtual set of drumsticks, plays the virtual snare drum upon the virtual reality drum-kit.

This integration technology is unprecedented where a user 28 will have complete control over hundreds of virtual characters within many levels of the virtual orchestra interface. With voice technology the user 28 can command the virtual musician/s to play certain bars of music with alternative tempos and through various editing software, apply a myriad of special effects to each virtual musical instrument within the orchestra. Integration with these virtual musicians becomes second nature with the user 28, in which by way of internal memories the V.R.C.P. forms a unique relationship with the user 28. This unique relationship can be manipulated, where a myriad of virtual musicians can be selected with each having their own unique personality, even imitating the personalities of specific pop stars and musicians. Like for example: many death metal bands contain musicians who have outrageous personalities—these same traits could be created for virtual death metal musicians within the V.R.C.P.

While embodiment proposed within U.S. Pat. No. 7,102, 618 manipulates specific characters during a game like Super Mario for example, disclosure within the authors' application is giving the user 28 real-time manipulation in synchronization with what user 28 is playing, the other side of the Virtual Reality environment upon device 6. A set of controlled parameters are relevant in all game software, in which a user follows a pattern in order to go through each specific level within the game. If they perform an incorrect function like for example while manipulating the character to jump it misses a mountain ledge—the game restarts. The pattern is repeated until the user is familiar with the game levels until eventually they can complete all levels. The parameters within the V.R.C.P. are infinite, in which the user can construct entire symphonies and concertos from device 6. They also have the option of inputting this data using the new generation music notation via 74 and 78 and audibly and visually witnessing what it would sound and look like if performed. This is an done without having to go to professional musicians who may not be able to perform such pieces of music. After all, many concertos and symphonies require months of rehearsal by professional musicians, where this V.R.C.P. would permit user 28 to instantly hear the results of such a piece, via the virtual musicians. All of this interaction occurring by utilizing the inventor's new generation music notation system. Some other motion control game consoles allow a user to manipulate tempo of music by the movements of the users hands, which hold the motion controllers. This however is only affecting the tempo of a piece of music, where an analogy would be of how a mouse cursor moves at a specific speed across the monitor, dependent entirely on the mouse itself and its movement by the user. Slow movement relays slow movement of cursor while rapid movement relays rapid movement of cursor.

i) Jarrett, Sethuraman (U.S. Pat. No. 7,105,733) granted in September 2006 is disclosed as "An integrated system and software package for creating and performing a musical score including a user interface that enables a user to enter and display the musical score, a database that stores a data structure which supports graphical symbols for musical characters in the musical score and performance generation data that is derived from the graphical symbols, a musical font that includes a numbering system that corresponds to the musical characters, a compiler that generates the performance generation data from the database, a performance generator that reads the performance generation data from the compiler and synchronizes the performance of the musical score, and a synthesizer that responds to commands from the performance generator and creates data for acoustical playback of the musical score that is output to a sound generation device. The synthesizer generates the data for acoustical playback from a library of digital sound samples."

Within the authors' application it is mentioned that the Virtual Interfaces 8 and 10 serve as a display medium during the composition of music within a Virtual Reality environment. Specifically with regards to displaying the authors' fundamentals of U.S. application Ser. No. 11/016,438 upon interface 10, this novel and revolutionary new generation music notation enables any person to play any musical instrument instantly. Contrary to this, within U.S. Pat. No. 7,105,733 what is disclosed is the elements of prior art conventional sheet music. This data is then transferred to a computer program, which is displayed upon a graphical user interface. The authors' application is using elements for a new language in music, which is transferred to a computer program, in conventional terms a Score-Writer. This data covering thirty six different notation systems, enable the user 28 to transcribe conventional music notation scores into this new generation music notation. The results in score format are then saved in Adobe PDF Format, which can be printed off upon a conventional LaserJet printer. So in essence user 28 can obtain a score in conventional notation and through the fundamentals of U.S. application Ser. No. 11/016,438 can manipulate all conventional symbols in a simple format, which on completion of transcription will inform the user 28 the exact key, note, hole or valve from a musical instrument that is depressed, held, and covered along with exact finger coordination to do so.

j) Kitahara, Obuchi, Koizumi, Mizutani (U.S. Pat. No. 7,130,801) granted in October 2006 is disclosed as "speech interpretation servers, and a method for providing a speech interpretation service, are disclosed. The server includes a speech input for receiving an inputted speech in a first language from a mobile terminal, a speech recognizer that receives the inputted speech and converts the inputted speech into a prescribed symbol string, a language converter that converts the inputted speech converted into the prescribed symbol string into a second language, wherein the second language is different from the first language, and a speech output that outputs the second language to the mobile terminal. The method includes the steps of providing an interpretation server having resident thereon a plurality of registered sentences to be interpreted, activating a translation connection between the mobile terminal and the interpretation server, receiving speech, in a first language, inputted to the mobile terminal via the translation connection, at the interpretation server, recognizing and interpreting the speech inputted based on a comparison of the inputted speech to the plurality of registered sentences to be interpreted, and outputting a translation correspondent to the second language."

Within the authors' application it is mentioned that the Optical Microphone 12 serve as a voice recognition medium during the composition of music. Translations that would occur between the user 28 and the V.R.C.P. have its fundamentals based on music interpretations affecting expression, alterations affecting tempo and musical tones and various special effects. This type of voice recognition would be unique in that the language being translated is the fundamentals proposed in U.S. application Ser. No. 11/016,438 and these translations are being relayed to a set of virtual reality characters, which obey the commands liased by the user 28 in the composition of their own music.

However, when a user 28 would venture into external connections via LAN & WAN servers, the technology proposed for a voice translator in U.S. Pat. No. 7,130,801 could be utilized; in that user 28 could communicate with other music industry individuals throughout the world, speaking to each other in a universal language. For example: a user 28 utilizing the V.R.C.P. in China could communicate with another user utilizing the V.R.C.P in Australia. The translator would perform a function saving time, not relying on an Australian to learn Chinese or a Chinese individual learning English. The above mentioned U.S. Pat. No. 7,130,801 could be used in conjunction with Virtual Reality Composer Platform.

k) Fay, Schmidt (U.S. Pat. No. 7,254,540) granted in August 2007 is disclosed as "An application program provides a performance manager and an audio rendition manager to produce a rendition corresponding to an audio source. The performance manager receives audio data from the audio source and instantiates audio data processing components to process the audio data. The audio rendition manager receives the audio data from the performance manager and instantiates audio data processing components to further process the audio data, including a synthesizer component that generates audio sound wave data, and audio buffers that process the audio sound wave data. The audio data processing components are instantiated as objects having an interface that can be called by the application program. The application program requests a programming reference to an interface of an audio data processing component in the performance manager, or in the audio rendition manager, by calling an interface method of the performance manager or the audio rendition manager, respectively."

Within the authors' application it is mentioned that a set of ten soundcards are developed, which output audio signals with such clarity and frequency response, that user 28 is unable to audibly hear the difference between the output from the V.R.C.P. and a real acoustic musical instrument. The technology and frequency response disclosed in the above mentioned U.S. Pat. No. 7,254,540 could be used in conjunction with the Virtual Reality Composer Platform, in creating realistic audio signals for all categorized musical instruments.

OBJECTIVES

Unfortunately none of the prior art devices singly or even in combination provide for all of the objectives as established by the inventor for this system as enumerated below.

1. It is the objective of this invention to provide methods, devices and system using electronic and virtual reality environments to enable a novel individual to compose complex music from a variety of Music Genres.

2. It is the objective of this invention to provide methods, devices and system using electronic and virtual reality environments for learning and teaching of key, string, wind and percussion musical instruments through the inventors new generation music notation system N.G.M.N.S., described in U.S. application Ser. No. 11/016,438 using specifically designed application software pre installed and up-load-able onto the electronic device.

3. It is the objective of this invention to provide methods, devices and system using electronic and virtual reality environments to utilize revolutionary music notation systems that enables children, adults, elderly & the visually impaired to learn any musical instrument without the prior knowledge or prerequisite to learn the traditional and prior art music notation theory, using a virtual teaching environment.

4. Another objective of this invention is to provide methods, devices and system using electronic and virtual reality environments where people learn instantly exactly what fingers to use in the butterfly effect applied to all instruments detailed in U.S. application Ser. No. 11/016,438 when taking up an instrument and this window of creativity continues because of no requirement to ever learn standard musical theory of any level.

5. Another objective of this invention is to provide methods, devices and system using electronic and virtual reality environments to introduce children to music through educational and entertainment programs which utilize various external devices and other aids, like for example light emitting diodes and other sensors, to aid in the process of composing advanced standards of music, while also interacting with others via a LAN & WAN network. Systems similar to Allegro Multimedia Piano Wizard by Allegro Multimedia Inc and the Roll-Up Piano by Hecsan Inc., which use conventional notation fundamentals, are also available to the public. Guides such as those proposed in U.S. Pat. No. 5,920,023 could also be utilized, in that novelty occurs when conventional notation indicators and systems are substituted with the authors' new generation music notation system. Cling vinyl indicator strips, which are highly plasticized polyvinyl chloride material, are placed upon fretted, unfretted and other musical instruments utilizing the fundamentals of the author's new language in music. So disclosures within this new generation music notation system for all musical instruments, is altered accordingly to suit the desired results upon the musical instrument indicators, expressing novelty in each instance over prior art conventional notation devices and representations.

6. Another objective of this invention is to provide methods, devices and system using electronic and virtual reality environments to create a new Record-able Medium that allows virtual musicians within this system to be recorded in a serial or parallel track format. This record-able format medium to be manipulated during the subsequent mastering process, either within the system mastering suite or externally in a mastering studio or production department. These Record-able Mediums would be capable of recording hundreds of serial tracks from hundreds of virtual musicians and capable of serial and parallel manipulation.

7. Another objective of this invention is to provide methods, devices and system using electronic and virtual reality environments where the user would be able to instantly select from a wide variety of musical instruments and using the Virtual Synthesizer and various controllers connected via optical or other cabling mechanisms, compose music using the virtual and electronic representation in the construction of acoustic sounds, whether through sustain or breath/wind controllers to imitate Wind Instruments as an example.

8. Another objective of this invention is to provide methods, devices and system using electronic and virtual reality environments where manufacturers could create specific learning devices, which could provide the child or adult with a virtual teacher to learn various music syllabuses or curriculums from schools, irrespective of whether it be Beginners or Virtuoso Levels.

9. Another objective of this invention is to provide methods, devices and system using electronic and virtual reality environments that it be environmentally friendly and use materials, which are harmonious with the environment.

10. Another objective of this invention is to provide methods, devices and system using electronic and virtual reality environments that it be user friendly within a specific countries music curriculums, where a user is receiving a highly qualified and registered virtual reality music or other syllabus based education.

11. Another objective of this invention is to provide methods, devices and system using electronic and virtual reality environments to make learning a musical instrument using a specific selection of musical instruments to compose music, an enjoyable experience rather than a tedious one.

12. Another objective of this invention is to provide methods, devices and system using electronic and virtual reality environments where due to the obvious nature of this new invention it could be used for other applications, in that virtual characters are manipulated by the user in performing other tasks not associated with music. As well as this, a virtual music translator allows interaction between users of various countries either online through an intranet production facility or record company site, allowing various musicians to compose externally rather than within the facility itself.

13. Another objective of this invention is to provide methods, devices and system using electronic and virtual reality environments in which a large database and memory is housed via the Hardisk Mainframe within the Virtual Reality Composer Platform itself. All inputs and outputs are recorded with every virtual musician being assigned a certain area of this memory.

14. Another objective of this invention is to provide methods, devices and system using electronic and virtual reality environments to build a new Virtual Synthesizer that would contain one hundred and seventy six keys in which they are all horizontally placed, allowing a user to play the harmonics of any musical instrument within the higher area of this new instrument. All keys would be the same height off the surface of the synthesizer, in which a finger could depress the first key and every subsequent key is depressed without any obstruction, as the user moves up the instrument.

15. Another objective of this invention is to provide methods, devices and system using electronic and virtual reality environments, which would allow average musicians to be capable of composing enormously complex music using virtual instruments and virtual musicians. It would also allow conductors and songwriters to compose the music they have envisioned in their mind, without having to try and explain it to musicians in a standard conventional music orchestra.

16. Another objective of this invention is to provide methods, devices and system using electronic and virtual reality environments that even the visually impaired can self teach, whether it be in an entertainment or educational environment in conjunction with Braille. This could be achieved by applying sound click pulses to inform the user who is visually impaired their position within the virtual reality environment. This would enable the visually impaired to feel what they compose and to hear it as they wish, without having to think about their safety while walking around a real orchestral stage. The controller would ideally be in the form of a revolutionary joystick which would enable the visually impaired to manoeuvre within virtual reality environments. This joystick could also be made adaptable for the average individual instead of them using optical mouse controllers.

17. Another objective of this invention is to provide methods, devices and system using electronic and virtual reality environments enabling composers to select various type musical generic orchestras and either in serial or parallel have them playing with each other. So for example a common virtual reality classical orchestra has a virtual reality South American flamenco backing group in the foreground or background. This could be done through various floors or levels within this new virtual reality environment.

18. Another objective of this invention is that it can be popularized and maintained with ease.

19. Another objective of this invention is to make it suitable for users of a broad range of ages and situations.

20. Another objective of this invention is that it be capable of multiple uses in music and within the education system.

21. Another objective of this invention is to provide methods, devices and system using electronic and virtual reality environments which inform users via a selection of eight colors, the exact timing with regard the notes they are playing upon a musical instrument. While these eight colors are specified here, any set of eight colors could be assigned to each note length to indicate music timing.

22. Another objective of this invention is to provide methods, devices and system using electronic and virtual reality environments in which all standard sheet music could be translated via computer software into these new notation systems fundamentals and displayed upon the interfaces 8 and 10.

23. Another objective of this invention is to provide methods, devices and system using electronic and virtual reality environments that prevent users from depending on the competence of music school teachers, where the idea is that the entire Virtual Reality Composer Platform be accessible by any user, irrespective of what education level they have achieved or their status in society. This allows everyone to be able to compose the music that they have emotionally inside and this entire platform is a way for it to be harnessed and expressed.

24. Another objective of this invention is to provide methods, devices and system using electronic and virtual reality environments to allow quick translation of all conventional sheet music into this new form of notation via data collected from Midi Files or through scanning methods. This is then displayed within a printable format via standard Inkjet or Laser Printers, Digitally in the form of Record-able Formats or through Virtual Reality medium, displayed upon said interfaces 8 and 10.

25. Another objective of this invention is to provide methods, devices and system using electronic and virtual reality environments to allow the entire design to be separated and used individually as stand alone consumer products or in combination for consumers, for example: a standard Monitor, the Graphics Tablet 74, the Digital Stylus 78 and the Virtual Synthesizer 6. This would lead to cost effective products for consumers.

26. Another objective of this invention is to provide methods, devices and system using electronic and virtual reality environments to allow a new MIDI Interactive Formulae to be created, in which new program messages in MIDI are developed during the process of conventional music notation transcription. These program messages indicate specific parameters during the transcription of conventional music notation into this new generation sheet music notation. The program messages will indicate exact tempo or rhythm of music, correct finger coordination, exact notes, keys and valves from musical instruments, as well as a myriad of other parameters in the form of program messages in MIDI.

27. Another objective of this invention is to provide methods, devices and system using electronic and virtual reality environments to utilize new technologies into the system which best suits the required function. For example Multi-Touch Technology, Photosynth Technology, Captive-Motion Technology or indeed TouchKo Spatial Capacitive & Capacitive Plus Technology could be integrated in place of the Graphics Tablet 74 or other mediums within the system, to make the entire V.R.C.P. function with much quicker results, within the vastness that is Virtual, Simulated or Augmented Reality environments. Musion Eyeliner technology will allow expanded uses for the authors application, where instead of pre-recorded images that is this type of technology, these images will occur in real-time from virtual musicians, mimicking the user 28 and his her movements upon the exact notes, frets of musical instruments, using the fundamentals of the new generation music notation system. Specific program messages from the V.R.C.P. delivered to various modules will allow unprecedented realism for the user 28. While Musion Eyeliner technology is a step in the right direction, specifically with regard musical performances, they are pre-recorded and are not actually live. The people who interact with these pre-recorded images create an illusion that the entire performance is live. So, a major disadvantage to this is that a mediocre band could create a brilliant and talented album using today's audio and digital technology. They can then cheat a live audience using Musion Eyeliner technology into believing that this mediocre band, can perform such talented material in a live situation. An analogy of this would be musical artists who perform live with pre-recorded music and lip synch to the tracks because they are unable to perform the vocals live. The objective of the authors application wishes to nourish a musicians appetite to self create and compose, rather than create technology that develops an illusion of talent, where the talent is just that—an illusion.

28. Another objective of this invention is to provide methods, devices and system using electronic and virtual reality environments to allow a crossover of the entire design into curriculums of global education permitting components like the Graphics Tablet 74 and Digital Stylus 78 to be used in conjunction with education syllabuses via digitized input and output, instead of a user or student physically drawing and writing upon a piece of paper. These are just examples of this, where it can be understood that many components of the Virtual Reality Composer Platform could be used in a variety of areas of society, not just within music.

Other objectives of this invention reside in its simplicity, elegance of design, service and use and even aesthetics as will become apparent from the following brief description of the drawings and the detailed description of the concept embodiment.

Unfortunately none of the prior art devices singly or even in combination provides all of the features established by the inventor for this system as enumerated below.

a) Easy to use, learn and teach
b) Intuitive
c) User Friendly
d) Suitable for people of all ages and gender in all types of situations.
e) Easily adaptable for other uses
f) Creates a cohesive and continuous environment for learning
g) Creates music as it is envisioned within the mind of the composer.
h) Allows music to be composed beyond the limits since music was first realized.
i) Enables users to create high standards of compositions without ever having played a musical instrument.

BRIEF DESCRIPTION OF THE DRAWINGS

These objects and features of the invention shall now be described in relationship to the following drawings.

III. FIG. 3 shows a drawing of the Soundcard Portal 4 and how each soundcard slot 38a, 38b, 38c, 38d, 38e, 38f, 38g, 38h, 38i and 38j correlates to each categorized musical instrument.

VI. FIG. 5A shows a drawing of the Virtual Music Orchestra Interface/Screen which displays the specialized characters 54a, 54g, 54h that obey the commands of the user 28. Also allows various levels of different types of orchestras to be analyzed and combined to create music from various music genres all at once.

VII.

VIII.

XII.

XIII.

XIV.

XV. FIG. 7G shows a drawing of a standard classical piano key. The key shown is the C Sharp Note 68b. The average measurement of a natural black standard key on a piano would be 85 mm length×10 mm width×10 mm height.

XVI. FIG. 7H shows a drawing of a key on the Virtual Synthesizer 6. This new designed key 66 would be 85 mm length×10 mm width×2 or 3 mm height. It could also have the numeric value embossed upon the key to inform the user of the specific key being depressed.

XVII. FIG. 8A shows a diagram of the vari-dimensional controllers patch 100 which houses the multi-directional variants allowing alteration of Pitch 102a, Timbre 102b, Harmonics 102c, Loudness 102d, Rhythm 102e, Attack 102f, Sustain 102g, Decay 102h, Speed 102i to be applied to all musical instruments, while a Virtual Reality Main Menu Select 102j permits navigation around the Virtual Synthesizer 6.

XVIII. FIG. 8B shows a closer drawing of one of the multi directional variants. These variants as an example 104 allow the user 28 to place the palms of one of their hands upon it and using a roller like effect in various directions 106 influences what alteration is to occur upon the specific musical instrument chosen.

XIX.

XX. FIG. 9A shows a drawing of the Playback mechanism 108 that allows a user to place the fingers of their right hand-left hand if it were on the opposite side of the Virtual Synthesizer 6—into the slots shown, in which the thumb would be 112a, index finger 112b, middle finger 112c, ring finger 112d and pinkie finger 112e. Each of these slots control a specific mechanism within the Playback mechanism 108.

XXI.

XXII.

XXIII.

XXIV. FIG. 11 shows a drawing of the set of Controllers that are placed on the ground beside the user 28. Both 20 and 22 allow the Left Foot and Right Foot respectively to be placed upon the areas shown 122c and 124c. 122a would contain a small LCD screen which would display various data according to the alteration that occur, as the user moves the Controllers 20 and 22 utilizing directions indicated by 122b and 124b.

XXV. FIG. 12 shows a drawing of the Optical Mouse Controllers 18 and 24 specifically designed to input and output various signals; Page Left 126, Page Right 128 Lock 130 and further 132 Menu Scroll, 134 Grid Select and 136 Select Value. Various other controls are operational within the Optical Mouse, also permitting maneuverability around the surround sound and virtual reality environments.

XXVI. FIG. 13 shows a diagram of a specifically designed Joystick 138 which would allow a visually impaired individual to operate the controls normally operated by the Optical Mouse Controllers 18 and 24. The same concept would apply here also, where there would be a Joystick 138 for the Left Hand and an additional joystick for the Right Hand. However, in order for a visually impaired individual to make up for their inability to see—additional controls are operational within the Joystick 138. Page Left 140a, Page Right 140c Lock 140b are indicated within this figure. It would be therefore, obvious that the second joystick for the Right Hand would contain and as indicated in FIG. 12 a Menu Scroll, Grid Select and Select Value. Maneuverability would be applicable by moving the Joystick forward or backwards in a fulcrum control 140d coordinating in twelve different virtual reality directions.

XXVII.

XXVIII.

XXIX.

XXX.

XXXI. FIG. 15A shows a signal flowchart of how along with FIG. 15B indicate how each of the five Software Programming Language Packages would relate to each other. These are: Virtual Music Orchestra Program Software 202a, Virtual Sheet Music Program Software 204a, Musical Instrument Acoustic Program Software 206a, Musical Instrument Special Effects Program Software 208a, Surround Sound Acoustic Program Software 210a.

XXXII.

XXXIII.

DETAILED DESCRIPTION OF THE BEST MODE PREFERRED EMBODIMENT

Figure 1:
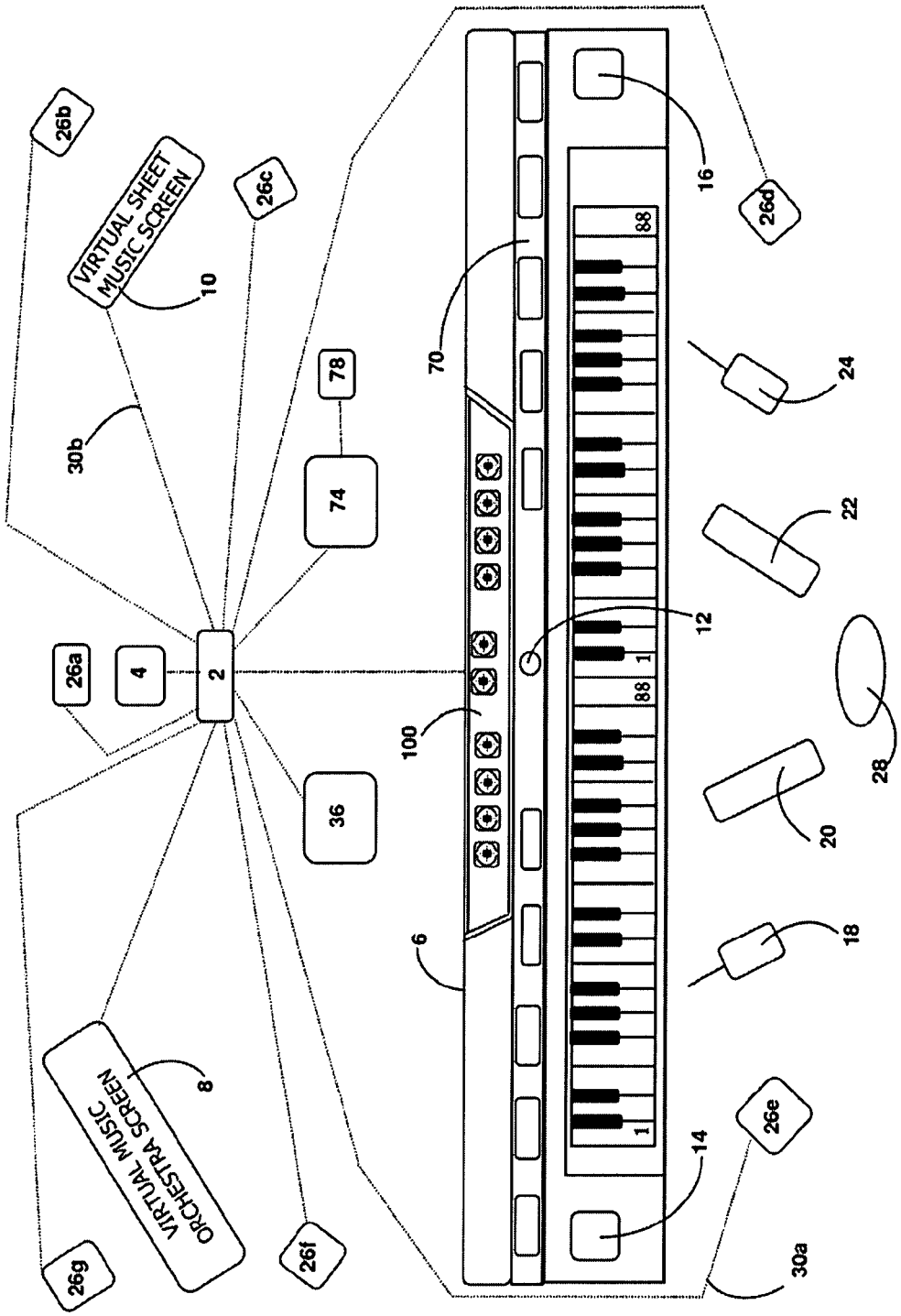
FIG. 1 shows a drawing of the fundamental design of the Virtual Reality Composer Platform (V.R.C.P.). Includes System Core 2, Sound Card Portal 4, Virtual Synthesizer 6, Interfaces 8 & 10, External Controllers 18, 20, 22, 24, 74 and 78, Surround Sound Speaker System 26a through to 26g.

The foregoing and other objects, aspects, uses and advantages of the present invention will be more fully understood from the following detailed description, when viewed in conjunction with the accompanying drawings in which:

FIG. 1 displays a drawing of all the components of the Virtual Reality Composer Platform (V.R.C.P.). All eleven parts of the fundamental design of the platform are essential to the operation of the entire system. These eleven parts outlined as; System Core 2, Virtual Music Orchestra Interface 8, Virtual Sheet Music Processor Interface 10, Acoustic Surround Sound Processor 32, Effects Processor 34, Hard-disk Mainframe 36, Virtual Synthesizer 6, Graphics Tablet Touch Screen Control Center 74, External Controllers 82, Instrument Category Select 70, and the Soundcard Portal 4 play important roles both individually and collectively in the function of the V.R.C.P.

Within FIG. 1 it can be viewed that the heart of the design is the System Core 2, where all other components are connected to it whether through an electronic, optical, digital or audio signal flow. To indicate this relationship a light dotted line 30a and 30b as examples are used, connecting all components in the preferred approach in the development of the design. The Acoustic Surround Sound Processor 32 is represented by speaker's 26a through 26g, which allow the user 28 to hear all music, composed within the V.R.C.P.S, inside a surround sound acoustical environment. Virtual Reality Interfaces 8 and 10 permit the user to see all music composed within the V.R.C.P., inside a two, three and four dimensional virtual reality environment. The User 28 has two methods of composing music within the V.R.C.P.S. The first is physically playing a musical instrument in the form of the Virtual Synthesizer 6 or utilizing the Optical Microphone 12 in combination with the Digital Stylus 78 to input data upon the Graphics Tablet 74. These two methods are used in conjunction with both processors 32 and 34, along with manipulation mechanisms in the form of a Vari-Dimensional Patch-bay 100 and external controllers 18, 20, 22, 24 and finally 138 which is not represented in FIG. 1. The Playback Mechanism 16 through touch sensitive technology, lets the user have basic recording console functions like Play, Record, Stop to name a few. All the data that is recorded by input/output means using the above components, are housed within the Hard-disk Mainframe 36 and then digitally encoded upon digitized storage mediums, like compact discs and digital versatile discs via optical drive 14.

Figure 2:
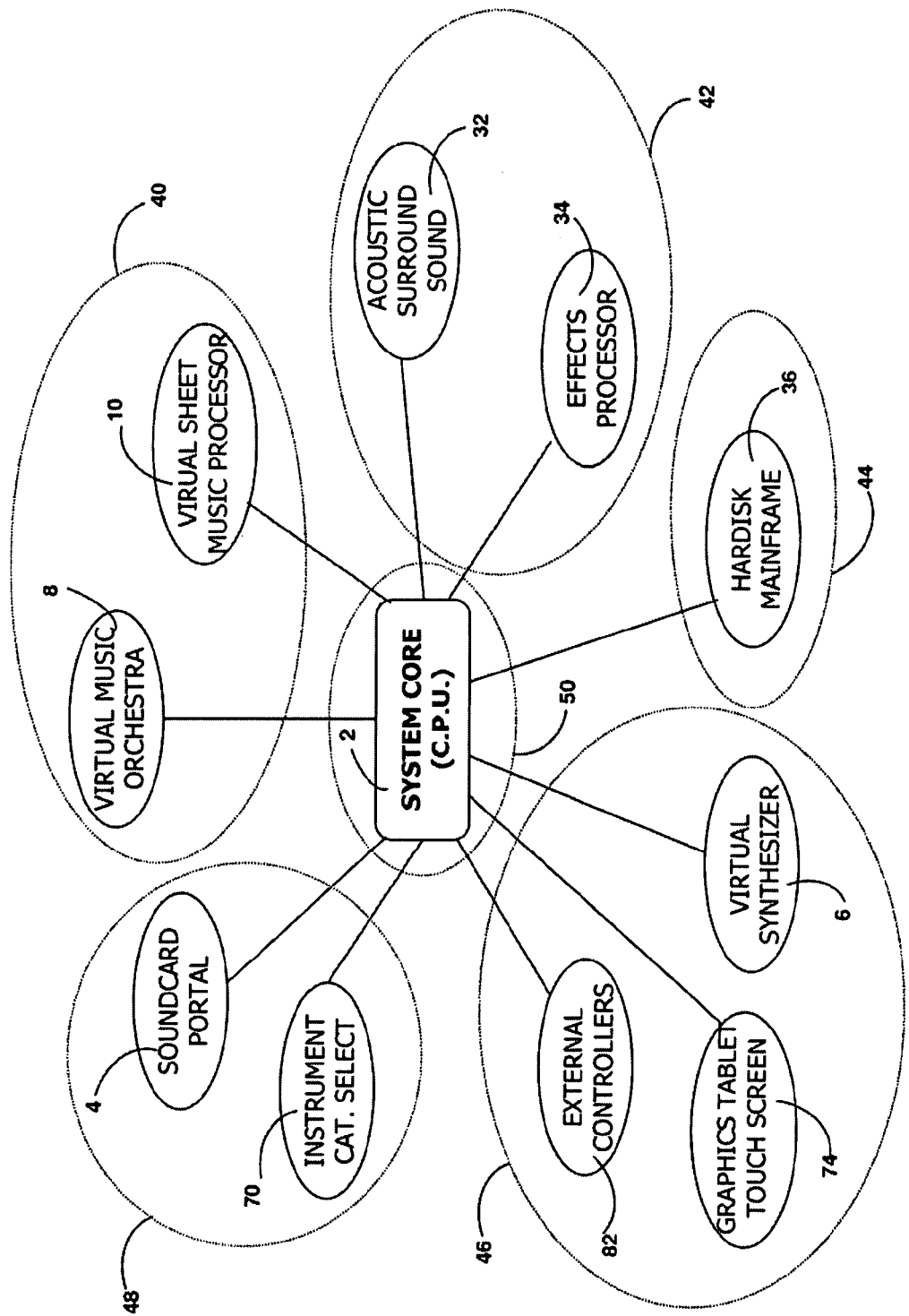
FIG. 2 shows a diagram of all main components of the (V.R.C.P.) which are: 2 categorized into 50; 4 and 10 categorized into 48; 8 and 10 categorized into 40; 32 and 34 categorized into 42; 36 categorized into 44; 6 and 82 categorized into 46.

In FIG. 2 the drawing displays how all the eleven parts of the V.R.C.P. can be categorized into six elements called Virtual Reality Interfaces Component Design 40, Acoustic Effects Component Design 42, Hard-disk Mainframe Component Design 44, External Controllers Component Design 46, Sound Component Design 48 and System Core & CPU Component Design 50. Each of these elements are divided to indicate their relevance and role within the V.R.C.P.

In FIG. 3 it outlines the Soundcard Portal 4 and how each Soundcard Slot 38*a* through to 38*j* represents a specific set of categorized sounds. These ten slots accept ten individual soundcards, whereby using the aspects of the embodiment outlined in U.S. application Ser. No. 11/016,438 musical instruments are divided accordingly. That is the 38*a* soundcard slot would accept a soundcard containing the complex sounds of Pianos, Keyboards, Organs, Harpsichords, Clavichords, Pianofortes, Pipe Organs and Synthesizers. The second soundcard slot 38*b* would accept a soundcard containing the complex sounds of Dulcimers, Vibraphones, Xylophones and Cimbaloms. The third 38*c* the complex sounds of Accordions. The fourth 38*d* the complex sounds of various Guitars (containing one to twelve Strings), Mandolins, Banjos and Sitars. The fifth 38*e* the complex sounds of Cellos, Violins, Violas, Double Bass, and Fiddles. The sixth 38*f* the complex sounds of Harps. The seventh 38*g* the complex sounds of Recorders, Flutes, Tin Whistles and Piccolos. The eight 38*h* the complex sounds of Clarinets, Bassoons, Bagpipes, Saxophones, Trumpets, Oboes, French Horns, Trombones, Baritone Horns and Tubas. The ninth 38*i* the complex sounds of a Standard Non Artificial Drum Kit and finally the tenth 38*j* the complex sounds of an Artificial Synthesized Drum Kit. Even though it has been indicated that there are ten separate soundcards, the possibility could be created where a manufacturer develops all this complex sound technology, on one or more soundcards rather than the ten specified within the drawing. This drawing is merely used as how the inventor would envisage sounds to be manufactured within the V.R.C.P.S, and how they are categorized.

Figure 4A:
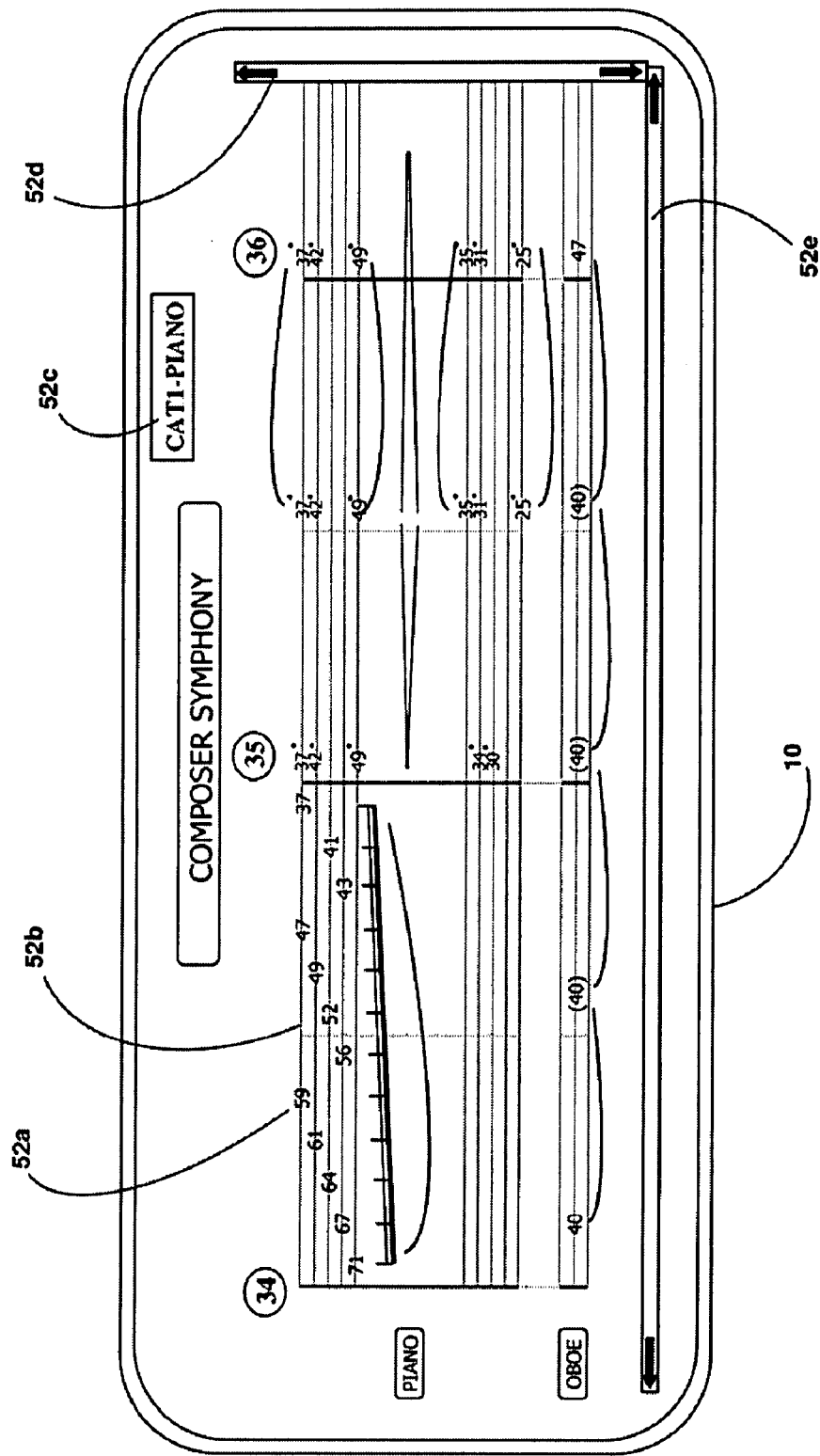
FIG. 4A shows a drawing of the Virtual Sheet Music Interface/Screen 10 which displays the specialized music notation within a virtual screen that can adapt to all notation system designs from the authors' U.S. application Ser. No. 11/016,438.

In FIG. 4A a detailed drawing is shown of the preferred embodiment of the new generation music notation system N.G.M.N.S., outlined in U.S. application Ser. No. 11/016, 438. The Virtual Sheet Music Processor Interface 10 gives an idea of how the N.G.M.N.S. would be displayed upon the interface. This interface would also integrate FIG. 17 and FIG. 18, in which the rhythm of music utilizing a color designation formula, indicates note value lengths and specific MIDI program messages utilizing the MIDI Interactive Formula, indicates specific parameters.

The value of 52*a* indicates the exact numeric value of a classical piano, so for example the numeric value fifty nine indicated in FIG. 4 designates the fifty ninth key on the classical piano. 52*b* references the Finger Coordination Structure of the embodiment of U.S. application Ser. No. 11/016,438 & PCT/US-07/12751, in which a specific alpha character is assigned to a specific finger of each hand namely for the Left Hand; A=pinkie finger, B=ring finger, C=middle finger, D=index finger, E=thumb and for the Right Hand; F=thumb, G=index finger, H=middle finger, I=ring finger J=pinkie finger. This alpha indicia can either be applied to silicone finger rings or hand configuration devices as discussed in the latter PCT application, which are utilized by the user 28, aiding with hand coordination for playing the Virtual Synthesizer 6. With 52*c* it indicates the instrument displayed and its N.G.M.N.S., in this case the notation design for a Piano. At 52*c*, the reverse could also be applicable, in which instead of the thumb representing the top horizontal line of the five lines within the upper clef of the stave as proposed within U.S. application Ser. No. 11/016,438, the thumb could be represented by the bottom horizontal line of the five lines within the upper clef of the stave. Both 52*d* and 52*e* allow the user to browse horizontally the bars of music and vertically each specific instruments N.G.M.N.S., in this case the design for the Oboe is shown.

In FIG. 4A a detailed drawing is shown of the preferred embodiment for representing the rhythm of music using a specific set of eight colors, referred to as the Color Designation Formula. In Conventional Notation the rhythm of music is indicated through the use of note values. A series of names are assigned to the eight basic note values of music. These eight values are:

Semibreve
Minim
Crotchet
Quaver
Semiquaver
Demisemiquaver
Hemidemisemiquaver
Semihemidemisemiquaver Each of these note names indicate a certain note length, that is: whole note, half note, quarter note, one eighth note, one sixteenth note, one thirty second note, one sixty fourth note and finally one hundred twenty eighth note respectively. The use of dots beside each of these note values, adds half as much again to the basic note's duration. For example: if the basic note lasts two beats, the corresponding dotted note lasts three beats.

Figure 4B:
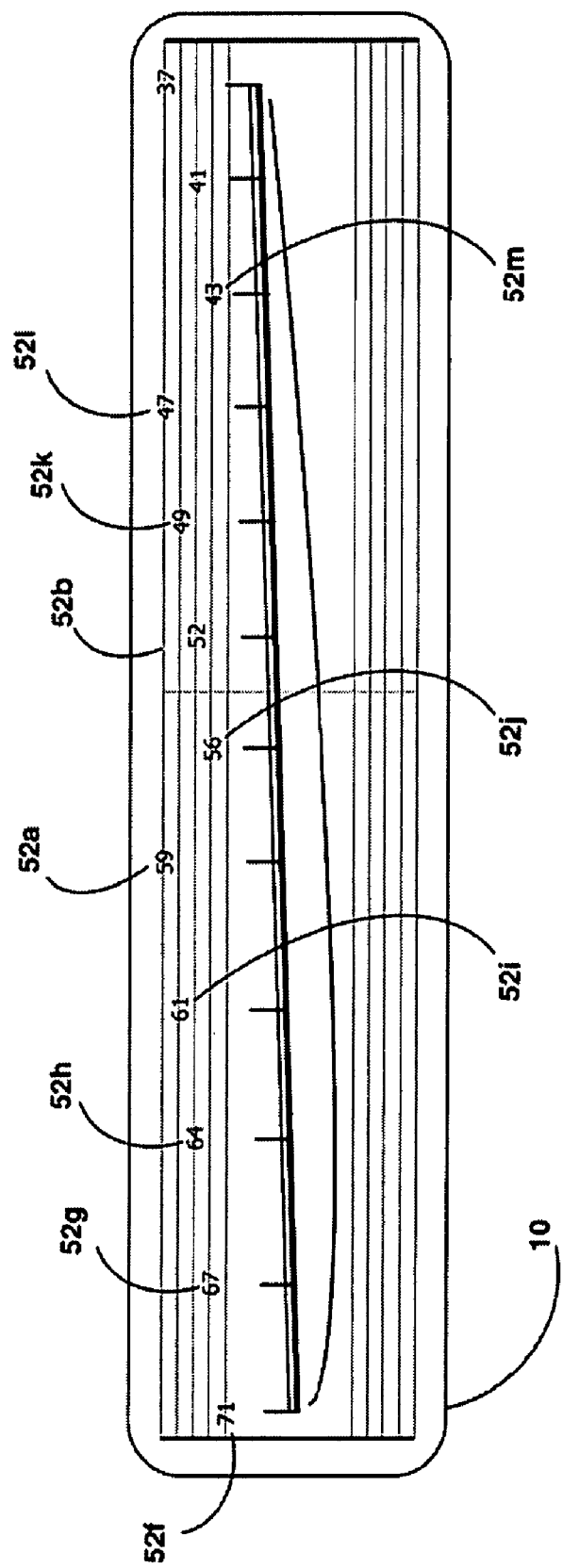
FIG. 4B is an inset of a specific part within FIG. 4A. The inset indicates how the Colour Designation Formula containing a set of eight colours applies to each numeric value within the interface display. For example 52f=the seventy first key of the classical piano is indicated with a Blue Font that represents a Semibreve. Following on 52g, 52h, 52i, 52j, 52k, 52l, and 52m each are assigned a specific font colour to indicate a certain note length with regards the rhythm of music.

Within the applicants new generation music notation system a set of eight specific colors are assigned to each of the above mentioned eight note values, as indicated in FIG. 4B. This will be referred for specifics as the Color Designation Formula. While a selection of eight colors are specified here within the application for this formula, it can be understood that any set of eight colors could be assigned to each of the eight note values. In this instance, the eight colors chosen are:

Blue=Semibreve
Brown=Minim
Black=Crotchet
Red=Quaver
Orange=Semiquaver
Green=Demisemiquaver
Purple=Hemidemisemiquaver
Pink=Semihemidemisemiquaver So the Middle C Note indicated by the numeric value forty using the fundamentals of U.S. application Ser. No. 11/016, 438 contains a Black Font. This would represent that Middle C Note indicating a Crotchet. Altering its color from Black to Blue would then represent this same numeric value of forty changing into a Semibreve. This additional area of the new generation music notation system is specifically for users who wish to have a full and comprehensive theory in music with regards to note values. For specifics within FIG. 4B the following is a breakdown of what each value represents:

$52f=71^{st}$ key on the piano/Blue/ indicates a Semibreve
$52g=67^{th}$ key on the piano/Brown/ indicates a Minim
$52h=64^{th}$ key on the piano/Black/ indicates a Crotchet
$52i=61^{st}$ key on the piano/Red/ indicates a Quaver
$52j=56^{th}$ key on the piano/Orange/ indicates a Semiquaver
$52k=49^{th}$ key on the piano/Green/ indicates a Demisemiquaver
$52l=47^{th}$ key on the piano/Purple/ indicates a Hemidemisemiquaver
$52m=43^{rd}$ key on the piano/Pink/ indicates a Semihemidemisemiquaver It is clear from the way the bar of music is displayed within FIG. 4B, that it does not literally represent the note values mentioned. This drawing is only a visual representation in that, all eight note values fall within the range of the one bar. For example in literal terms a semibreve last four counts and so on. For users who do not wish to have this detailed comprehensive indicator for the rhythm of music, a black font is used for all numeric values within the musical transcription.

This is because the Anubis Grid disclosed in U.S. application Ser. No. 11/016,438 and in PCT Application No. PCT/US-07/12751 that resides above the musical transcription, already indicates the basic timing of the music being played and can function without this Color Designation Formula for note values and their lengths. Within the Anubis Grid itself, the pulses of music are indicated by enlarging these dots that represent each beat within a bar of music. So for example to indicate a pulse for a time signature such as 4/4 time the first beat of the bar has an enlarged dot, while the other three beat indicators within the Anubis Grid have normal sized dot indicators.

In FIG. 5A the Virtual Music Orchestra Interface 8 is shown in which 54b indicates the acoustic surround sound environment in this case the Back Left Speaker. 54a and 54h represents Virtual Musicians at their default positional coordinates, with 54g on preprogrammed commands via the user 28 coming forward toward the center stage platform 54f, to perform the piece upon their instrument 54i which has been composed by the user 28. By using the Vertical Scroll Bar 54c the user 28 can select various floors of the theatre or arena, in which they can manipulate several different musical generic orchestras at once. By using the Horizontal Scroll Bar 54d the user 28 can zoom in or out from the perspective of the Virtual Music Orchestra Interface 8.

Figure 5B:
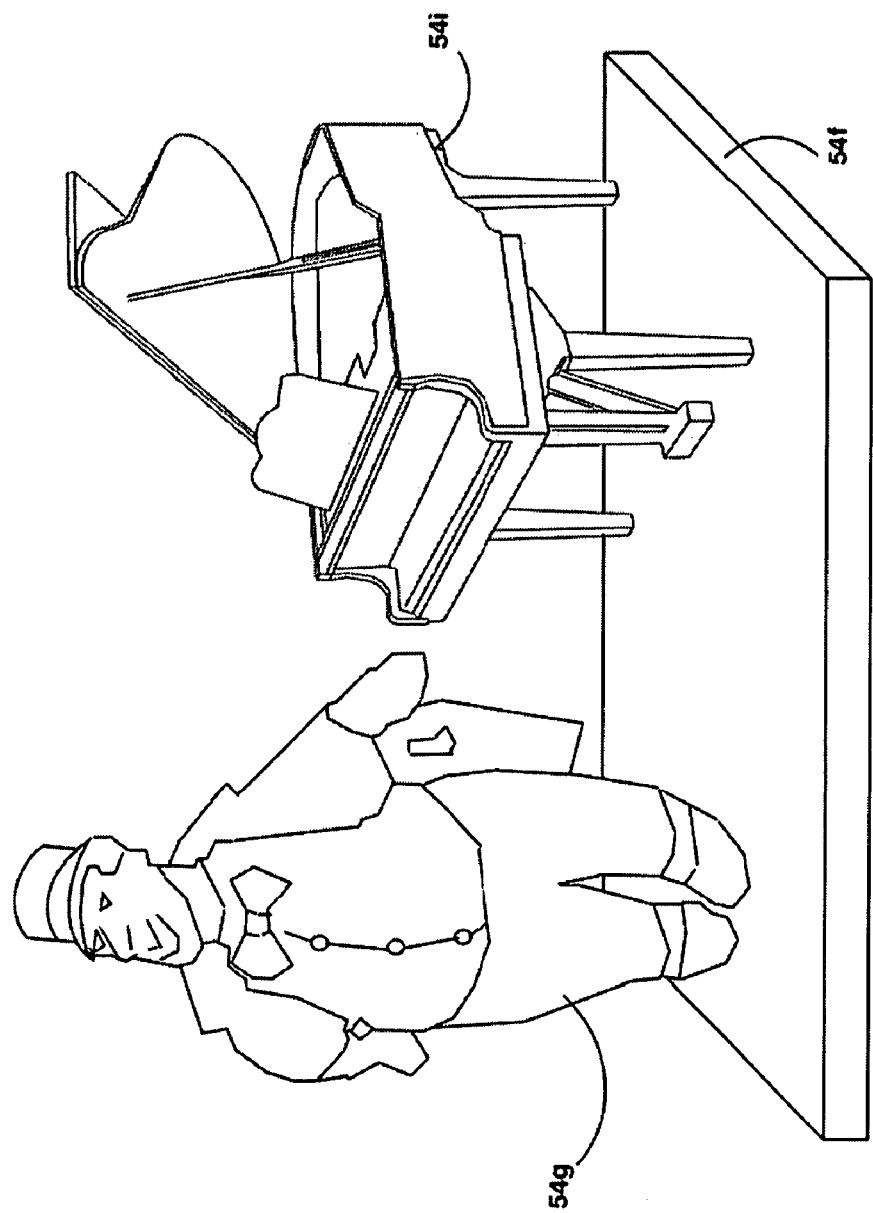
FIG. 5B shows an inset of FIG. 5A in which an example of a virtual musician is displayed. The virtual character 54g may mimic a cartoon character of a certain musician or alternatively an exact virtual likeness character could represent an individual musician within society. These characters 54g when commanded by the user 28 step forward and await instructions from the user 28 beside their musical instrument 54i. When ready the user 28 begins recording within the V.R.C.P. and upon the interface, the virtual musician 54g mimics exactly what the user is playing whether it be a violin or Pipe Organ. The detail expressed in these characters must be quite magnified with the user 28 being allowed to rotate the virtual reality view around the character. These virtual characters 54g place their fingers upon the exact notes or strings and frets, cover the holes and valves of a specific musical instrument where in the drawing the instrument is a classical piano 54i. Further advancement could be envisaged whereby the virtual character 54g begins to comment to the user 28 on the best approach for playing the phrase of music. These comments could be either pre-programmed or are part of the internal learning mechanism of the V.R.C.P.S.

In FIG. 5B the virtual musician is shown in some detail. The inset is taken from FIG. 5A. For specifics 54g is being used as an example of a virtual musician. The Virtual Musician is a character that is represented within the Virtual Music Orchestra Interface 8. Ideally it would resemble a character, depending on the size of the monitor of about one inch in height upon the interface 10. They would be attired in various outfits and clothes, from an assortment of musical backgrounds and eras and would also have detailed facial characteristics of musicians that lived, or are living today. They could also be represented with humorous facial and body characteristics. Depending on the technology available, these virtual musicians would each contain a certain characteristic that is applicable to them only and no other virtual musician, so a catalogue of virtual musicians could be created with unique characteristics. This could then crossover to the manufacture of unique characteristic merchandise, like dolls and toys for consumers that walk, talk and play instruments like they do within the Virtual Reality Composer Platform. Kids could learn from this type of merchandise, that is, learning what Wolfgang Mozart looked like, sounded like, played like and the list of musical samples of what he composed during his lifetime. It would be an ideal way of teaching kids about classical music and other music genres and their musicians. The characters 54g could also perform various dance moves upon 54f as they perform a piece of music. Uploads of various dance programs could allow the user 28 to physically see what a certain phrase of music would sound like with a certain dance move integrated with it.

The amount of research and development of each virtual musician is infinity, in which literally thousands of virtual musicians with their own unique characteristics could be developed within the Virtual Reality Composer Platform. Catalogue uploads of a set of Rock Musicians from a compact disc or other downloadable medium could be applicable, in which the Virtual Reality Composer Platform adapts to the musicians that are living today. Other humorous events could be uploaded, like if the user 28 requests one of the virtual musicians to come forward to the main stage area 54f, they refuse and throw their instrument upon the floor, and will not approach 54f, unless the user 28 requests in a nice and mannerly tone. Virtual Musicians could have certain characteristics, like as an example if a user 28 chooses a likeness of Ludwig van Beethoven, this specific character could have temperamental moods and only answers to polite requests or commands. This idea would be instrumental in teaching composers to respect the real musicians when they encounter them in a real life situation. A myriad of characteristics could be applicable with each and every virtual musician. It is more than obvious here, that the possibilities of this area of the Virtual Reality Composer Platform are endless.

Figure 6:
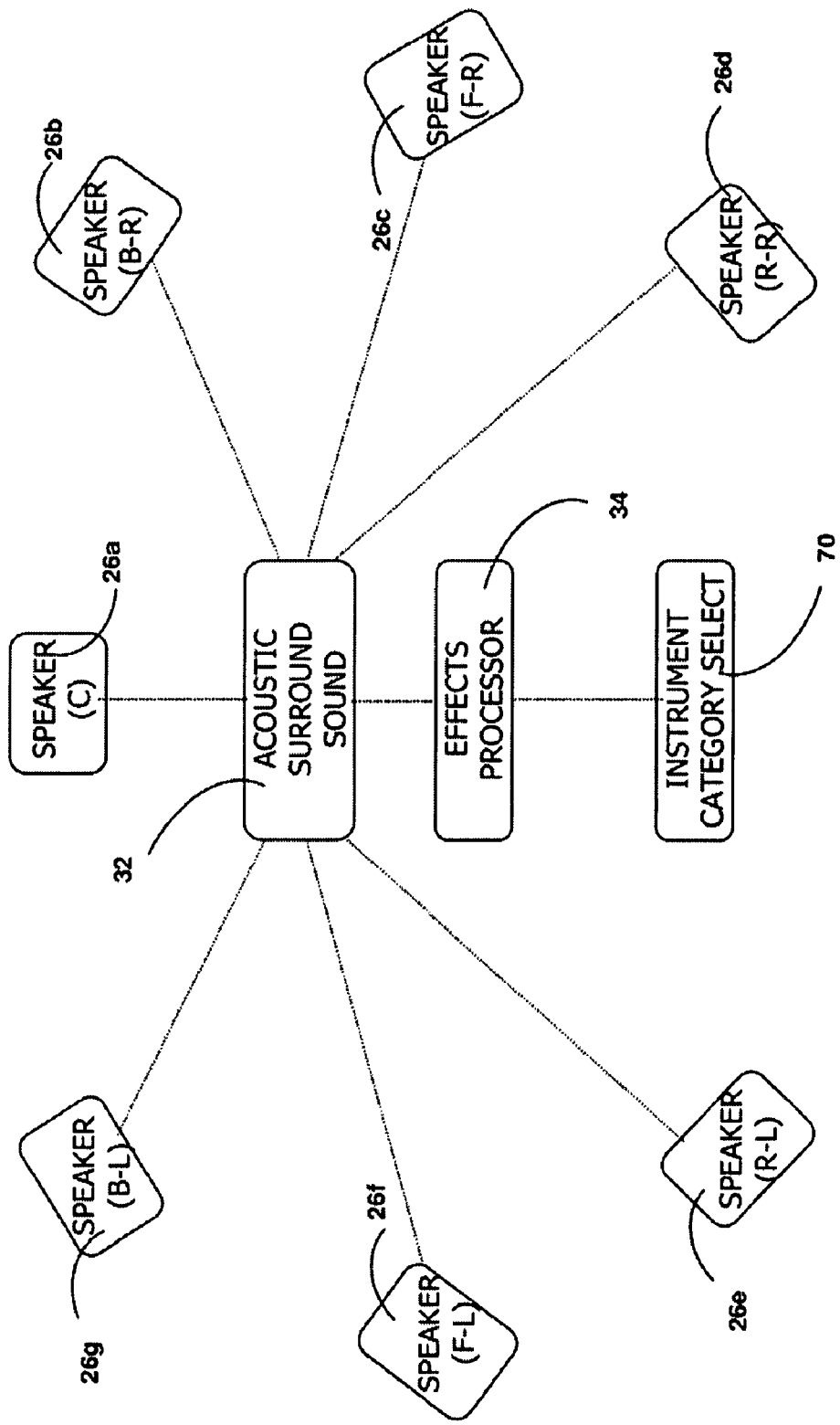
FIG. 6 shows relationship between the Acoustic Surround Sound Processor 32, the Effects Processor 34, the Instrument Category Select Processor and the Surround Sound Speaker System 26a, 28b, 28c, 28d, 28e, 28f, 28g.

In FIG. 6 is a representation of the acoustic environment on how each speaker is positioned within this environment. 26a through to 26g reference speakers that are placed around the user 28 for him or her to experience surround sound audibly. Various default environments could be selected by the user 28 within the Acoustic Surround Processor 32 and utilizing 34, other alterations of the complex waveforms recorded by the V.R.C.P. are possible. The Instrument Category select 70 is merely shown to indicate signal flow to and from the Virtual Synthesizer 6.

Figure 7A:
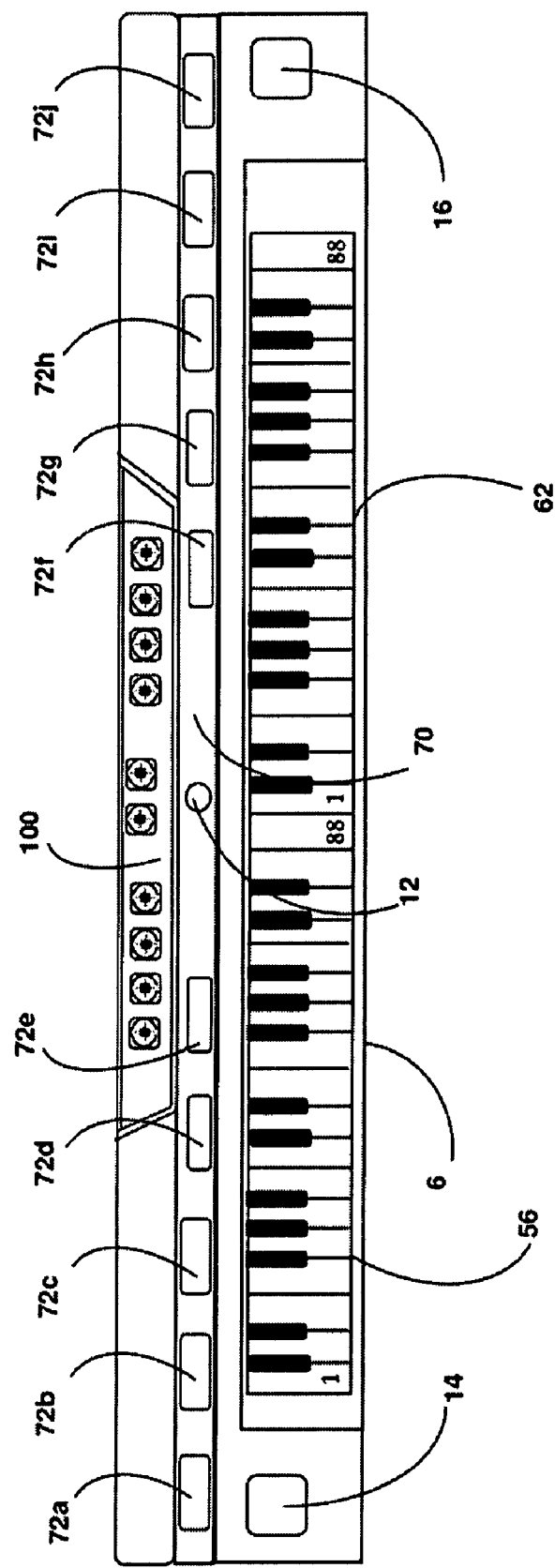
FIG. 7A shows a drawing of a new revolutionary Virtual Synthesizer 6 which has a one hundred and seventy six keys along with the Instrument Category Select Switches 10a, 10b, 10c, 10d, 10e, 10f, 10g, 10h, 10i, 10j which determine the specific instrument selected by the user 28 to compose music. Also shows the vari-dimensional controllers patch 100 which allow multi-directional variants of Pitch, Timbre, Harmonics, Loudness, Rhythm, Attack, Sustain, Decay, Speed to be applied to each musical instrument along with a Virtual Reality Main Menu Select for navigating around the Virtual Synthesizer 6. Other controllers 16 for Playback, Record, Stop etc and Optical Microphone 12 for communicating with Interfaces 8 and 10. Also shows the Record-able Medium slot for DVD-ROM or CD-ROM discs.

In FIG. 7A this drawing shows an image of the Virtual Synthesizer 6 which contains two adjoining keyboards, the Instrument Category Select Menu Buttons 72a through to 72j, the Optical Microphone 12 which allows the user 28 to interact with individual virtual musicians, or collectively if required. It also shows the Vari-Dimensional Patch-bay for Sound Components 100, which contain Hand Controllers. Also viewable is the Optical Disc Drive 14 for accepting CD/DVD record-able discs and storing vast amounts of data upon them in compressed formats if required.

Figure 7B:
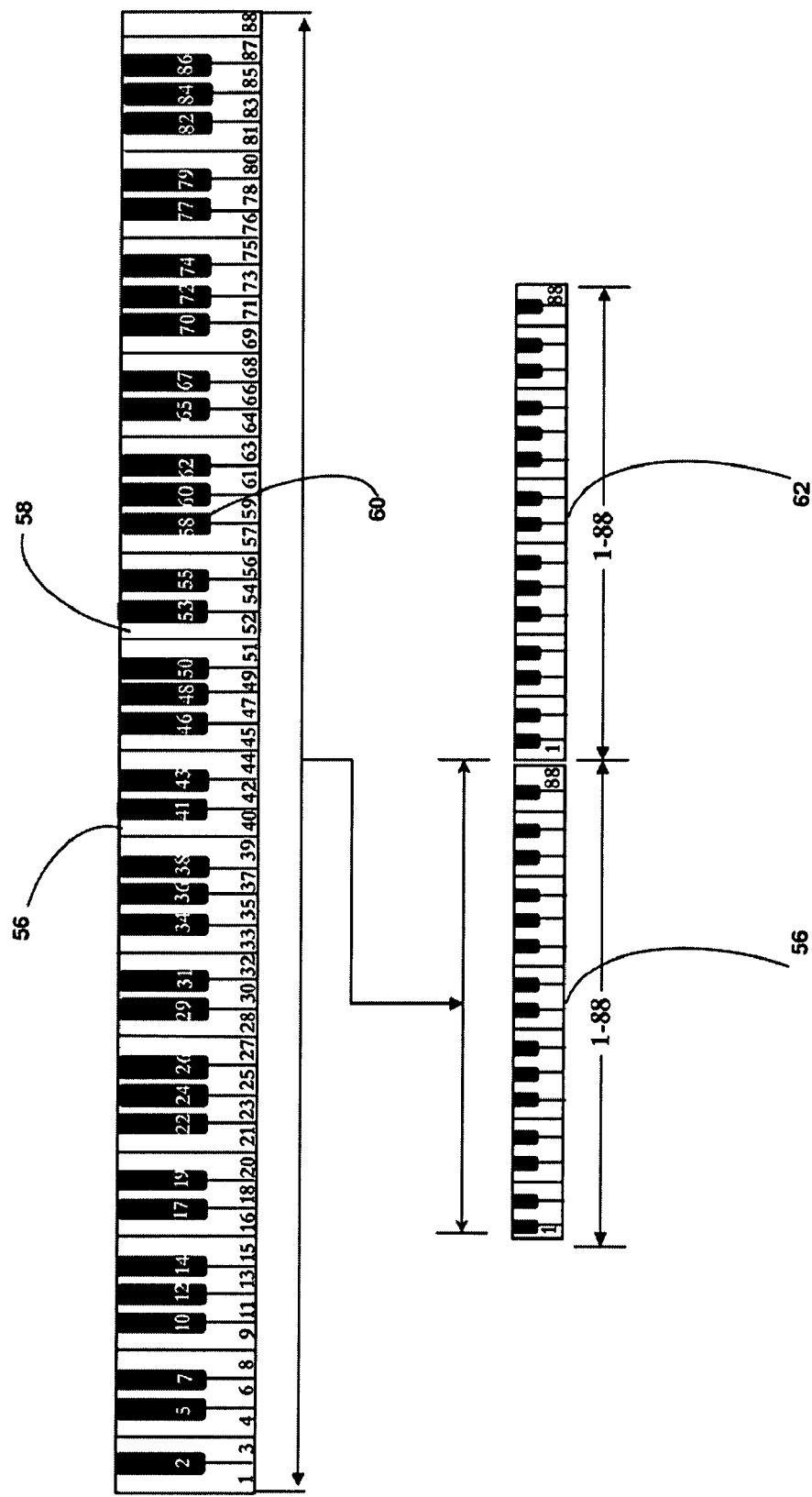
FIG. 7B shows the relationship between the authors U.S. application Ser. No. 11/016,438 fundamentals where each key is assigned a numeric value between one through eighty eight 56. A separate diagram within the FIG. 7B then shows how 56 relates to the exact position on the Synthesizer where 56 contains eighty eight keys and 62 contains eighty eight keys the latter representing the harmonics of various instruments.

In FIG. 7B it shows a full representation of the Virtual Synthesizer 6 and how it contains two separate adjoining keyboards 56 and 62. Within 62 a new set of fundamental frequencies would be developed that would include fundamental tones and two, three and fourth part harmonics of musical instruments. No gap separates the two keyboards. The user can begin at the first key of 56 and glide over every black and white key, up until the last key of 62 without obstruction. Additionally on the back of this Virtual Synthesizer 6 would be various outputs for breath controllers, MIDI IN, OUT and THRU, AC Current Input, Headphone Socket and other conventional synthesizer output and input connections. However, ideally it would be more beneficial if these were available within the housing of the Hardisk Mainframe 36.

Figure 7C:
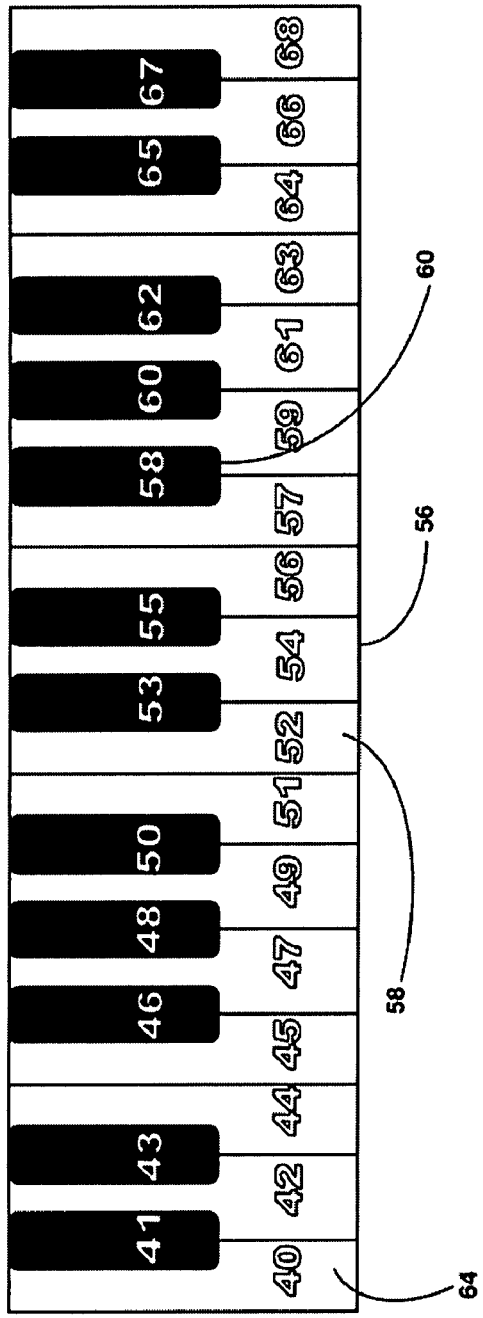
FIG. 7C shows a drawing of the keyboard 56 upon the Virtual Synthesizer 6 and indicates the Middle C Note 64 and other notes 58 and 60.

In FIG. 7C there is a drawing of a section of the keyboard 56, which indicates what the Virtual Synthesizer 6 would look like from above. In the drawing the Middle C Note 64 is the numeric value forty using the N.G.M.N.S. The C Note 58 an octave above the Middle C 64 is also shown, which is the numeric value fifty two using the N.G.M.N.S. 60 indicates the fifty eight key using the N.G.M.N.S. It can be seen that these numeric values whether marked with labels, or embossed, or indeed indicated with light emitting diodes upon the Virtual Synthesizer 6, these will aid the user 28 to find specific keys on the Virtual Synthesizer 6 and enable the user 28 to perform upon the Virtual Synthesizer 6, without ever having to read standard conventional sheet music.

Figure 7D:
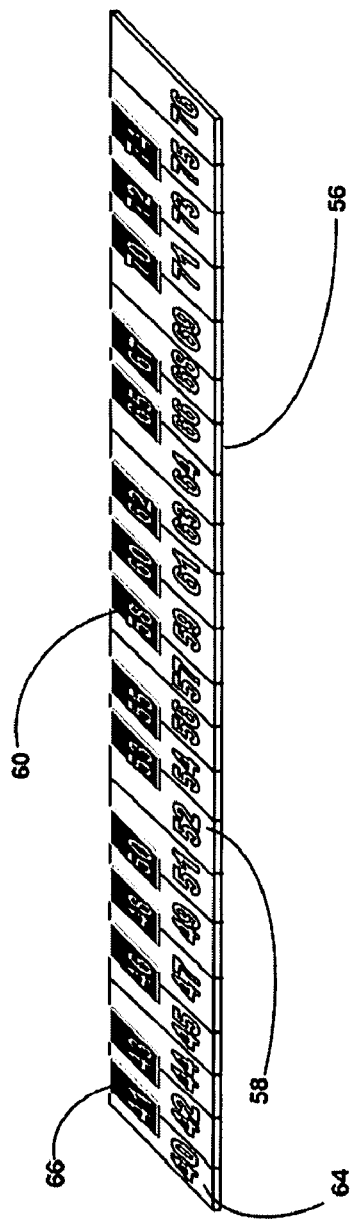
FIG. 7D shows a drawing of how the keyboard 56 differs from standard pianos in which the keys 58, 60 and 66 have no difference in height, meaning the user 28 can sweep across all keys on any part of the keys without obstruction.

In FIG. 7D a side view is shown of the virtual synthesizer keyboard 56 and how slim each key of the instrument actually is, with no visible difference in height between a white or black key. The notes 64, 66, 58, 60 indicated in FIG. 7C are displayed once again according to their position upon the keyboard 56.

Figure 7E:
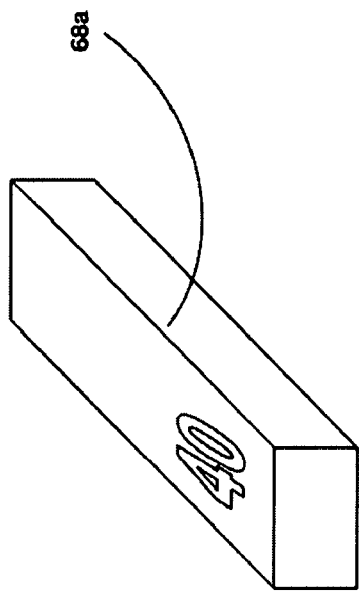
FIG. 7E shows a drawing of a standard classical piano key. The key shown is the Middle C Note 68a. The average measurement of a natural white standard key on a piano would be 140 mm length×20 mm width×10 mm height.

In FIG. 7E another side view is shown of a specific key 68a on a conventional classical piano, measurements of which have been detailed in earlier description of FIG. 7E.

Figure 7F:
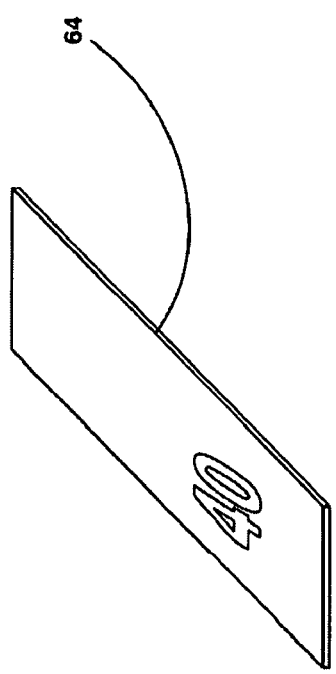
FIG. 7F shows a drawing of a key on the Virtual Synthesizer 6. This new designed key 64 would be 140 mm length×20 mm width×2 or 3 mm height. It could also have the numeric value embossed upon the key to inform the user of the specific key being depressed.

In FIG. 7F another side view is shown of a specific white key 64 on the Virtual Synthesizer 6 and the vast difference between its height and the height of its equivalent on a conventional classical piano. This slim measurement of the key allows the user 28 to glide over black and white keys without any obstruction.

In FIG. 7G another side view is shown of a black key 68b on a conventional classical piano of which have been detailed in earlier description of FIG. 7G.

In FIG. 7H another side view is shown of a specific black key 66 on the Virtual Synthesizer 6 and the vast difference between its height and the height of its equivalent on a conventional classical piano. This slim measurement of the key allows the user 28 to glide over black and white keys without any obstruction.

In FIG. 8A the drawing is of the Vari-Dimensional Patch-bay for Components of Sound 100. Inside this patch-bay 100 are a set of nine hand controllers that have a roller ball type mechanism, permitting variants to be applied to a sound or complex waveform. For example; with the Vari-Dimensional Hand Controller for Sustain 102g, a set of parameters could be created which are controlled by the roller ball mechanism of this hand controller. As the component of sustain implies, it denotes the period of time during which a sound is sustained before it becomes inaudible. Within a family of instruments, sustain is affected by a variety of factors. For example, sustain in guitars is determined by factors including body construction (hollow versus solid), body woods, the placing of strings (through the body or atop the body), and pickup design. In electric guitars and pianos, dedicated pedals are available that prolong the sustain-phase of a tone. The sustain pedal is the electronic equivalent of a piano's damper pedal. In most synthesizers, the sustain pedal latches the envelopes of any currently playing or subsequently played notes at their sustain levels, even if the keys are lifted. Its counterpart in synthesizers is achieved within the ADSR envelope.

The ADSR envelope is a component of many synthesizers, samplers, and other electronic musical instruments. Its function is to modulate some aspect of the instrument's sound, often its volume or other parameter over time. The envelope may be a discrete circuit or module in the case of analog devices, or implemented as part of the unit's software in the case of digital devices.

So in essence you could have a parameter for controlling the feedback of the sound, a parameter controlling the length of sustain and other parameters controlling how quick the sustain reaches inaudibility.

In FIG. 8B the Vari-Dimensional Hand Controllers 102a through 102i are displayed with only one shown 102g within this FIG. 8B. All nine of the Hand Controllers will look the same, but the roller mechanism 104 will control several variants of a component of sound, depending on which direction the mechanism is directed 106, that is forward, back, left or right. However, this does not limit the aspect of the controller, as it would be very easy for a manufacturer to add other directional variants to the controller if required, for example depressing the mechanism 104 with some pressure could permit the user 28 to enter a second set of parameters, maybe with more sensitivity or other parameters for specific instruments. Or even adding other directions that are applicable on a standard compass used by navigators at sea.

Figure 8C:
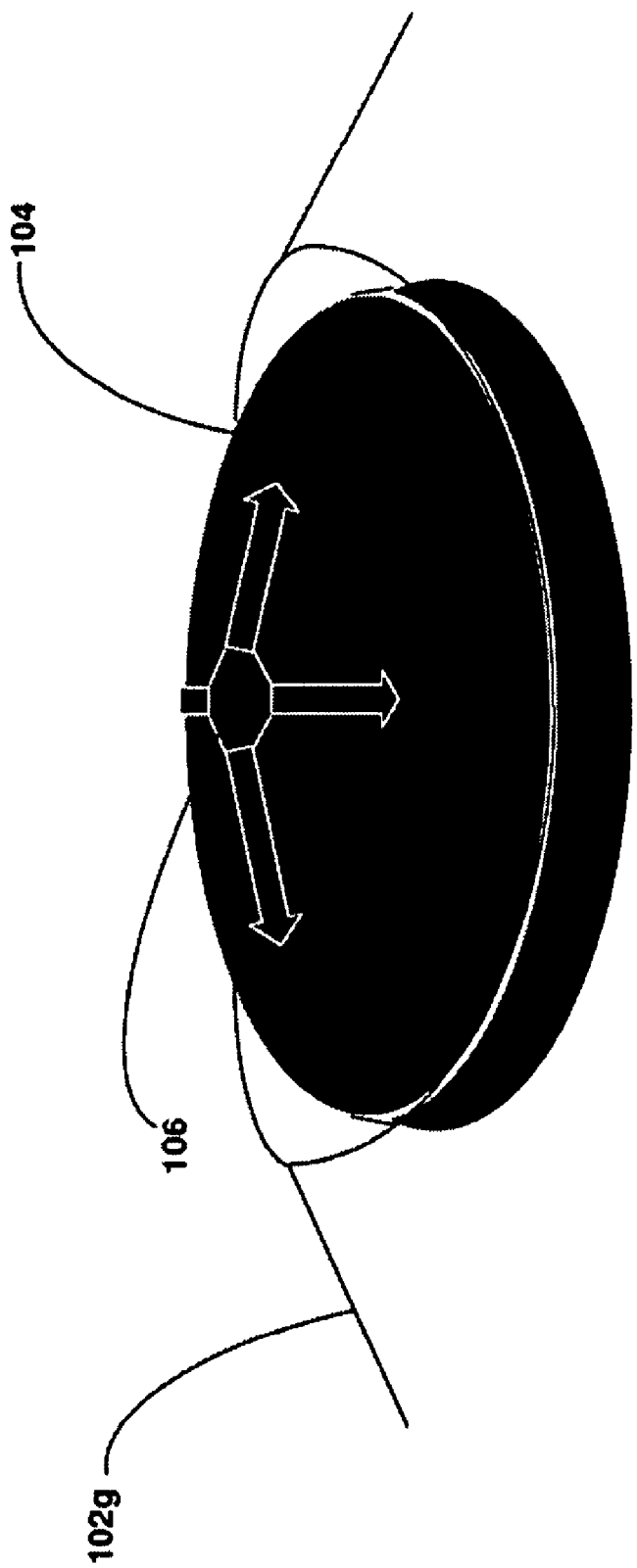
FIG. 8C shows an angled view of the multi directional variant 104. It can be seen that a roller mechanism is applicable, in which the user can manipulate the sound of an instrument by rolling forward, back, side to side as indicated by 106.

In FIG. 8C shows a side view of the Vari-Dimensional Hand Controller for Sustain 102g, in which it can be seen how the roller ball mechanism 104 is evident with a semi circular molded shape, along with the multi-directional indicator 106 atop the mechanism 104. All these hand controllers would have a dimension or measurement diameter to accommodate the size of an adult hand, in which the palm of the hand is placed. Alternatively, it could accommodate say three fingers of the hand with embossed ridges to indicate to the user 28 where to place their fingers.

In FIG. 9A a diagram is shown of the Playback Mechanism 16 that is on the right side of the Virtual Synthesizer 6. This device allows a user to place the fingers of their right hand into the specific slots 112a, 112b, 112c, 112d and 112e which are allocated to each of the five fingers of the right hand. These slots control basic recording console functions of Record, Rewind/Fast Rewind, Play/Pause, Forward/Fast Forward and Stop respectively. At position 108 this would be an area where the palm of the right hand would rest. This Playback Mechanism 16 is directly linked to the control of the composers music, permitting them to analyze the recorded music in great detail whether they wish to perform a playback function, record function or just stop the composition playback, that is being displayed in both interfaces 8 and 10 and heard through the surround sound speaker system 26a through to 26g. It is obvious that if this Playback Mechanism 16 were on the left hand side of the Virtual Synthesizer 6 the left hand rather than the right hand would be depressing the sensors for this Playback Mechanism 16. This mechanism 16 could also be on the surface on the Virtual Synthesizer 6 within arms reach of the user 28.

Figure 9B:
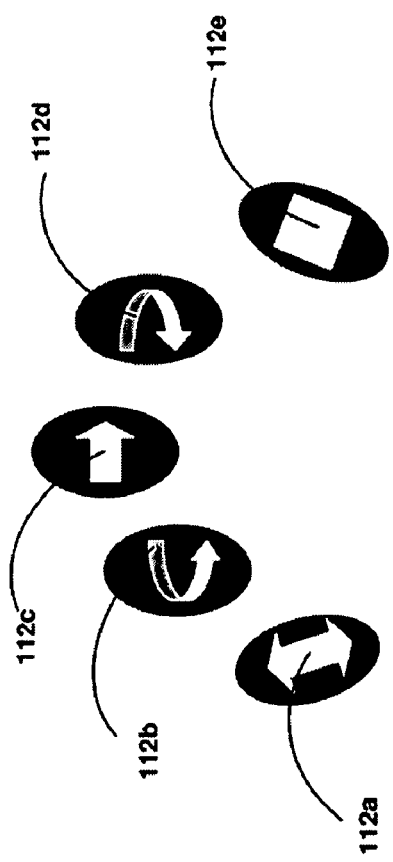
FIG. 9B shows a representation of what each of these slots control where 112a if depressed by the user 28 would control Record, 112b if depressed would control Rewind and Fast Rewind, 112c if depressed would control Play/Pause, 112d if depressed would control Forward and Fast Forward and 112e if depressed would control Stop.

In FIG. 9B shows an inset of the five functions available to the user 28 using the Playback Mechanism 16. Each of the five fingers of the Right Hand when placed within the slots of 16 sit atop small touch sensors that when depressed perform a certain function, whether it be Record 112a, Rewind/Fast Rewind 112h, Play/Pause 112c, Forward/Fast Forward 112d, Stop 112e.

Figure 9C:
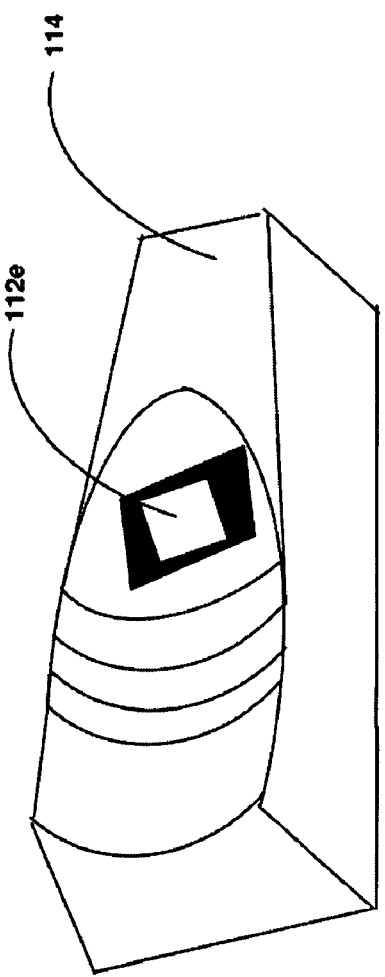
FIG. 9C shows a closer view of the mechanism for the Stop Button 112e. A user 28 would place their finger within this area and by applying pressure to 112e a response would occur upon the Playback mechanism 108.

In FIG. 9C a further close-up of this mechanism 16 is shown, in this example it represents the Finger Sensor Holder 114 for the Stop Sensor Function 112e. When the user 28 wishes to stop the playback or record of his/her music, they simply place their right hand within this mechanism 16 and depress the touch sensor 112e to initialize the stop function.

Figure 10:
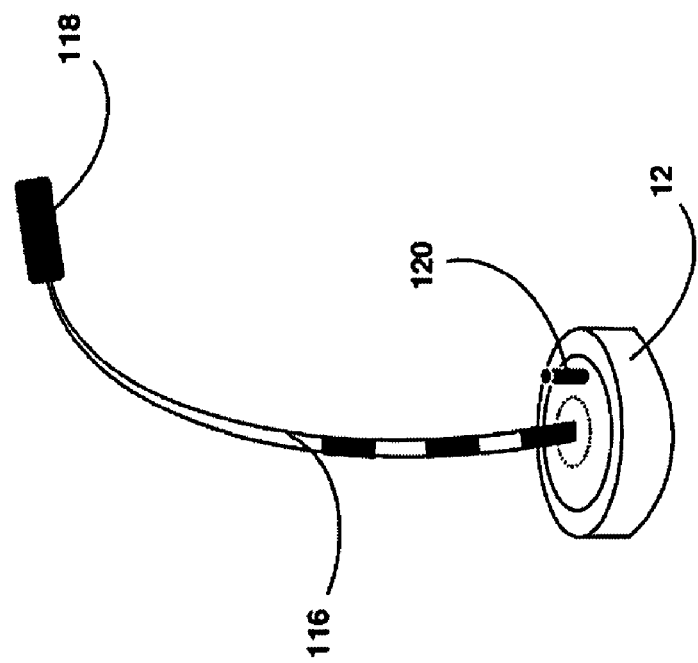
FIG. 10 shows a drawing of the Optical Microphone 12 which allows direct communication with all the characters or virtual musicians 54a, 54g, 54h as examples shown in FIG. 5. The user 28 depresses 120 which opens a channel to the virtual musician and according to commands requested by the user, obeys what is required in the creation of music and composition. 116 is a flexible area of the Optical Microphone 12, so it could be maneuvered to best suit the user 28.

In FIG. 10 it shows a drawing of the Optical Microphone 12. This device allows the user 28 to communicate with all a virtual orchestral musicians, a section of the virtual orchestra and its musicians, or an individual virtual musician at work within the Virtual Music Orchestra Interface 8. Communication is done by the user 28 speaking into the microphone sensor 118, in which the adjustable arm or flexible support 116 permits the user to adjust the microphone to the correct and comfortable height they wish it to be at. In theory what occurs, is that the user 28 depresses the Mike On/Off Switch 120, speaks a certain preprogrammed command into the microphone sensor 118 and the virtual musician for example 54g performs the command requested. For user friendly compatibility a set of preprogrammed commands are created by the manufacturer transcribed into a booklet, or displayed within a section menu upon the interface 8, which allows the user 28 to see what preprogrammed commands are available. A more advanced approach is that the V.R.C.P. becomes or contains a learning platform with an intelli-brain, in which it can learn new commands either typed into the V.R.C.P via the Graphics Tablet 74, or uploaded by additional software discs created by the manufacturer. A myriad of commands could be created which allows the user 28 to interact via voice recognition technology with thousands of virtual musicians inside the V.R.C.P.

In FIG. 11 it shows a view of the two external foot pedals one for the left foot 20 of the user 28 and one for the right foot 22 of the user 28. These External Foot Pedals are connected to either the Virtual Synthesizer 6, Hardisk Mainframe 36 or other input ports within the V.R.C.P. Within each pedal will contain an LCD screen 122a and 124a, which display various menu screens or parameters, so the user 28 can select from a variety of controllers which can be assigned to the multi-directional points 122b and 124b of both pedals. In theory, the user 28 places both the left foot and right foot upon both pedals 20 and 22 respectively. Both feet are placed upon the area 122c and 124c and using various angles after preprogrammed selections have been assigned to each of the four directions of both pedals, the user 28 depresses the foot in the directions required 122b, 124b to manipulate the requested command. These preprogrammed selections could be affecting the sound of a certain instrument, controlling other external pedals or controllers like effects pedals or keyboards, or affecting MIDI commands. Indeed they could also duplicate the Playback Mechanism 16 functions or maybe an external analog or digital tape machine like a reel-to-reel or DAT storage medium. Once again, the possibilities mentioned here should in no way constrict the amount of controllers, or other functions that could be created by a manufacturer within this field.

In FIG. 12 a drawing displays the two Optical Mouse Controllers 18 and 24, in which the Left Hand of the user 28 operates 18 and the Right Hand operates 24. Within each of these mice 18 and 24 are three menu buttons on the surface of each of the mice. Within 18 you have Type I Optical Mouse Controller Page Left Click Area 126, Type I Optical Mouse Controller Page Right Click Area 128, Type I Optical Mouse Controller Lock Area 130. Within 24 you have Type II Optical Mouse Controller Menu Scroll Click Area 132, Type II Optical Mouse Controller Grid Select Click Area 134, Type II Optical Mouse Controller Select Value Click Area 136.

Each set of the three functions on both mice 18 and 24 control various parameters within the V.R.C.P.S. Even though the Graphics Tablet 74 will be able to perform many functions, it is always advisable with modern technology to permit a user 28 to avail of these same functions by other means or devices, in that one user might find using a specific device easier than say another user. 126 allows the user to scroll pages to the left from interfaces 8 and 10 or scroll pages to the right using 128. After browsing the user 28 can use the lock function 130 which prevents the interfaces from changing the view selected. With 132 this permits the user 28 to select various menu screens within both interfaces 8 and 10. With 134 it permits the user 28 to select from various grid systems of timing signatures applied to either interface 8 and 10 and then on selection the user 28 selects a certain value or range or menu screen by depressing 136. A host of functions could be developed for both controllers 18 and 24 and with what's disclosed here, should not be seen in a limiting sense as to what could be developed.

In FIG. 13 a Joystick Controller for Visually impaired Users 138 is shown. However, it must be said that if it were applicable, this type of controller could be used for the general public with sight, duplicating the functions of the mice controllers 18 and 24. This maybe more advantageous and popular with young children and adults alike, especially with the popularity of game consoles like Nintendo and X-Box by Microsoft. This Joystick Controller 138 is a controller for visually impaired users within the Virtual Reality environment, in which clicks or pulses are assigned to the controller 138 within its origin fulcrum mechanism 140d. Its concept gives the visually impaired the ability to manipulate the music they compose, in which the Graphics Tablet 74 along with its Digital Stylus 78 would contain embodiment to allow visually impaired users to operate these devices, whether through the use of sound via clicks or pulses, or through embossed Braille characters or symbols anywhere upon the V.R.C.P. Because the entire fundamental of this N.G.M.N.S. outlined for the first time in U.S. application Ser. No. 11/016,438 has the concept of the visually impaired at its roots, everything disclosed within this application that accommodates the average public, should be developed for the visually impaired and the deaf also.

Music is an attribute that does not require our eyes or ears to experience it and the power of the sensory nerves of both the ears and the eyes are unprecedented and not yet appreciated or understood in modern society scientifically or in general. When a human being is at a loss of one of these senses, the other compensates at a dramatic level. One of the greatest composers in music history was Ludwig van Beethoven and despite gradual hearing loss beginning in his twenties, Beethoven continued to produce notable masterpieces throughout his life, even when he was totally deaf. Andrea Bocelli is an Italian singer, a writer and a music producer. He is both an operatic tenor and a classical crossover singer. To date, he has recorded six complete operas, in addition to various classical and pop albums. Bocelli has congenital glaucoma and is visually impaired, but can play the classical piano at a very high standard. This is undeniable proof that users, who are deaf or visually impaired, have the potential to be masterful composers and this is what the V.R.C.P. should accommodate.

This Joystick Controller 138 would have several functions, duplicating all the functions of the two mice controllers 18 and 24 within the points 140a, 140b and 140c. A second Joystick if required could duplicate other functions, in which the user 28 is operating with the Left Hand one of the Joystick Controllers and with the Right Hand another Joystick Controller. Alternatively, manufacturers could develop one joystick controller that would harness the entire embodiment disclosed here.

Figure 14A:
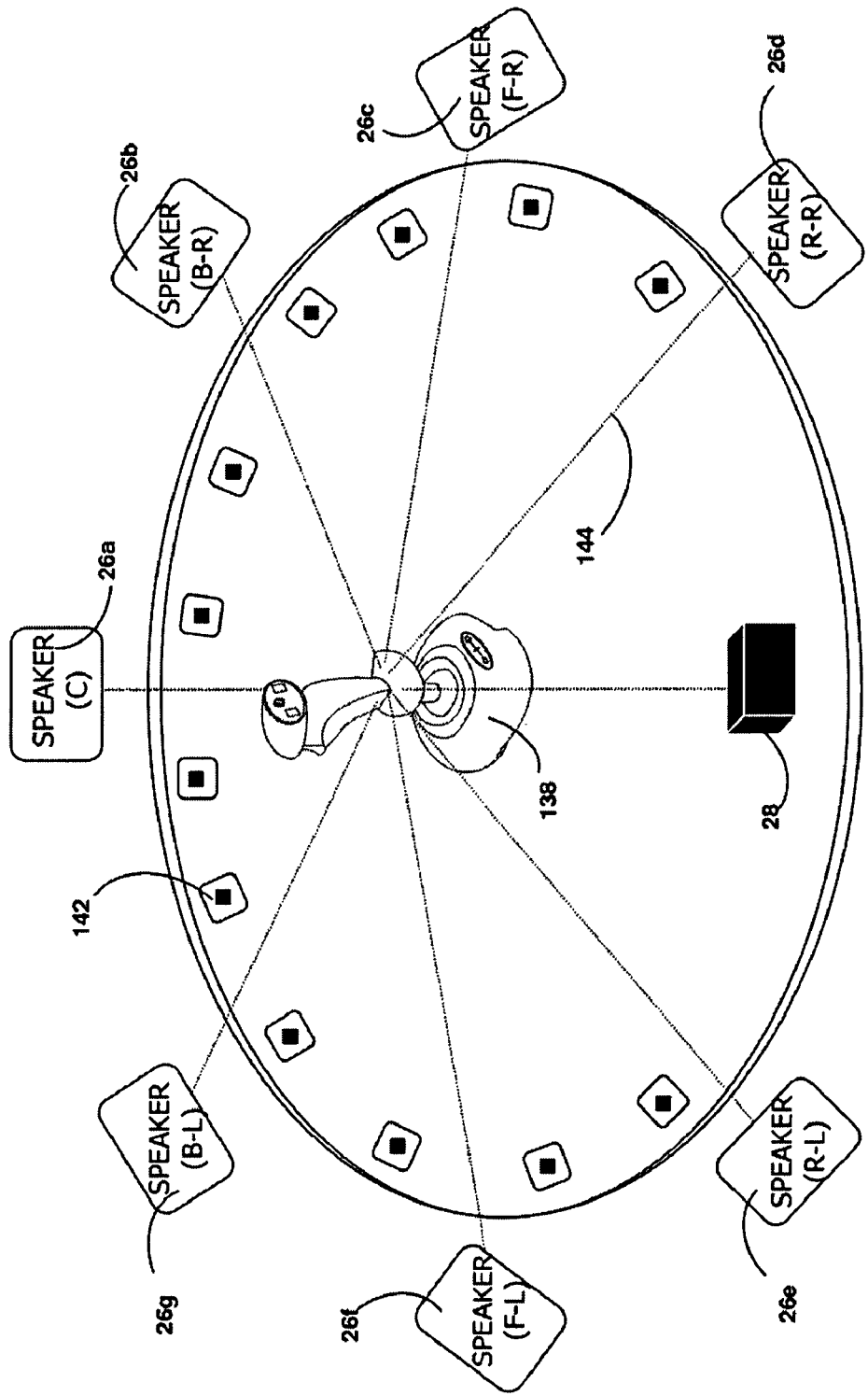
FIG. 14A shows a Virtual drawing of how the Joystick controls operate in different virtual directions. This allows the User 28 to select a virtual musician within a specific orchestra by using a click mechanism within the fulcrum 140d of the joystick 138. It would enable a visually impaired individual through touch, to navigate within the Virtual Reality environment coordinates 142.

In FIG. 14A a diagram is shown of how the Joystick Controller 138 functions within the virtual reality experience, that is the fundamental of the V.R.C.P.S. The Joystick Controller 138 would have two main functions:

To manipulate the virtual musicians within the Virtual Music Orchestra Interface 8 around the acoustical surround sound environment, that is 26a through to 26g, And replicating the functions performed by the mice controllers 18 and 24.

However, it must be stressed that what is disclosed here within this application, should not be seen in a limiting sense as this Joystick Controller 138 could control a myriad of other functions and could duplicate the functions of other devices like the Playback Mechanism 16, or functions inputted into the Graphics Tablet 74 via the Digital Stylus 78, or further again affecting and manipulating the sounds and complex waveforms of music recorded into the V.R.C.P.S. These are just a few mentioned, in which further advancements would become obvious accordingly as a manufacturer would be in the development of the V.R.C.P., and all its components and characteristics. If some of the functions can be performed by other devices within the system, it would be in the manufacturers' interest to narrow the amount of devices in order to build a cost effective design. The line 144 is a Virtual Representation Signal Flow Coordinate that informs the examiner of the signal flow to and from the Joystick Controller 138 around the virtual reality two, three and four dimensional environment. 142 represents a specific positional coordinate within this environment and indicates a minus two click or pulse direction, from the default horizon of the fulcrum 140d of the Joystick Controller 138.

Figure 14B:
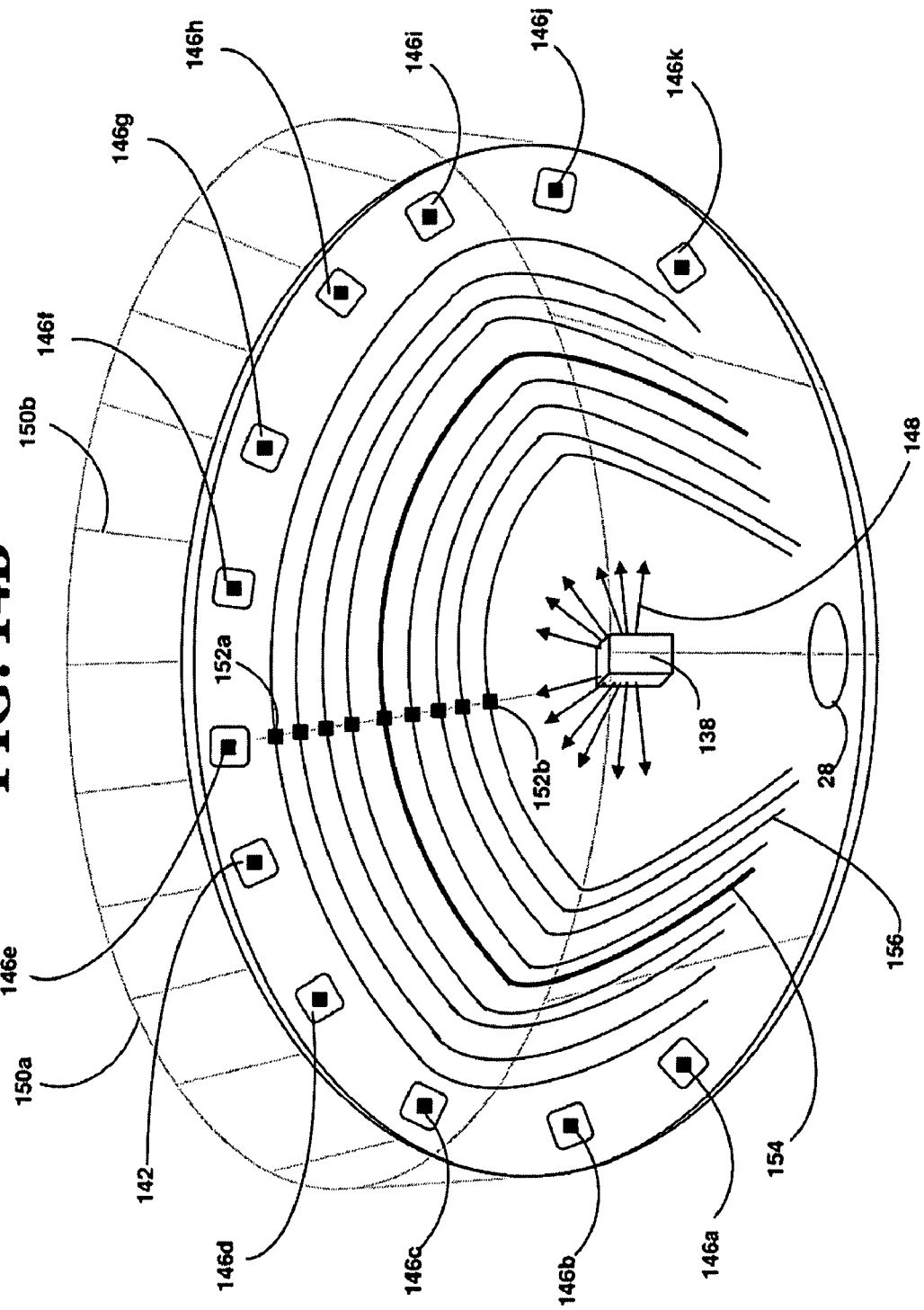
FIG. 14B shows a virtual drawing of the user 28 positioned within the Virtual Reality environment of an orchestra. An analogy of the drawing would be if one can imagine a Greek Coliseum where the spectators 152a are seated in rows 154, 156 and depending on where the user 28 wishes to go, using the origin 154 as the horizon or default position, the joystick 138 is used to direct 148 to the twelve different coordinates 146a, 146b, 146c, 146d, 142, 146e, 146f, 146g, 146h, 146i, 146j, 146k via the joystick. 150a and 150b are imaginary lines that enable the examiner to have a visual of the virtual reality environment, being proposed by the author.

In FIG. 14B it displays a further inset view of what is being considered within this virtual reality environment and how a specific controller, not necessarily a Joystick could be manufactured that would obtain the same results proposed within this concept of the design. Both 150a and 150b are merely 3D Help indicators that inform the examiner of the perspective within the drawing and are just shown for visual purposes only. The concept should be seen as taking the shape and look of a theatre, arena or indeed a Greek Coliseum. The default centre point at which the joystick 138 rests at, is indicated at 154. This can be considered the horizon 138 where the fulcrum 140d is untouched by the user 28. Around the circumference of this virtual reality environment are positional coordinates 146a, 146b, 146c, 146d, 142, 146e, 146f, 146g, 146h, 146i, 146j and 146k.

These represent specific points of reference around the virtual environment much like the basic coordinates of conventional compass points with varying degrees like North=0.00°, North by east=11.25°, North-north-east=22.50°, Northeast by north=33.75°, Northeast=45.00°, Northeast by east=56.25°, East-northeast=67.50°, East by north=78.75°, East=90.00°, East by south=101.25°, East-southeast=112.50°, Southeast by east=123.75°, Southeast=135.00°, Southeast by south=146.25°, South-southeast=157.50°, South by east=168.75°, South=180.00°, South by west=191.25°, South-southwest=202.50°, Southwest by south=213.75°, Southwest=225.00°, Southwest by west=236.25°, West-southwest=247.50°, West by south=258.75°, West=270.00°, West by north=281.25°, West-northwest=292.50°, Northwest by west=303.75°, Northwest=315.00°, Northwest by north=326.25°, North-northwest=337.50° and North by west=348.75°.

While Virtual Reality is the main fundamental concept of this application, the possibility of a Simulated Reality concept could be developed using the design of this V.R.C.P. Simulated Reality centres around the idea that reality could be simulated, that is or not limited to computer-simulation, to a degree that its indistinguishable from true reality. Simulated Reality differs from Virtual Reality in that a virtual reality is easily distinguished from the true or physical reality around us. Depending on technological advancements, the V.R.C.P. technology could be altered to accommodate the simulated reality concept and is more than possible.

If the default coordinate can be considered the horizon of 138 at point 154, where the fulcrum 140d is untouched by the user 28, then pushing the joystick 138 forward, will lead the user into a forward or plus click access point, that is—point coordinate 152a. Releasing the hand from the Joystick 138 permits the joystick to return automatically to the default horizon point of 154. If the user 28 then pulls the joystick 138 toward them, it will lead the user into a backward or minus click access point, that is—point coordinate 152b. While only six point coordinates 146a, 146b, 146c, 146d, 142, 146e, are displayed to the left of the virtual reality environment and further six point coordinates 146f, 146g, 146h, 146i, 146j, 146k are displayed to the right of the virtual reality environment, it can be clearly understood that using the entire set of compass points mentioned above for a standard compass, a new set of coordinates could be created for this concept, with varying degrees allowing selection of many virtual musicians 54a as an example, within the virtual reality orchestral environment.

Figure 14C:
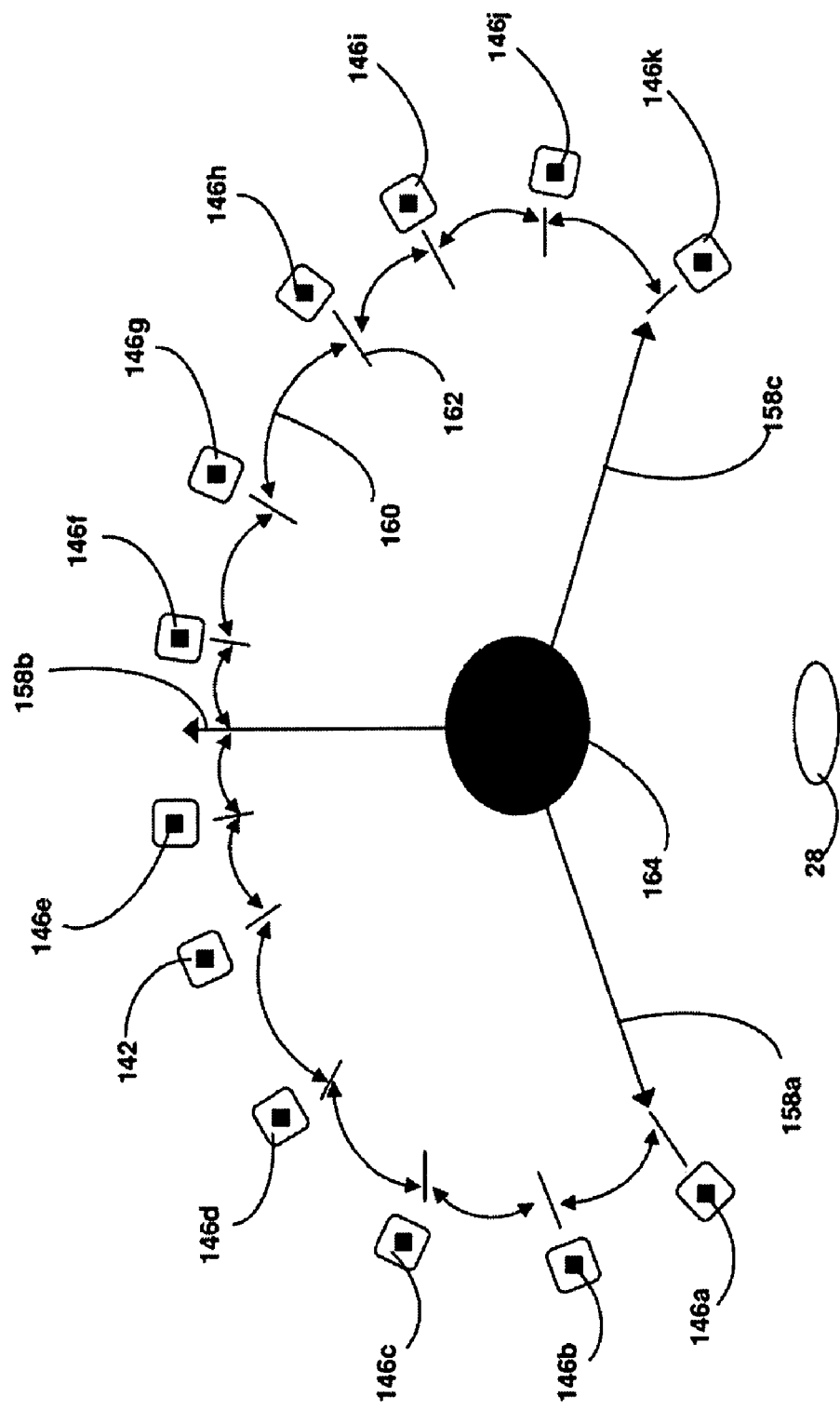
FIG. 14C shows a drawing of how the click mechanism would operate within the fulcrum 140d of the Joystick 138. 162 represents the click point on the joystick and 160 indicates the area before a subsequent click is heard by the user 28. 164 indicates the centre fulcrum of the joystick while 158a, 158b and 158c represent the maximum rotation left point, the default centre point and the maximum rotation right point respectively.

In FIG. 14C is an inset of how the click mechanism would operate within the fulcrum 140d of the Joystick 138. A view from above indicates point 164 as the Joystick Source or Origin Point, that is the default horizon point 154 mentioned in FIG. 14B, except we are now looking down upon the virtual environment rather than looking from a side view as is FIG. 14B. Points 158a, 158b and 158c are maximum points that the joystick can be turned within a rotational axis from the fulcrum 140d. So turning the Joystick to the Left would reach a maximum point at 158a, the centre point at 158b and turning the joystick to the right would reach maximum point at 158c. Each time the Joystick 138 is turned within this rotational axis a click or pulse is heard between points 160 to 162. These are just used as an example, in which turning the joystick 138 at all interval points, would initiate a click or pulse to inform the user of coordinate maneuverability around the rotational axis. The twelve positional coordinate points 146a, 146b, 146c, 146d, 142, 146e, 146f, 146g, 146h, 146i, 146j and 146k are also shown within the FIG. 14C.

Figure 14D:
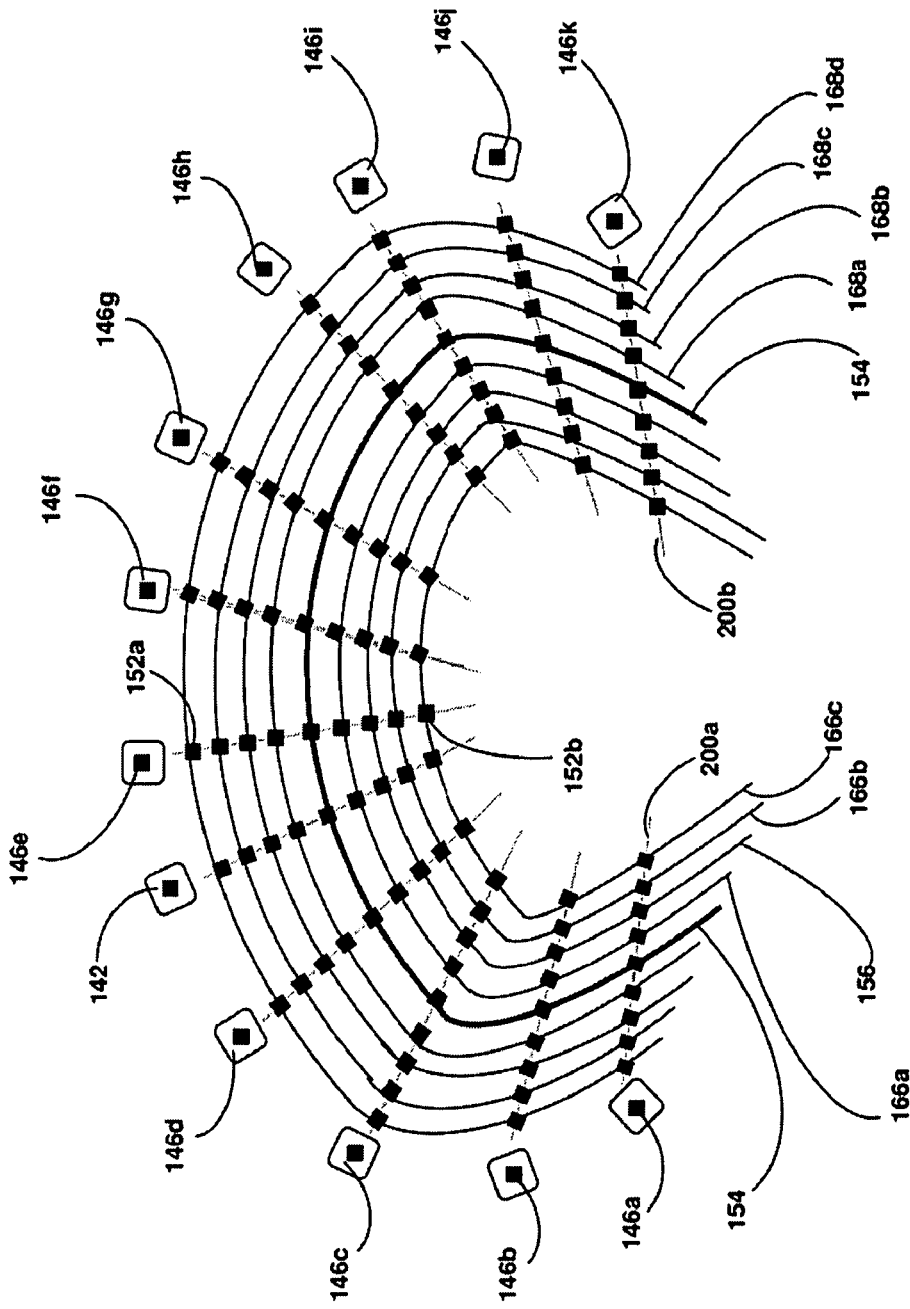
FIG. 14D shows a close-up drawing of FIG. 14B in which additional elements can be seen. It shows 146e and 152a are in direct relationship with each other in that character 152a is representing a coordinate within the Virtual Reality environment. 154 is the default position of the Joystick which we can also refer to as the horizon or centre point. 166a is minus one click point, 156 is minus two click points, 166b is minus three click points, 166c is four minus click points. Then by pushing the joystick 138 forward from the default position 154 this would lead 168a is plus one click point, 168b is plus two click points, 168c is plus three click points and finally 168d is plus four click points. 200a and 200b are imaginary lines to inform the examiner of the axis coordinate line relationship.

In FIG. 14D a more precise drawing is shown of the fundamental positional coordinates being proposed within this virtual reality environment. As previously mentioned points 146a, 146b, 146c, 146d, 142, 146e, 146f, 146g, 146h, 146i, 146j and 146k are shown. These are the circumference points of the arena or theatre in which the virtual musicians reside. Both Virtual Reality Positional Coordinates for VR Musicians 152a and 152b are also shown, as is the Horizon/Default Position on Joystick Controller 154. This view is from above the virtual reality environment. Points 166a, 156, 166b, 166c indicate coordinates at which the user 28 will approach, as they pull the joystick 138 toward them from the horizon point 154 in a minus coordinate function. Points 168a, 168b, 168b and 168d indicate the coordinates at which the user 28 will approach, as they push the joystick 138 from the horizon point 154. Both 200a and 200b are merely indicating an imaginary support line to show the examiner a perspective point of reference for each coordinate.

Figure 15A:
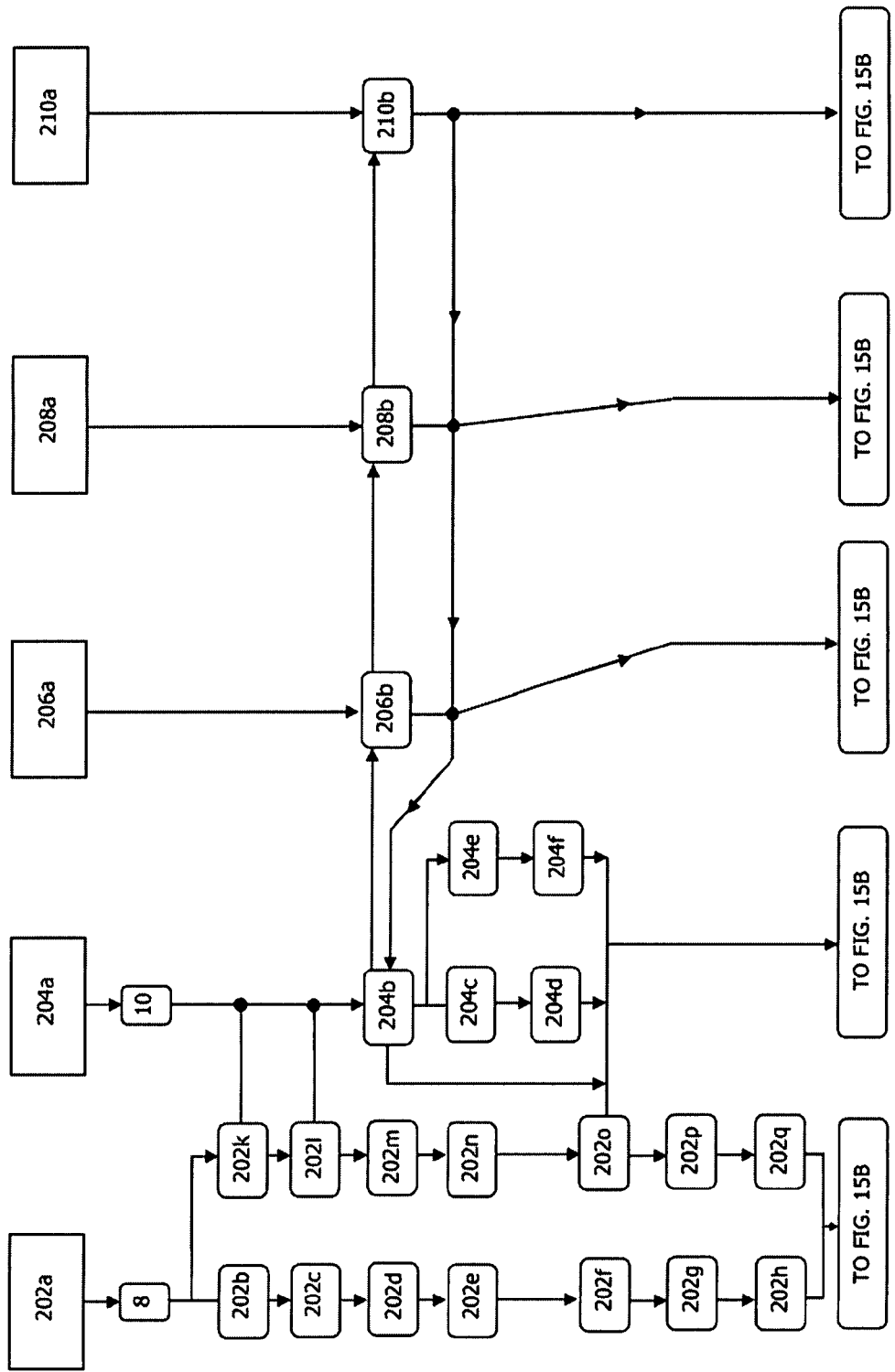
Figure 15B:
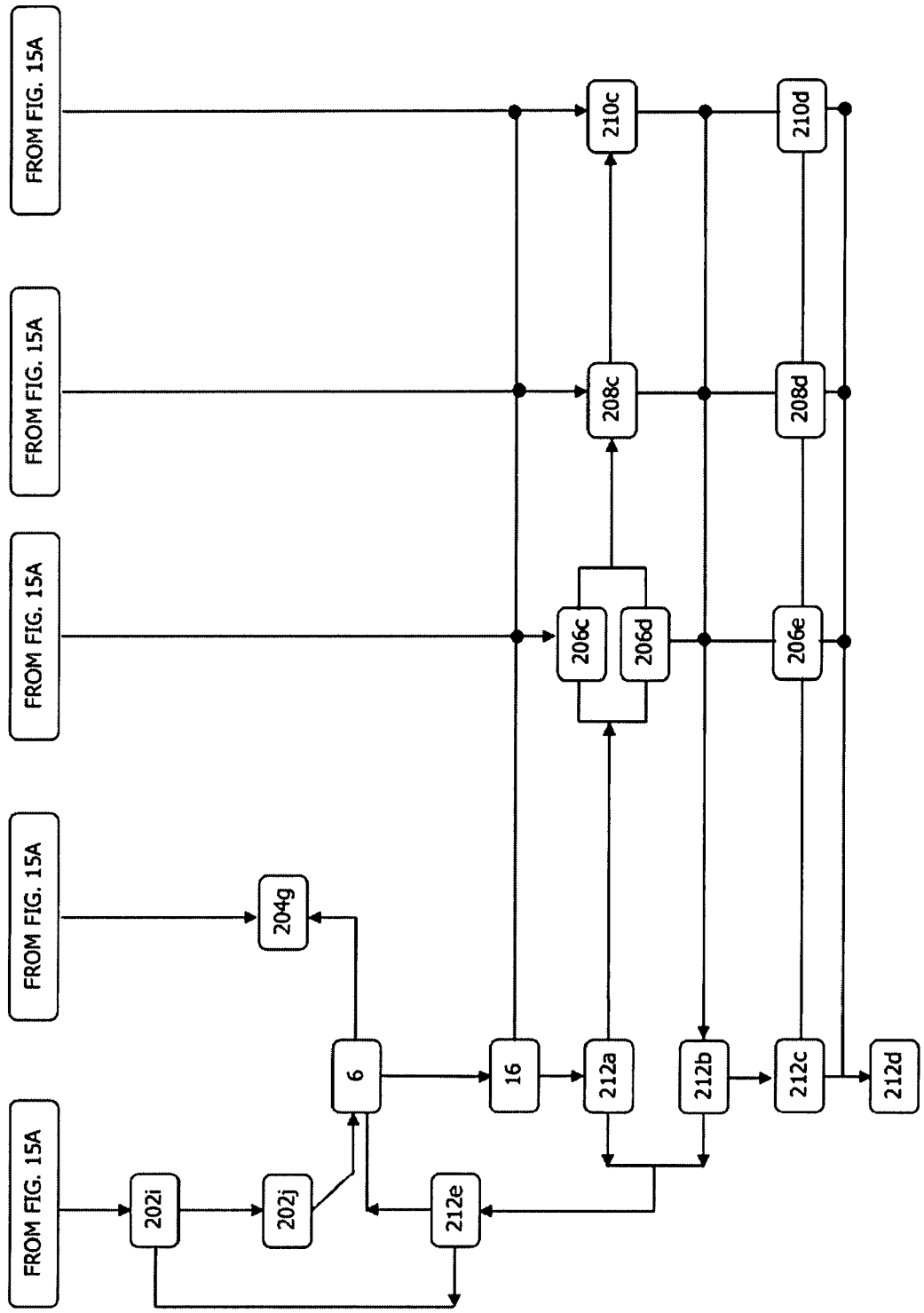

In FIGS. 15A & 15B shows the signal flow attributed to the programming language software packages that are pre-installed within the operating system of the V.R.C.P.S. These five packages are a Virtual Music Orchestra Program Software (202a)

Virtual Sheet Music Program Software (204a)

Musical Instrument Acoustic Program Software (206a)

Musical Instrument Special Effects Program Software (208a)

Surround Sound Acoustic Program Software (210a)

All these software packages work in conjunction with each other and accordingly as the user 28 selects various menus within the V.R.C.P., the requested menu is encountered. The user 28 then selects from the available choices given.

Within the first package 202*a*, the following selections are encountered as the user 28 moves down the signal flow of the V.R.C.P.:

8—user enters Virtual Music Orchestra Interface and its menu

202*b*—user selects either a serial orchestra (one type) or

202*k*—user selects a parallel orchestra (more than one type)

202*c*—user selects a specific Music Genre Type Rock, Jazz etc

202*d*—user selects how many band members they wish to have

202*e*—user selects where they wish the virtual musicians to sit

202*f*—user selects from a myriad of available virtual musicians

202*g*—user utilizes a default demo to analyse choices selected

202*h*—user utilizes either 16 or a virtual playback mechanism

202*i*—user selects the virtual musician to be used during performance

202*j*—user selects from a myriad of sounds within the instrument 6

16—user utilizes the playback mechanism 16 in the recording of music

212*a*—user utilizes a track editor to manipulate recorded material

212*b*—user utilizes a more precise track editing for recorded material

212*c*—user utilizes a mastering editor for the entire composed work

212*d*—user utilizes a series of storage mediums to record work onto.

Within the second package 204*a*, the following selections are encountered as the user 28 moves down the signal flow of the V.R.C.P.:

10—user enters Virtual Sheet Music Interface and its menu

204*b*—music fundamentals are chosen like tempo, time signature etc

204*c*—user chooses a serial sheet music display (one) or a

204*e*—user chooses a parallel sheet music display (more than one)

204*d*—user chooses which specific instruments are to be played by who within the virtual orchestra

204*g*—user chooses which sheet music from which instrument is displayed, allowing them to see what they are editing or recording.

16—user encounters the need to sit at the Virtual Synthesizer 6 to begin recording or inputting via 74 and 78 their work Within the third package 206*a*, the following selections are encountered as the user 28 moves down the signal flow of the V.R.C.P.:

206*b*—user selects which external controllers are to be used

206*c*—user utilizes the ES1 to manipulate the nine components of sound i.e., rhythm, timbre etc

206*d*—a host of controllers and processors are available like the US PCT Application No; PCT/US-07/12751 Morpheus Root Processor, Morpheus Music Processor, or any of the proposed concepts put forward in this aforementioned PCT application, not excluding concepts disclosed for Hand Configuration Devices.

206*e*—user utilizes a master editing suite for manipulation of the complex sounds or waveforms of any of the sounds, created via the Virtual Synthesizer 6.

Within the fourth package 208*a*, the following selections are encountered as the user 28 moves down the signal flow of the V.R.C.P.S.:

208*b*—user utilizes a special effects processor with default effects, which can be applied to any of the tracks recorded, within the virtual recording console that is part of the V.R.C.P.S.

208*c*—user uses the special effects editor to adjust the default settings for all the effects within this processor.

208*d*—allows the user to enter the master special effects editing suite which applies effects within the production stage, that is these effects would be applied to all the clean sounds recorded by the user, allowing him or her to copy prior selected effects during the recording process, for example with bypass effect options upon the signal recorded.

Within the fifth package 210*a*, the following selections are encountered as the user 28 moves down the signal flow of the V.R.C.P.:

210*b*—user utilizes a host of acoustic default parameters, which affect the way they hear the sound of their performance, within the virtual reality environment.

210*c*—user can edit the various default parameters applied to the sound of the performance like for example, extending the reverb time of a certain speaker within the acoustic field.

210*d*—user utilizes a mastering enhancement processor which allows him/her to manipulate the way a consumer would hear the performance using certain mediums like compact discs, DVD, virtual discs, blue ray discs or through specific listening stations like radio stations, cinemas, home cinema surround systems, car stereos or mono audio systems.

Figure 16A:
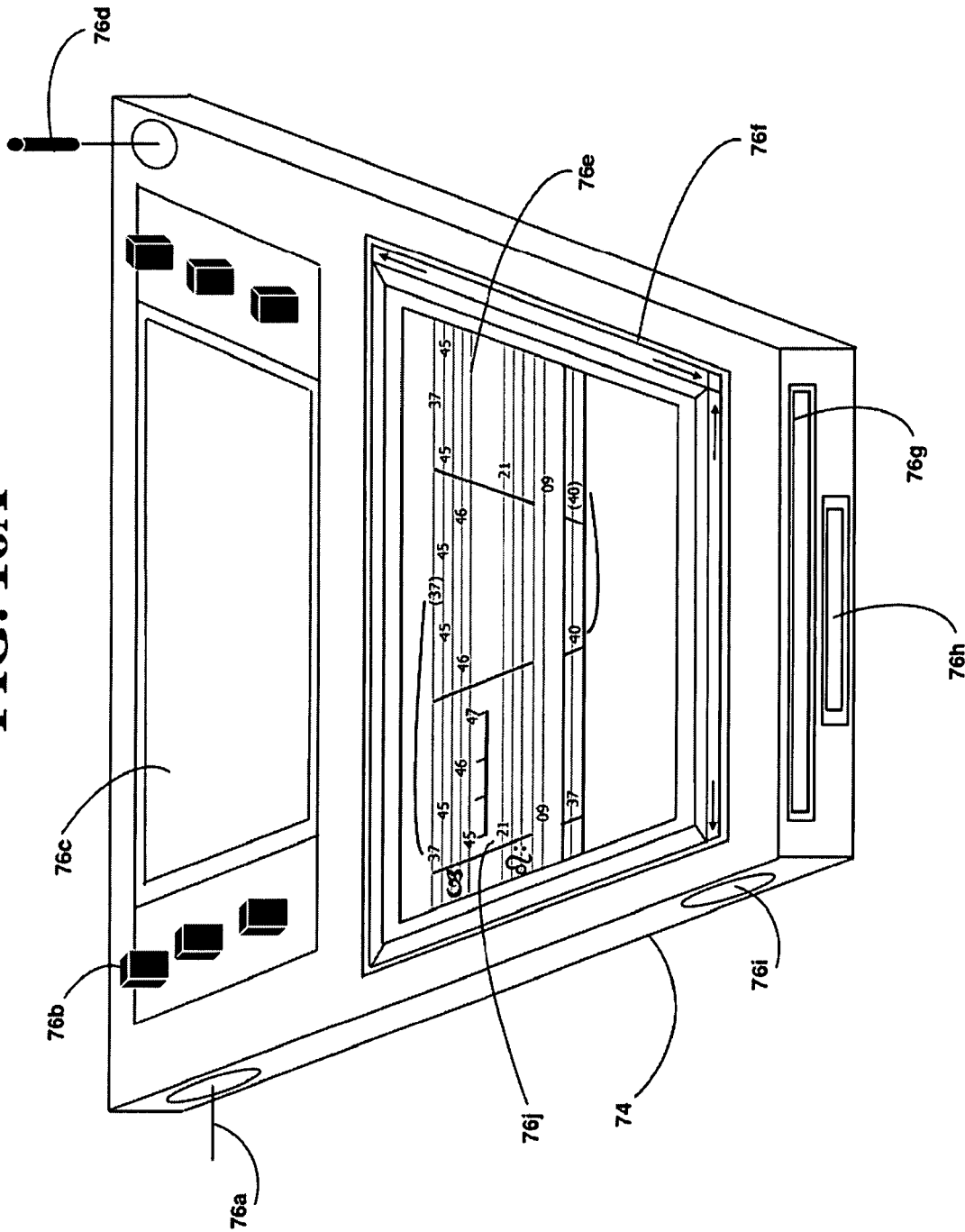
FIG. 16A shows a drawing of a Graphics Tablet 74 that allows a user to input data by using the Digital Stylus 78, which in turn is displayed upon either of the Interfaces 8 and 10.

In FIG. 16A a drawing is shown of the Graphics Tablet 74. This device is connected directly to the System Core 2 in order for real-time events to occur with both interfaces 8 and 10. This is very important as delay times between either interfaces could drastically affect the performance of the V.R.C.P.S. An analogy of this is that of certain commercial music sequencers available to the public in which a musician plays the keys of the MIDI keyboard or other instrument and the track is recorded in real-time by the sequencer. The musician chooses to either overdub or add an additional track to record upon. However, during this phase as the user plays the instrument, a delay occurs either audibly or during the recording phase, which leads the performance to be entirely out of synchronization.

It can be seen the Graphics Tablet 74 would typically be of measurements the size of a conventional scanner or printer. Ideally very slim in height. For specifics sixteen inches in length×eight inches in width and one or two inches in height. This would allow the user to lean upon the device without hand strain occurring, thus avoiding the problem that occurs with a conventional typing keyboard, or other similar inputting device. It would contain one or two optical drives 76*g*, 76*h* for accepting new storage media technology in which the device can save, receive and upload N.G.M.N.S. data, especially storage media proposed within PCT/US-07/12751. Within this application storage media is proposed for a new type MIDI file containing one unique signal flow for hand configuration and another unique signal flow for exact notes of instruments that are recorded. Other preferred embodiment within this area is referenced in FIG. 17, which is the MIDI Interactive Formula, which allows conventional sheet music to be transcribed effortlessly into N.G.M.N.S. data. This data is either output to an external printer or displayed within a custom Score-Writer of software package 204a.

To communicate with the Digital Stylus 78 an Infra Red Sensor 76d is included, along with a Menu Touch-screen 76c for selection of menu screens around the device and if possible, the interfaces 8 and 10 themselves. Various buttons 76b would allow quick access to main menu options and other fundamental parts of the device, like for example global settings. An output 76a to the System Core 2, along with an optional stereo Headphone Socket 76l. Within the surface of the Graphics Tablet 74 itself is the inputting area of the device 76f which allows the Digital Stylus 78 to enter data into the device, by merely tapping or drawing upon the surface of this screen. Graphics tablets in general, are considered to offer a very natural way to create computer graphics, especially two-dimensional computer graphics. Many graphics packages like Corel Painter, Ink-Scape, Photoshop and others are able to make use of pressure, in some cases—stylus tilt or rotation information generated by a tablet, by modifying the brush size, shape, opacity, colour, or other attributes based on data received from the graphics tablet. With this in mind the development of a graphics tablet for this N.G.M.N.S. proposed for virtual reality concept, would be an ideal medium for such an application. Alternatively, another type of input device could be considered. Using this graphics tablet the disclosed thirty-six different notation systems for all musical instruments, would allow complete transcription of conventional sheet music irrespective of the music genre.

Within this device, the user 28 would actively input numeric values relating to the exact note of a musical instrument, as laid out in U.S. application Ser. No. 11,016,438. So in essence the user would select a specific type sheet music display and rather than simply play the Virtual Synthesizer 6, would input the notes 76j into the Sheet Music Interface 10 using the Digital Stylus 78 upon this new generation Graphics Tablet 74. So instead of a myriad of keys from a conventional typing keyboard as comes with all computers, this Graphics Tablet 74 would allow the user 28 to quickly browse the entire system that is the V.R.C.P.

In the example shown it can be viewed that according to the embodiment of the authors prior applications, the sheet music type displayed is for the classical piano, in which the upper clef of the stave represents the right hand of the user 28 and the lower clef 76e represents the left hand of the user 28. As with the interfaces 8 and 10 this device 74 would also have a vertical scroll bar and a horizontal scroll bar which when selected, would duplicate these controls upon the main interfaces 8 and 10 and also within its own touch-screen 76c if permitted. This Graphics Tablet 74 is more or less the Control Centre of the entire V.R.C.P. with an analogy of its part to play within the V.R.C.P., similar to the keyboard input controls of a conventional typing keyboard. This would permit the user 28 to browse various menus, categories, processors and editing suites throughout both interfaces 8 and 10 as mentioned in FIGS. 15A & 15B.

Figure 16B:
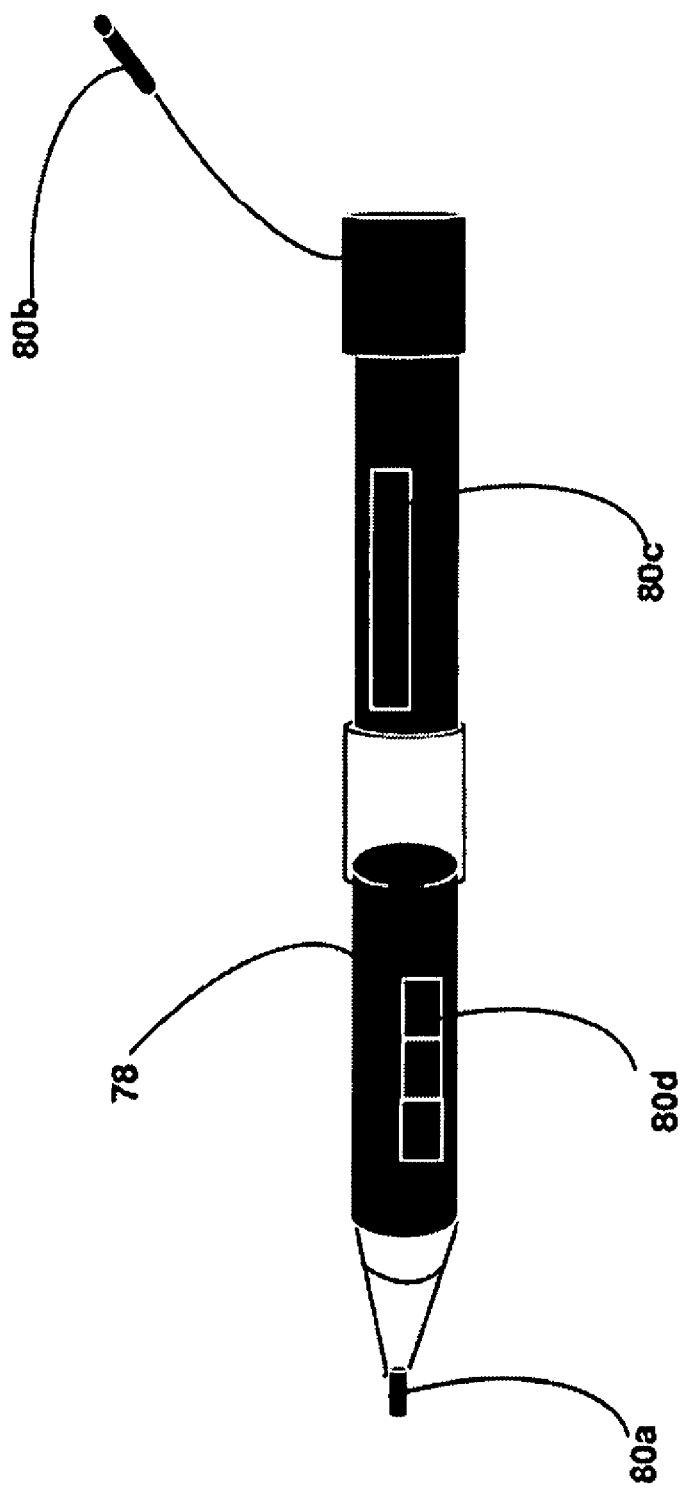
FIG. 16B shows a drawing of the Digital Stylus which has a pressure sensitive tip 80a, infra red antennae 80b, mike on/off switch 80c for voice input recognition technology and menu buttons 80d for easy selection of specific data entry.

In FIG. 16B this is a drawing of the Digital Stylus 78 that works in conjunction with the Graphics Tablet 74. This device would permit inputting upon 74, the exact numeric value equivalent of a key on the Virtual Synthesizer 6. Depending on the musical instrument chosen, the numerical value would permit either a selection of alpha characters between A through J to indicate the finger configuration for playing the note on the instrument and a numeric value range between one and eighty eight. However, because the Virtual Synthesizer 6 contains a set of one hundred and seventy six keys, the possibility of a range between one and one hundred and seventy six being inputted into the Graphics Tablet 74 is applicable. The Digital Stylus 78 would contain a pressure sensitive tip 80a which is the part that is used to input, or select specific menus within 74. Also included is a small Mike on/off switch for allowing the user 28 to actually speak a certain numeric value or alpha character into it, which then appears on screen within 74. Also on the side of 78 is the Menu Buttons for Input Value Selection 80d. The user can depress certain buttons on the side of 78 to initiate various options for selecting whether the value is an alpha character or a numeric character. It would also contain an Infra Red Antennae 80b if required for ease of communication with 74.

In summary, it is obvious with this new technology for both 74 and 78 a myriad of options could be developed not just in its application for music within a virtual reality experience, but outside music itself within education or other mediums within a virtual reality environment.

To further explain in detail other parts of the V.R.C.P. the following aspects of the design are described:

System Core

The Virtual Reality Composer Platform (V.R.C.P.) would have a fundamental Housing or Hardware Device. This would collectively contain the System Core 2, the Acoustic Sound Processor 32, the Effects Processor 34, the Hardisk Mainframe 36 and the Soundcard Portal 4 similar to the fundamentals that make up a standalone computer system. This would entirely depend on technological advancements, on whether all the above could be within one machine or divided between a few different electronic devices.

This System Core 6 would contain a vast array of processing capability with basic fundamentals such as:

a) Central Processing Unit
b) Operating System
c) Software Programming Language Packages
d) Input & Output Slots for Peripherals The System Core 6 would be considered the heart of the entire V.R.C.P.S., translating all input and output programming language and distributing this language to the correct areas within the V.R.C.P.S., to operate the various external and internal electronics of the system. The CPU would need to be highly advanced, as it would be accepting vast amounts of input and output information, specifically from the Virtual Synthesizer 6 and the Graphics Tablet 74 This data is then displayed upon both the main interfaces 8 and 10 in digital synchronization of it. The Operating System would be preinstalled within the System Core and new programming language would be required to create the correct environment within this Operating System for all the fundamentals of the design to operate.

The Software Programming Language Packages would revolve around five fundamental packages:

1) Virtual Music Orchestra Program Software 202a
2) Virtual Sheet Music Program Software 204a
3) Musical Instrument Acoustic Program Software 206a
4) Musical Instrument Special Effects Program Software 208a
5) Surround Sound Acoustic Program Software 210a For specifics these different types of program software shall be explained as follows:

Virtual Music Orchestra Program Software

This Software Package would have a direct relationship with the Virtual Music Orchestra Interface 8. It would be composed of some basic element menu options:

a) File Menu within the Virtual Music Orchestra Program Software 202*a*
b) Serial/Parallel Menu Select 202*b*/202*k*
c) Music Genre Menu Select 202*c*
d) Virtual Musicians Band Members Set 202*d*
e) Positioning & Coordinates Menu Select 202*e*
f) Band Member Type Menu Select 202*f*
g) Demo Default Playback Menus 202*g*
h) Additional Options like Stop, Pause, Continue 202*h*
i) Specific Virtual Musician Menu Select 202*i*
j) Global Virtual Synthesizer Menu Select 202*j*
k) Playback Menu Select Mechanism 16
l) Synchronized Initial Track Editing 212*a*
m) Synchronized Editing Suites Menu Select 212*b*
n) Synchronized Mastering Suites Menu Select 212*c*
o) Synchronized Record-able Medium Menu Select 212*d*

Virtual Sheet Music Program Software

This Software Package would have a direct relationship with the Virtual Sheet Music Interface 10. This software package would comprise:
a) File Menu within the Virtual Sheet Music Program Software 204*a*
b) Global Settings for Virtual Reality Interfaces 8 and 10
c) Music Fundamentals Menu Select 204*b*
d) Serial/Parallel Menu Select 204*c*/204*e*
e) Instrument Category Virtual Sheet Music Template Serial Menu 204*d*
f) Instrument Category Virtual Sheet Music Template Parallel Menu 204*f*
g) Synchronized Sheet Musical Instrument Select 204*g*
h) Playback Menu Select Mechanism 16
i) Synchronized Initial Track Editing 212*a*
j) Synchronized Editing Suites Menu Select 212*b*
k) Synchronized Mastering Suites Menu Select 212*c*
l) Synchronized Record-able Medium Menu Select 212*d*

Within this program package a separate menu screen could be created when the user 28 rather than create original music, wishes to transcribe conventional sheet music. Utilizing the MIDI Interactive Formula this permits the user 28 to divide a conventional score of music into separate transcriptions for each musical instrument. These results can then be outputted to a conventional printer.

Musical Instrument Acoustic Program Software

This Software Package would have a direct relationship with the Virtual Reality Composer Platform and all its components. This software package would comprise:
a) File Menu within the Musical Instrument Acoustic Program Software 206*a*
b) External Controllers Menu Select 206*b*
c) Vari-Dimensional Components of Sound Suite (ES1) 206*c*
d) Global Settings External & Internal Controllers Menu Select (ES2) 206*d*
e) Master Editing Suite Menu Select 206*e*

Musical Instrument Special Effects Program Software

This Software Package would have a direct relationship with the Virtual Reality Composer Platform and all its components. This software package would be comprised of:
a) File Menu within the Musical Instrument Special Effects Program Software 208*a*
b) Professional Acoustic, Environmental Special Effects Processor Menu 208*b*
c) Editing Special Effects Suite (ES3) 208*c*
d) Master Editing Suite Menu Select 208*d*

Surround Sound Acoustic Program Software

This Software Package would have a direct relationship with the Virtual Reality Composer Platform and all its components. This software package would be comprised of:
a) File Menu within the Surround Sound Acoustic Program Software 210*a*
b) Surround Sound Entertainment Menu Select 210*b*
c) Editing Surround Sound Suite (ES4) 210*c*
d) Virtual Reality Enhancement Processor Menu Select 210*d*

The Input & Output Slots for Peripherals would allow a vast array of external controllers and peripherals to be connected to the housing, which would then be operated by the Software Programming Language Packages. A basic list of these peripherals would be as follows:

Virtual Reality Interfaces

Within the Virtual Reality Composer Platform are two specialized interfaces, the Virtual Music Orchestra Interface 8 and the Virtual Sheet Music Processor Interface 10. Both work in direct synchronization with each other and signal input and output from the System Core are displayed therein.

Virtual Music Orchestra Interface

The Virtual Music Orchestra Interface 8 is a highly sophisticated Virtual Reality Interface. It will contain a virtual representation of many hundreds of musicians depending on the specific orchestra selected by the user 28. For example a standard Pop Group Orchestra would contain a selection of five virtual musicians; Vocalist, Guitarist, Bassist, Drummer and Keyboardist. A Classical Orchestra would contain a selection of up to one hundred virtual musicians or more, ranging from violinists to other string musicians. These virtual musicians are represented by virtual characters 54*a*, 54*g*, 54*h* within the interface 8, either as the great classical composers likeness or other characters. These characters will be displayed as an orchestral setup or as a Pop Group setup, coordinated as if it were a real stage or concert arena. The user 28 is allowed to manipulate every virtual musicians movements, whether it be requesting their presence at the front of the stage 54*f* or at their default coordinated position. The interface is to have a virtual display of the stage in that the Acoustic Surround Speaker system has symbols or points allocated onscreen, which permit the user 28 to see and hear a specific virtual musicians' coordinates. For example in FIG. 5 the virtual musician 54*g* has been requested to perform at the front of the stage 54*f* with their classical piano 54*i*. The virtual musician 54*a* is within their default coordinated position, that is at the foreground of the acoustical environment. Scroll Bars 54*c* and 54*d* allow the user 28 to view additional stages for other orchestras, so in essence the scroll bars are manipulating between various floors of a theatre or arena. This analogy would allow the user 28 to mix many orchestras together, for example a Pop Group and a Jazz Group playing in unison. The scroll bars are vertical and horizontal, with the Vertical Scroll Bar 54*c* manipulating the various floors of the simulated theatre and the Horizontal Scroll Bar manipulating the perspective of the interface. For example, selecting to go left would zoom in and selecting to go right would zoom out.

The Virtual Command Screen Display 54*e*, shows the various commands that are available to the user, or the user has requested. A Virtual Command screen 54*e* that is transparent in front of the orchestra and its virtual characters 54*a*, 54*g* and 54*h*. For example, the user within playback would like the tempo to slow at a specific bar of the music. They enter the command by voice recognition via the Optical Microphone 12 or input or select the command within the Graphics Tablet 74, or even type the command into the V.R.C.P.S. The command is then obeyed by the processor and on playback the specific bar is played at the chosen tempo. If the user 28 wishes to hear one of the musicians play a certain solo piece at a quicker pace, the user 28 need only enter the command and the command is performed by the virtual musician. Every virtual musician within the interface can be manipulated either by altering their specific positional coordinates, the sound of their instrument, the components of the musical instrument like Pitch and Timbre or adding special effects to affect the complex waveform of the musical instrument. The user 28 can select from a host of menu screens like having a virtual likeness character of Wolfgang Mozart, playing alongside a virtual character like Marilyn Manson. The options are infinity with what kind of virtual characters the user 28 could select to play their music.

For specifics each orchestra could be divided into the following Music Genres:
- a) General & Popular Music
- b) Blues
- c) Classical Music
- d) Country
- e) Electronica
- f) Folk
- g) Heavy Metal
- h) Hip-Hop, Rap & Rhythm and Blues
- i) Industrial
- j) Jazz
- k) Reggae
- l) Rock This would lead to twelve different types of orchestras that the user 28 could choose from. The interface could allow serial and parallel orchestras, permitting a Rock Orchestra or Band to integrate with a selection of virtual musicians in a Blues Band. The user 28 utilizes the Vertical Scroll Bar 54*c* to shift between the selected orchestras. The possibilities of what could be created within this interface 8 are endless, whether within the amount of orchestras, amount of virtual musicians or integrating virtual musicians from various orchestras. For example a virtual musician in the Blues Band is requested to appear in the Rock Band and vice versa, with humorous situations uploaded to enhance the experience for the user 28 within the entire platform.

Virtual Sheet Music Processor Interface

The Virtual Sheet Music Processor Interface 10 is again a highly sophisticated interface which displays the sheet music in the authors N.G.M.N.S., outlined in U.S. application Ser. No. 11/016,438. All instruments and their newly created designs can be displayed. As with 8 this interface also contains a Vertical Scroll Bar 52*d* and Horizontal Scroll Bar 52*e*. Both interfaces work in direct relationship with the Graphics Tablet 74 and its Digital Stylus 78 allowing the user 28, to browse the entire system in the various selections permitted, within each of the menu screens. The user 28 uses the Graphics Tablet 74 to enter specific numeric values which correspond to the exact keys on the Virtual Synthesizer 6. The user would not be required to have the ability to play a musical instrument, in order to compose very complex music. The data or music is entered upon the Graphics Tablet 74 utilizing the Digital Stylus 78 and is further manipulated within the controls of the interface 10.

The Vertical Scroll Bar 52*d* lets the user view the N.G.M.N.S., for various instruments and the Horizontal Scroll Bar 52*e* lets the user 28 browse the various bars of the N.G.M.N.S. It would be ideally suited if this new generation sheet music were to align horizontally, rather than page by page. This would permit the user to view many instruments in unison if aligned in this manner. However, this design and its fundamental is not limited to this suggested alignment format. An analogy of this, is if one was to get a sheet music book and align every page horizontally. Zoom buttons would also be optional here making the display user friendly.

The N.G.M.N.S., as outlined in the following applications create a specific design for each categorized instrument. Each aspect of the following ten categories are described in great detail within U.S. application Ser. No. 11/016,438 and PCT/US-07/12751 and are merely mentioned here for revision for the examiner. For specifics and the fundamentals for data displayed upon the Virtual Sheet Music Processor Interface 10, these categorized musical instrument designs are outlined as follows:

Category One uses the fundamentals of ten horizontal lines representing a specific finger of each of the hands and an exact numeric value between one and eighty eight designating a specific key on the keyboard instrument like a Piano, Keyboard, Harpsichord, Clavichord, Pianofortes and conventional Synthesizers. With respect to Organs and Pipe Organs additional alpha numerical values are assigned to the floor pedals of these instruments say for example B-one, B-two and so on, with a further additional alpha numerical value assigned to each of the two or more keyboards that make up organs and pipe organs. For example the higher keyboard is referenced as A-one and the lower keyboard is referenced as A-two.

Category Two uses the fundamentals of assigning an exact numeric value from the Classical Piano Layout Chart in U.S. application Ser. No. 11/016,438 to each of the wooden blocks of a Xylophone, and Dulcimers, Vibraphones and Cimbaloms. So a conventional Xylophone would have a numeric value range from thirty-five through to sixty-four, depending on the size and range of the musical instrument. Each row of blocks would be represented by a horizontal line and an alpha character of A for the Left Hand and B for the Right Hand to indicate finger coordination. Then subsequently a specific numeric value between say thirty-five to sixty four is placed upon the relevant horizontal lines.

Category Three uses the fundamentals of Category One with five horizontal lines representing each finger of the Right Hand. Then each row of a one hundred and twenty button Bass section Accordion is assigned six vertical lines which are then transposed to a horizontal form with each of the twenty buttons assigned a numeric value between one and twenty. Finger Configuration for the Left Hand is then assigned through the fundamentals of the U.S. application Ser. No. 11/016,438 an alpha character from A through to E, which is then placed upon the stave of the N.G.M.N.S.

Category Four uses the fundamentals of US PCT Application No. PCT/US-07/12751 or indeed the fundamentals proposed in U.S. application Ser. No. 11/016,438. For specifics the fundamentals outlined in PCT/US-07/12751 are outlined here. Each string of the Guitars, Mandolins, Banjos and Sitars are represented by a horizontal line with the upper low E string being represented at the top of the stave if a conventional six string guitar is used as an example, and each frets exact numeric value equivalent is placed upon the relevant horizontal line. For example: the Middle C Note on a Piano would be represented by the first fret of the sixth horizontal line % within the stave. This sixth horizontal line represents the high E string if a conventional six-string guitar is used as an example. With regard to Sitars they contain primary and secondary strings. These are both indicated by horizontal lines, meaning the stave for the sitar contains seven primary horizontal lines and thirteen secondary horizontal lines.

Category Five uses the fundamentals of representing each line of the non-fretted instruments of Cellos, Violins, Violas, Double Bass and Fiddles with a horizontal line that is placed within the stave using the fundamentals of the Butterfly Effect described in U.S. application Ser. No. 11/016,438 and the exact numeric value of the classical piano is matched up to each note upon the unfretted instrument with each of these numeric values placed upon the horizontal lines of the stave.

Category Six uses the same fundamentals proposed for Category One in that the Harp is a musical instrument with the same design where each string is assigned a numeric value between one and eighty eight and these numeric values are placed upon the ten horizontal lines which represent the ten fingers of the hands.

Category Seven uses the fundamentals of representing each hole of Recorders, Flutes, Tin Whistles and Piccolos with a horizontal line and using the aforementioned Butterfly Effect places an alpha character upon the relevant horizontal line of the stave to indicate the user is to cover the hole with the specific finger shown. A supplementary horizontal line is placed within this same stave indicating the notes' exact numeric value equivalent in the embodiment of aforementioned applications.

Category Eight uses the fundamentals of representing each hole, valve, and key of the following musical instruments namely Clarinets, Bassoons, Bagpipes, Saxophones, Trumpets, Oboes, French Horns, Trombones, Baritone Horns and Tubas with a horizontal line. With each finger of the hand assigned an alpha character from A through J. This value is placed upon the relevant horizontal line to indicate the exact hole, valve and key that is covered by a specific finger of the hands while playing the instrument. As before a supplementary horizontal line is placed within the stave to indicate the notes' exact numeric value equivalent between one and eighty-eight.

Category Nine uses the fundamentals for a Standard Non Artificial Drum Kit (DK1). Each part of the Drum Kit is assigned a specific numeric value between one and seventeen and these numeric values are placed upon three or four horizontal lines, depending on which limb of the person is used to play the relevant part of the drum kit the numeric value is placed upon the specific horizontal line.

Category Ten uses the fundamentals for a Artificial Synthesized Drum Kit (DK2) in which the vast list of sounds available in a conventional synthesizer are assigned an exact numeric value between eighteen and four hundred with three or more horizontal lines used to form a structure and see the specific sound that is played.

It is more than obvious from this disclosure that the Virtual Sheet Music Processor would be able to display upon its interface the exact embodiment proposed above, whether it's a classical piano new generation sheet music design or a Clarinet new generation sheet music design. Because each instrument is being combined into the soundcards of the Virtual Synthesizer 6 rather than actually playing the real musical instruments themselves, for educational purposes it is advisable that these designs outlined above should be used. The main reason for this is that, upon printing of the new generation musical score for musical instruments, these music scores are handed to real musicians who then perform it in a live situation if requested. It must be stressed that this N.G.M.N.S., has been created for all instruments. The Virtual Sheet Music Processor 10 should reflect these designs rather than have one conventional design like standard conventional sheet music for all instruments. This one conventional design is pointless, as the entire system wishes to teach users how to play all musical instruments instantly, within a non-complex format. This also educates users into how each design is built and how each instrument is represented, thus familiarizing the user with the theory of a real musical instrument and how every instrument has a fundamental relationship with the classical piano.

As aforementioned, it will also include a new generation representation of the rhythm of music, as well as a MIDI Interactive Formula for each virtual musical transcription. Each numeric value which represents each specific key of the musical instrument is assigned a selection of eight different colors to indicate a specific note length like crotchets and quavers to name a couple. This disclosure is not however limited to the V.R.C.P. system, in that these indicators can also be used within the fundamentals proposed in U.S. application Ser. No. 11/016,438 and PCT Application No. PCT/US-07/12751. That is, books or other mediums will contain same, in which these eight different colors namely Blue, Brown, Black, Red, Orange, Green, Purple and Pink are integrated to inform the user of each notes specific length. This is further explained in the section Rhythm of Music within this application.

Summary of the Virtual Music Orchestra Interface

User 28, selects two orchestras they wish to compose their music with. A Classical Orchestra and a Jazz Orchestra. All virtual musicians are selected by the user who chooses who he or she wishes to have a character likeness of. For specifics the user 28 selects a default Classical Orchestra containing fifty virtual musicians within their default acoustical positional coordinates. The Jazz Orchestra menu permits a collection of seven virtual musicians along with their acoustical positional coordinates. Using the Vertical Scroll Bar 54*c*, the user 28 can view the Classical Orchestra within the interface and scrolling down or up 54*c* to the next floor views the Jazz Orchestra.

User 28 prepares to compose their music and selects a virtual musician along with their instrument to come forward to the front of the stage 54*f*. User 28 then physically plays the Virtual Synthesizer 6, or inputs the music into the system via the N.G.M.N.S., upon the Graphics Tablet 74 utilizing the Digital Stylus 78 to do so. Playback is chosen by the user via the playback mechanism 16 and then manipulates the components of the sound recorded via 100, acoustical environment via 32 and applies special effects 34 to the produced sound. Using the various controllers like the optical mice 18 and 24 or joysticks 138, External Foot Pedal Controllers 20 and 22 user 28 can apply various changes to the sound of what has been recorded.

Summary of the Virtual Sheet Music Processor Interface

User 28, selects virtual musician 54*g* to compose. User inputs music via the Graphics Tablet 74 utilizing the Digital Stylus 78 or physically plays the music upon the Virtual Synthesizer 6. On recording the music, the data is uploaded in real-time into the Virtual Sheet Music Processor 10. User 28, plays back the piece and all the music is displayed using the N.G.M.N.S., upon the interface 10. User can then add data to the music and delete or manipulate other various data. For example: user plays piece of music which is recorded by the processor 10. User plays back the piece, but wishes to alter the pitch of one of the notes played. Using the Graphics Tablet 74 they select the internal editor within the program and alters the pitch data.

Moving on the User 28, then decides to select a violin utilizing the Soundcard Portal 4. The Virtual Sheet Music Processor Interface 10 display, adds a second stave to represent the Violin. User 28 plays their composition using the Virtual Synthesizer 6 and its vast range of keys allowing high frequencies to be played, as can be heard on a real violin. For example the keys on the Virtual Synthesizer 6 would be touch sensitive and depressing with extra pressure shifts the harmonic frequency of the fundamental tone of a specific key or note. The option to utilize breath controllers to control bow movement is applicable, depending on the advancement of the entire platform and its design. On completion, the user 28 can then view the full new generation music score notation for a vast amount of instruments, all perfectly aligned within the Virtual Sheet Music Processor Interface 10. The user 28 can then print off the new generation music score with the use of many printable options. Additionally it will permit the user to edit their data in which alternative music timing for each note they have played can be changed. For example: the user plays a section of music which is recorded into the V.R.C.P.S. Subsequently on hearing their recording they wish to edit the timing of a certain note. Using the eight specified colors Blue, Brown, Black, Red, Orange, Green, Purple, Pink representing the rhythm of the piece they edit the color of the note. Black would represent a crotchet (one count), by changing the color to blue the note length would change to a Semibreve (four counts).

MIDI Interactive Formula

MIDI (Musical Instrument Digital Interface) as already outlined within this application deals with specific program messages, which interact with external devices in their operation. What is being proposed under the MIDI Interactive Formula is to combine the embodiment of the authors new generation music notation system and previous applications, which creates a novel set of program messages utilizing MIDI fundamentals. These new program messages are catalogued according to the specific musical instrument being analyzed and form as part of the programming language package 204*a*. The program software package also enables specific program software to be created enabling easy transcription of conventional sheet music into this new generation music notation. Editable program messages will be possible in each musical instrument category allowing unprecedented manipulation of how musical instruments sound, are played, as well as the velocity and speed at which transcriptions occur. Vast conventional sheet music of concertos and symphonies, of which can contain several thousands of notes can be rapidly transcribed with ease. Upon transcription into new generation music notation, it can be displayed within the components of the V.R.C.P. or externally upon output devices, like Laser-jet printers and commercial printers. Commercial printers and publishers could have specific program language, which permits the user to divide large symphonies containing notation for several musical instruments, into a logical format for musicians. So in essence the future could allow one musician or composer to perform music upon a live stage, which would normally require hundreds of musicians. MIDI program messages could permit the composer to control hundreds of modules and the audience would not audibly notice a difference. The following is a summary of elements that will be applicable within the MIDI Interactive Formula and how each relates to specific musical instruments.

Classical Piano/Keyboards/Synthesizers/Harpsichords/Clavichords/Pianofortes

The MIDI Interactive Formula with regard to these types of musical instruments will have the following elements editable by the user 28 within the Sheet Music Processor.

MIDI Time Code Position—Divided into Beat & Time Signature

Status—Whether it's a Program/Control or Note Message Type

Midi Channel—Value between one and sixteen Midi Channels

Conventional Note Value—indicated by C#4 or D#4 as examples

New Generation Note Value—Indicated by values between one thru eighty eight or one thru one hundred and seventy six as specified with device 6

Musical Instrument Select—User selects Piano as generic for six types

Finger Configuration—User selects between A thru J

Conventional Note Value—Selection between eight different note lengths as examples: semibreve or crotchet Color Designation Formula—Selection between eight specific colors, that is Blue, Brown, Black, Red, Orange, Green, Purple or Pink Velocity—Volume of the Note played that is a value between 1 thru 127

Expression Effects—Damper Pedal/Soft Pedal/Sostenuto Pedal

Digital Organs

The MIDI Interactive Formula with regard to this type of musical instrument will have the following elements editable by the user 28 within the Sheet Music Processor.

MIDI Time ode Position—Divided into Beat & Time Signature

Status—Whether it's a Program/Control or Note Message Type

Midi Channel—Value between one and sixteen Midi Channels

Conventional Note Value—Indicated by C#4 or D#4 as examples

New Generation Note Value—Indicated by values between one thru eighty eight or one thru one hundred and seventy six as specified with device 6

Musical Instrument Select—User selects Digital Organ

Manual Keyboard Quantity—Indicates how many Manual keyboards are available to user, values can go from one through to five or seven keyboards Keyboard Select One Finger Configuration—A thru to J or Default Off select Keyboard Select Two Finger Configuration—A thru to J or Default Off select Keyboard Select Three Finger Configuration—A thru to J or Default Off select Keyboard Select Four Finger Configuration—A thru to J or Default Off select Keyboard Select Five Finger Configuration—A thru to J or Default Off select Pedal-board Depress Selection—Values from B1 thru to B88; this indicates what foot pedal is depressed to allow keys on keyboards to be audible Conventional Note Value—Selection between eight different note lengths as examples: semibreve or crotchet Color Designation Formula—Selection between eight specific colors, that is Blue, Brown, Black, Red, Orange, Green, Purple or Pink Velocity—Volume of the Note played that is a value between 1 thru 127

Pipe Organs

The MIDI Interactive Formula with regard to this type of musical instrument will have the following elements editable by the user 28 within the Sheet Music Processor.

MIDI Time Code position divided into Beat & Time Signature

Status—Whether it's a Program/Control or Note Message Type

Midi Channel—Value between one and sixteen Midi Channels

Conventional Note Value—Indicated by C#4 or D#4 as examples

New Generation Note Value—indicated by values between one thru eighty eight or one thru one hundred and seventy six as specified with device 6

Musical Instrument Select—User selects Pipe Organ

Manual Keyboard Quantity—Indicates how many Manual keyboards are available to user, values can go from one through to five or seven keyboards Keyboard Select One Finger Configuration—A thru to J or Default Off select Keyboard Select Two Finger Configuration—A thru to J or Default Off select Keyboard Select Three Finger Configuration—A thru to J or Default Off select Keyboard Select Four Finger Configuration—A thru to J or Default Off select Keyboard Select Five Finger Configuration—A thru to J or Default Off select Pedal-board Depress Selection—Values from B1 thru to B88; this indicates what foot pedal is depressed to allow keys on keyboards to be audible Conventional Note Value—Selection between eight different note lengths as examples: semibreve or crotchet Color Designation Formula—Selection between eight specific colors, that is Blue, Brown, Black, Red, Orange, Green, Purple or Pink Velocity—Volume of the Note played that is a value between 1 thru 127

Additional areas of Pipe Organs are quantities of pipes, which are divided into ranks and are controlled by expression pedals, stop controls, registration aids and couplers. A separate set of Program Messages in MIDI could be assigned to these areas.

Xylophones/Vibraphones

The MIDI Interactive Formula with regard to these types of musical instruments will have the following elements editable by the user 28 within the Sheet Music Processor.

MIDI TimeCode Position—Divided into Beat & Time Signature

Status—Whether it's a Program/Control or Note Message Type

Midi Channel—Value between one and sixteen Midi Channels

Conventional Note Value—indicated by C#4 or D#4 as examples

New Generation Note Value—indicated by values between one thru eighty eight or one thru one hundred and seventy six as specified with device 6

Musical Instrument Select—User selects Xylophone as generic for the two

Row Quantity Selection—Choice between one, two, three thru to five

Row Select One—Left/Right Hand

Row Select Two—Left/Right Hand

Conventional Note Value—Selection between eight different note lengths as examples: semibreve or crotchet Color Designation Formula—Selection between eight specific colors, that is Blue, Brown, Black, Red, Orange, Green, Purple or Pink Velocity—Volume of the Note played that is a value between 1 thru 127

Dulcimers/Cimbaloms

The MIDI Interactive Formula with regard to these types of musical instruments will have the following elements editable by the user 28 within the Sheet Music Processor.

MIDI Time-Code Position—Divided into Beat & Time Signature

Status—Whether it's a Program/Control or Note Message Type

Midi Channel—Value between one and sixteen Midi Channels

Conventional Note Value—Indicated by C#4 or D#4 as examples

New Generation Note Value—Indicated by values between one thru eighty eight or one thru one hundred and seventy six as specified with device 6

Musical Instrument Select—User selects Dulcimer as generic for the two

Tuning Pattern Selection—Diatonic Scale or other Scale Patterns

String Set One thru Fifteen—First/Second or Third Octave Position

String Set One thru Fifteen—Left or Right Hand Designation

Conventional Note Value—Selection between eight different note lengths as examples: semibreve or crotchet Color Designation Formula—Selection between eight specific colors, that is Blue, Brown, Black, Red, Orange, Green, Purple or Pink Velocity—Volume of the Note played, that is a value between 1 thru 127

The hammered dulcimer comes in various sizes, identified by the number of strings that cross each of the bridges. A fifteen string, for example, has two bridges (treble and bass) and spans three octaves. The strings of a hammered dulcimer are usually found in pairs, two strings for each note (though some instruments have three or four strings per note).

Accordions

The MIDI Interactive Formula with regard to this type of musical instrument will have the following elements editable by the user 28 within the Sheet Music Processor.

MIDI Time Code Position—Divided into Beat & Time Signature

Status—Whether it's a Program/Control or Note Message Type

Midi Channel—Value between one and sixteen Midi Channels

Conventional Note Value—Indicated by C#4 or D#4 as examples

New Generation Note Value—Indicated by values between one thru eighty eight or one thru one hundred and seventy six as specified with device 6

Musical Instrument Select—User selects Accordion

Finger Configuration Right Hand—User selects between F thru J

Bass Type—Twelve Types: 12-bass, 24-bass, 32-bass, 40-bass, 48-bass, 60-bass, 72-bass, 80-bass, 96-bass, 120-bass, 140-bass or 160-bass Bass Row Select—One, Two, Three, Four, Five or Six Bass Row Value Select—Values between one and twenty Finger Configuration Left Hand—User selects between A thru E Conventional Note Value—Selection between eight different note lengths as examples: semibreve or crotchet Color Designation Formula—Selection between eight specific colors, that is Blue, Brown, Black, Red, Orange, Green, Purple or Pink Velocity—Volume of the Note played that is a value between 1 thru 127

Guitars (Electric/Acoustic/Bass) 1-12 Strings

The MIDI Interactive Formula with regard to these types of musical instruments will have the following elements editable by the user 28 within the Sheet Music Processor.

MIDI Time-Code Position—Divided into Beat & Time Signature

Status—Whether it's a Program/Control or Note Message Type

Midi Channel—Value between one and sixteen Midi Channels

Conventional Note Value—Indicated by C#4 or D#4 as examples

Musical Instrument Select—User selects between Acoustic, Electric or Bass

String Select—Values between one thru twelve strings

New Generation Note Value—Indicated by values between two types of formats. Type One=Numeric Value between one and twenty-four referencing frets of each string. Type Two=Numeric Value between fifteen and sixty-eight (reference PCT Application No. PCT/US-07/12751 FIG. 23A) also referencing frets of each string. Using a seven string guitar the following numeric values would be indicated:

String One—values between 15 thru 39

String Two—values between 20 thru 44

String Three—values between 25 thru 49

String Four—values between 30 thru 54

String Five—values between 35 thru 59

String Six—values between 39 thru 63

String Seven—values between 44 thru 68

If we take one of these values for example String One: 15 thru 39 this indicates values upon a Classical Piano from 15 thru 39, in conventional language B thru B covering two octaves on the piano. So a selection of sixteen would indicate the first fret of Low E String of a seven string Guitar.

Right Hand Finger Configuration for depressing a fret—Values from A thru E, or Off which would indicate an open string Left Hand Configuration for plucking the string—Values from F thru J or default Plec indicating Plec use String Direction—Values ▼ to indicate the string is struck downwards away from the body; ▲ to indicate string is struck upwards towards the body. Off would mean no plucking was involved in creating the sound of the strings' note. Other values could indicate a Tapping reference upon the string.

Conventional Note Value—Selection between eight different note lengths as examples: semibreve or crotchet Color Designation Formula—Selection between eight specific colors, that is Blue, Brown, Black, Red, Orange, Green, Purple or Pink Velocity—Volume of the Note played that is a value between 1 thru 127

Cellos/Violins, Violas, Double Bass, Fiddles 1-6 Strings

The MIDI Interactive Formula with regard to these types of musical instruments will have the following elements editable by the user 28 within the Sheet Music Processor.

MIDI Time-Code Position—Divided into Beat & Time Signature

Status—Whether it's a Program/Control or Note Message Type

Midi Channel—Value between one and sixteen Midi Channels

Conventional Note Value—Indicated by C#4 or D#4 as examples

Musical Instrument Select—User selects between the above list of musical instruments String Select—Using the violin as an example the Numeric Values would be between one thru six strings or higher values if required New Generation Note Value—Using a Violin as an example the Numeric Values would be between thirty-five and seventy-seven (embodiment referenced in U.S. application Ser. No. 11/016,438) referencing specific notes of each string. So in essence each string would be assigned their exact equivalent numeric value using the new generation music notation system.

Right Hand Finger Configuration for depressing a fret—Values from A thru E, or Off which would indicate an open string Left Hand Configuration for plucking the string—Values from F thru J or default Bow indicating Bow use String Direction—Values ▼ to indicate the string is bowed inwards to the body; ▲ to indicate string is bowed outwards away from the body. In essence as disclosed in the inventor's applications the bow movement is referencing the inhaling and exhaling of the instrument. Off would mean no bow movement was involved in creating the sound of the strings' note. Other values could indicate a Tapping reference upon the string.

Conventional Note Value—Selection between eight different note lengths as examples: semibreve or crotchet Color Designation Formula—Selection between eight specific colors that is Blue, Brown, Black, Red, Orange, Green, Purple or Pink. Again these colors reference whether the note is a crotchet or quaver etc.

Velocity—Volume of the Note played that is a value between 1 thru 127

Harps

The MIDI Interactive Formula with regard to this type of musical instrument will have the following elements editable by the user 28 within the Sheet Music Processor.

MIDI Time-Code Position—Divided into Beat & Time Signature

Status—Whether it's a Program/Control or Note Message Type

Midi Channel—Value between one and sixteen Midi Channels

Conventional Note Value—indicated by C#4 or D#4 as examples

New Generation Note Value—Indicated by values between eight thru sixty-four depending on the range of the Harp in relation to the notes on a classical piano. Each numeric value would indicate a specific string on a Harp. So a reference to the longest string of the harp would mean a numeric value of eight.

Musical Instrument Select—User selects Harp

Finger Configuration—User selects between A thru J

String Area—Designated by three or more values like Low Middle High. These reference the different areas available upon a specific string for a Harpist to pluck.

Conventional Note Value—Selection between eight different note lengths as examples: semi-breve or crotchet Color Designation Formula—Selection between eight specific colors, that is Blue, Brown, Black, Red, Orange, Green, Purple or Pink Velocity—Volume of the Note played that is a value between 1 thru 127

Recorders, Flutes, Tin Whistles, Piccolos Clarinets, Bassoons, Bagpipes, Saxophones, Trumpets, Oboes, French Horns, Trombones, Baritone Horns & Tubas The MIDI Interactive Formula with regard to these types of musical instruments will have the following elements editable by the user 28 within the Sheet Music Processor.

MIDI Time-Code Position—Divided into Beat & Time Signature

Status—Whether it's a Program/Control or Note Message Type

Midi Channel—Value between one and sixteen Midi Channels

Conventional Note Value—Indicated by C#4 or D#4 as examples

New Generation Note Value—indicated by values between one thru eighty-eight depending on the range of the musical instruments listed above in relation to the notes on a classical piano. Each numeric value would indicate a specific note upon the instrument.

Musical Instrument Select—User selects between above choice of fourteen different musical instruments.

Conventional Note Value—Selection between eight different note lengths as examples: semibreve or crotchet Color Designation Formula—Selection between eight specific colors, that is Blue, Brown, Black, Red, Orange, Green, Purple or Pink Velocity—Volume of the Note played that is a value between 1 thru 127

All the above musical instruments require a user to hold or cover several holes or valves on the instrument in order to play one single note. This hand configuration for playing each musical instrument is laid out in chart form for the user. After learning the finger configuration chart to play each note upon the instrument all that is required to be represented within the MIDI Interactive Formula for these instruments is a numeric value that corresponds to its exact equivalent on a classical piano. So for example a saxophone would have a numeric value range between thirty-eight thru to sixty-nine.

Standard Drum Kit

The MIDI Interactive Formula with regard to this type of musical instrument will have the following elements editable by the user 28 within the Sheet Music Processor.

MIDI Time-Code Position—Divided into Beat & Time Signature

Status—Whether it's a Program/Control or Note Message Type

Midi Channel—Value between one and sixteen Midi Channels

New Generation Note Value—Indicated by values between one thru sixteen or higher covering entire range of a standard drum kit. So a reference to the snare drum of the drum kit would mean a numeric value of two if the numeric value two were associated with the snare drum. Values associated with the vast amount of percussion sounds of a synthesizer would be assigned values also.

Musical Instrument Select—User selects Standard Drum Kit or Non Standard Drum Kit Player Limb Configuration—As mentioned lines within this new generation music notation system are referencing the limbs of the user or holes, valves on musical instruments. User selects numeric values between one thru three if the user only uses three limbs to play the drum kit that is Left Hand, Right Hand and Right Foot as most drummers do. However some professional drummers use all limbs that are the Left Foot also. This would then be a numeric value between one thru four.

Conventional Note Value—Selection between eight different note lengths as examples: semibreve or crotchet Color Designation Formula—Selection between eight specific colors that is Blue, Brown, Black, Red, Orange, Green, Purple or Pink. So depending on how fast percussion instruments are played a color is assigned respectively to indicate these tempos changes.

Velocity—Volume of the Note played that is a value between 1 thru 127

While the above embodiment disclosed covers the basics of each musical instrument, additional components could be created as users begin to create new methods and configurations for playing musical instruments. As this is the first time in music history that such detailed transcriptions of musical instruments have been created, it would be more than obvious that such configurations could be visualized accordingly. According as each transcription is created using this new MIDI Interactive Formula it will be so simple for artists to print off specific transcriptions for specific musical instruments. This would include finger coordination, exact notes and keys as well as the exact tempo the instrument is played at. The fundamentals of the entire new generation music notation are based: in which a horizontal line upon a stave references a specific finger or limb of the human body. These horizontal lines also reference a specific string, hole, valve or key on several musical instruments. It is more than obvious that these horizontal lines, could be alternated in which a specific horizontal line references a different limb of the body, a different string, key or valve than enclosed within the authors' applications. For example: the top line of the upper clef associated with the new generation notation for a piano, indicates the thumb of the right hand. An alternate formula could be where this same top line references the pinkie of the right hand, with the bottom horizontal line of this upper clef indicating the thumb instead. This application covers this alternate formula as the fundamentals of the original invention from U.S. application Ser. No. 11/016,438 remain the same.

Sound Design

Within the Virtual Reality Composer Platform are two areas of Sound Design. They are the Soundcard Portal 4 and the Instrument Category Select 70.

The Soundcard Portal 4 is basically an input slot mechanism for accepting ten different Soundcards as earlier specified, ranging from Keyed Instrument sounds up to Percussion Instrument sounds. These are either preinstalled within the Virtual Reality Composer Platform, or purchased by the consumer over a period of time. Not dissimilar to the commercial Creative Labs Soundcards available to the public, except these soundcards would contain sounds of musical instruments undistinguishable from the real instrument. The amount of soundcards, depends on the amount of musical instruments the user 28 can choose from. Every Category Soundcard could be divided into three divisions. They are: Amateur, Semi-Professional and finally Professional. Cost would determine the quality of each of the three divisions.

The Instrument Category Select 70 is the area upon the Virtual Synthesizer 6 that lets the user choose which instrument is to be duplicated, via the Virtual Synthesizer 6 on composing of the users music. Various default menu options could be available to the user for example; if they select a Classical Piano, a menu would allow the user 28 to choose a Classical Piano within a Hall or a Digital Classical Piano. Not unlike the options that are currently available on commercial synthesizers, permitting a user to choose from a vast collection of sounds utilizing a certain instrument.

Separate to the external controllers is the Vari-Dimensional Patch-bay for the Components of Sound 100. This section is housed within the Virtual Synthesizer 6, in which the nine basic components of sound can be altered sufficiently through the nine individual Hand Controllers 102a through to 102j. Every single complex waveform or sound that is recorded in real-time by the Virtual Reality Composer Platform can be manipulated by these Hand Controllers for Pitch 102a, Timbre 102b, Harmonics 102c, Loudness 102d, Rhythm 102e, Attack 102f, Sustain 102g, Decay 102h and Speed 102i within the patch-bay 100. Each of these components are described in detail as follows:

Pitch

Pitch is the perceived fundamental frequency of a sound. While the actual fundamental frequency can be precisely determined through physical measurement, it may differ from the perceived pitch because of overtones, or partials, in the sound.

Timbre

Timbre is the quality of a musical note or sound that distinguishes various types of sound production, such as voices or musical instruments. The physical characteristics of sound that mediate the perception of timbre include spectrum and envelope. Timbre is also known in psychoacoustics as sound quality or sound color.

For example, timbre is what, with a little practice, people use to distinguish the saxophone from the trumpet in a jazz group, even if both instruments are playing notes at the same pitch and amplitude.

Harmonics

In acoustics, the harmonic of a wave is a component frequency of the signal that is an integer multiple of the fundamental frequency. The untrained human ear typically does not perceive harmonics as separate notes. Instead, they are perceived as the timbre of the tone. In a musical context, overtones which are not exactly integer multiples of the fundamental are known as In-harmonics.

In-harmonics, which are not close to harmonics, are known as partials. Bells have more clearly perceptible partials than most instruments. Antique singing bowls are well known for their unique quality of producing multiple harmonic overtones or multiphonics. The tight relation between overtones and harmonics in music often leads to their being used synonymously in a strictly musical context, but they are counted differently leading to some possible confusion.

The first frequency at 440 Hz is the fundamental frequency i.e. the first harmonic. The second frequency at 880 Hz is the first overtone, that is the second harmonic. The third frequency at 1320 Hz is the second overtone, that is the third harmonic and the fourth frequency is the third overtone that is the fourth harmonic.

Loudness

Loudness is the quality of a sound that is the primary psychological correlate of physical intensity. Loudness, a subjective measure, is often confused with objective measures of sound intensity such as decibels. Filters such as A-weighting attempt to adjust intensity measurements to correspond to loudness as perceived by the average human. However, true perceived loudness varies from person to person and cannot be measured this way. Loudness is also affected by parameters other than intensity, including: frequency, and duration. A loudness control on a stereo alters a frequency response curve or uses audio level compression to make a selection sound louder.

Rhythm

Rhythm is the variation of the length and accentuation of a series of sounds or other events. Rhythm involves patterns of duration that are phenomenally present in the music with duration perceived by inter-on-set interval. All musicians, instrumentalists and vocalists, work with rhythm, but in modern music a rhythm section generally consists of percussion instruments, bass and possibly chordal instruments such as a guitar, banjo and keyboard instruments, such as piano.

Attack

Attack is how quickly the sound reaches full volume after the sound is activated, that is the key is depressed. For most mechanical instruments, this period is virtually instantaneous. However, for some popular synthesized sounds that don't mimic real instruments, this parameter is slowed down. Slow attack is commonly part of sounds called pads.

Sustain

Sustain is the constant volume that a sound takes after decay until the note is released. Note that this parameter specifies a volume level rather than a time period.

Decay

Decay is how quickly a sound drops to the sustain level after the initial peak. The decrease in amplitude when a vibrating force has been removed is the decay and the actual time it takes for a sound to diminish to silence is the decay time. How gradual this sound decays is its rate of decay.

Speed

With speed, by increasing or decreasing the playback speed you can change the properties of a sound effect. Played at twice as fast as the recorded speed: an explosion will sound like a gunshot or a voice will sound like the cartoon chipmunk character. In utilizing the nine components of a sound to create other sounds, the step that must be taken is disassociating the names of the sound with the sounds themselves. Although there are millions of names for sounds, the sounds themselves all fall into certain frequency parameters that can be manipulated by the nine components of sound. One sound of a waterfall is much the same as any other waterfall sound. The only thing that is interesting in as far as sound effects are concerned, is the magnitude of the waterfall that is its roaring power. The actual sound source may even be a train roaring through a station. Because this sound offers no identification other than a constant roar it can readily be adapted for other sounds.

So in theory, all the above components of sound could be analyzed in great detail and specific hand controllers manufactured utilizing various characteristics and parameters of each of the nine components of sound, to create conventional and unconventional sounds.

Controllers

Within the Virtual Reality Composer Platform are a various set of controllers. The Virtual Synthesizer 6 is the foundation of this area. All music is composed through this machine either physically or by other input means. The other controllers are Expressive Vari-Controller 16, Graphics Tablet Touch Screen Control Center 74, Digital Stylus 78, Optical Mice 18 and 24, External Foot Pedals 20 and 22, and an optional Joystick Controller 138 for individuals with or without sight.

Virtual Synthesizer

The Virtual Synthesizer 6 is a new generation musical instrument, which will contain one hundred and seventy six keys, with each key horizontally aligned with only a few millimeters in vertical height. This would allow the instrument to be played in the manner of a continuous unfretted instrument. Using other controllers like for example breath controller technology, manipulation of the sound coming from the instrument would be superior in quality to commercial synthesizers. The higher frequencies of string harmonics would be possible, along with extending the frequency of a standard classical piano containing just eighty-eight keys. Sections of the large Virtual Synthesizer 6 could be assigned to various instruments, effects and other sound components. For example one octave allows the components of sound to be adjusted with scroll sticks upon the keyboard, or other octaves to permit a variety of instruments to be played by two or more users during recording of compositions.

Expressive Vari-Controller

Expressive Vari-Controller 16 is a playback touch sensitive mechanism, that allows the user to place their fingers into specific slots 114 and using the sensors within the slots 112e, the user 28 can control various functions like play 112c, stop 112e or record 112a.

Graphics Tablet and Digital Stylus

The Graphics Tablet 74 & Digital Stylus 78 work in conjunction with each other where the input device 78 using pressure sensitive technology, enters data into 74. The Graphics Tablet 74 would allow the user 28 to view all menu screens within the entire Virtual Reality Composer Platform. In essence, it would be the control center. In operation the user 28 would place Digital Stylus 78 upon a specific line of a stave within the Graphics Tablet 74. This, depending on the type of N.G.M.N.S. selected, would determine whether the line represents a specific finger of the hand, or a specific string, valve or hole as outlined in U.S. application Ser. No. 11/016,438. For specifics the user 28 selects a line from the stave 76e indicated within FIG. 16A. The Graphics Tablet 74 acknowledges the input with a blinking symbol or character. User 28 depresses the Mike on/off switch 80c and with voice recognition technology, speaks a specific numeric value into the like 80c, for example; forty—which would indicate the Middle C on a Classical Piano. The numeric value of forty then appears within the stave 76e. So in essence the composer is inputting notes into a virtual interface and with the playback mechanism listens to what they have inputted, rather than what they have physically played upon the Virtual Synthesizer 6. The user 28 can then build upon this using the menu option switch 80d on the side of the Digital Stylus 78, by drawing various components of sheet music like slurs and rests. At anytime the user 28 can view a virtual musician playing back their newly composed piece and viewing it within both interfaces 8 and 10.

Optical Mice

The Optical Mice 18 and 24 are basic mouse controllers with the left sided mouse controller 18 having three options; Page Left 126, Page Right 128, Lock 130 and the right side mouse controller 24 having another three options; Menu Scroll 132, Grid Select 134 and Select Value 136. The Menu Scroll allows the user 28 to browse various menus, the Grid Select aligns a grid to the N.G.M.N.S., interface 10, letting the user find specific bars of music easily, with the Select Value permitting the user to choose the specific option.

External Foot Pedals

The External Foot Pedals 20 and 22 are multi-directional pedals for the left and right foot of the user 28 respectively. A vast selection of options assigned to which direction each pedal is depressed could be applicable. For example: the user 28 places their left foot upon the area 122c of the pedal 20. Using pre-selected settings they depress the pedal in a forward motion while playing the Virtual Synthesizer 6 via physically depressing a certain key on the instrument. This causes the pitch of that key to changed each time its played. Whether it be adding a special effect, manipulating the sound of the specific key or other controller detail many parameters are possible. Another example is the mapping of many controllers within the MIDI (Musical Instrument Digital Interface) technology. Or indeed the possibility of these pedals controlling other external devices, like effects boards, MIDI keyboards, Recording Consoles or other mediums.

Joystick Controller

The Joystick Controller 138 is a replicant of the controls available using the Optical Mice 18 and 24. However, it also consists of controlling new generation virtual technology, whereby depending on the movement of the Joystick determines where the user 28 is positioned within this virtual reality environment. As earlier indicated the Joystick 138 would duplicate the menu buttons on both Optical Mice 18 and 24, in which 140a would select Page Left, 140b would select a Lock and 140c would select Page Right. A second joystick controller would replicate the menu options in Optical Mouse 24.

The new technology proposed within the Joystick 138 would permit the user via the fulcrum 140d of the device, to manipulate virtual musicians within two, three and four dimensional environments. In FIG. 14A an analogy of this is shown where the surround sound field is represented 26a through to 26g. The positional coordinates within this virtual reality display are indicated with various symbols like 142. A more detailed drawing is shown in FIG. 14B with virtual reality positional coordinates assigned around the circumference of the orchestra namely 146a, 146b, 146c, 146d, 142, 146e, 146f, 146g, 146h, 146i, 146j, 146k. These coordinates would represent the surrounding imaginary wall at the back of the orchestra. The default horizon, that is the centre point of the Joystick fulcrum 140d is indicated at point 154. Directing the Joystick 138 back toward the user would encounter coordinate 156, which would be at the front of the orchestra. Directing the Joystick 138 forward to 152a would enable the user 28 to select a specific area at the rear of the orchestra. An even more detailed drawing of this virtual environment can be seen in FIG. 14D. Both 200a and 200b are imaginary lines or supports for each positional coordinate. The Joystick is designed to allow audible clicks or pulses for the visually impaired to manipulate within this environment. For example; going from point coordinate horizon 154 to point 166a, would represent one click or pulse, indicating to the user they are encountering coordinates toward the front of the orchestra. An analogy of this Joystick 138 would be the steering wheel of an automobile. The Joystick 138 permits the User 28 to steer their automobile wherever they wish to go within the virtual reality environment.

Acoustic Effects

Within the Virtual Reality Composer Platform are a various set of sound manipulation processors. There are two indicated, that is Acoustic Surround Sound Processor 32 and the Effects Processor 34.

Acoustic Surround Sound Processor

This processor enables the user 28 to influence any virtual musician within any of the specified orchestras. It also permits the user to apply various sound environments to the specific sound of a musical instrument. It is very similar to the current technology used in Surround Sound cinema systems. However, this Acoustic Processor allows total 360 degree environmental control of every sound signal created by the composer. For example; the user 28 wishes to hear one of the virtual musicians play a specific solo piece through a live surround sound setting, but all the other virtual musicians within the orchestra are to play within a bathroom surround sound setting. Several sound effects could be uploaded, like for example if the user 28 requests a virtual musician to approach the main stage platform 54*f*, a sound effect of an individual walking toward this area 54*f* could be applicable, bringing realism to the virtual reality experience.

Effects Processor

This processor 34 enables a user 28 to influence the complex waveform of any sound signal that is recorded by the Virtual Reality Composer Platform. Whether it be a special effect; the sound of smashing glass, marine; the sound of a humpback whale, atmospheric effects; sound of thunder or rain, or conventional effects like Reverb, Flange and Distortion. Both Serial and Parallel effects can be utilized permitting the user 28 to manipulate any one of the hundreds of virtual musicians within any of the orchestras. A supplementary mastering effects suite could be applicable allowing a set of global special effects to be applied to finished composer production.

Both these processors should have various editing suites namely for the recording process, playback process and mastering process. It is imperative that all music material arrives at the mastering process within a clean signal. The digital recording consoles currently available in present times, should be analyzed for their signal flow to determine the best signal flow for the effects processors within the Virtual Reality Composer Platform.

Hardisk Mainframe

The Hardisk Mainframe 36 has been described in detail at an earlier point within this application.

Optical Microphone

The Optical Microphone 12 is a communication device that is part of the Virtual Synthesizer 6. It is an essential part of the V.R.C.P., in that it allows the user 28 to communicate within a virtual reality experience, with the Virtual Musicians inside the Virtual Music Orchestra Interface 8. It is very similar to the concept of how a sound engineer or producer communicates with a band member during a recording session. Normally during a recording session the band members are behind a transparent soundproof glass screen. The soundproofing concept is required in order for the sound engineer or producer to be able to listen to specific tracks without outside interference coming from the band. When he or she wishes to communicate with the band member, they depress a button on the recording console opening up a channel to speak to the band members within the soundproof room. Directions are given to the band members on retakes and other tasks during the recording session.

With this in mind the Optical Microphone 12 would in essence be a direct communication device between the user 28 and all the virtual musicians within every orchestra. Various commands are either typed onto the Virtual Command Screen Display 54*e*, or with voice recognition technology through the microphone 12 itself. So for example a user 28 has composed a section of music and during playback of this music they wish for a certain section to be played in a more joyful mood. The user 28 selects either the entire orchestra, a section of the orchestra or an individual virtual musician in this case 54*a* used as an example. The user 28 depresses the Mike channel open button 120 and speaks to the Virtual Musician 54*a* requesting a command to "play entire section in crescendo". The command appears and scrolls across 54*e*. The information is uploaded and subsequently the user 28 replays the section once again. This time a crescendo feel is applied to the section. This Optical Microphone 12 would control the following areas. However, it must be stated that what is outlined here, is not limiting what concepts could be under the control of the Optical Microphone 12 and its technology.

a) would control the positional coordinates of all virtual musicians either in serial or parallel forms b) would control the various musical styles applied to music that is composed in real-time within the V.R.C.P.S. like for example; cadenza, intermezzo, sonata to name a few c) would control the various tempo and speed settings to music that is composed in real-time within the V.R.C.P.S like for example; allegro, andante, larghetto to name a few d) would control the various music dynamics to music that is composed in real-time within the V.R.C.P., like for example; crescendo, mezzo forte, pianissimo to name a few e) would control the various moods to music that is composed in real-time within the V.R.C.P.S, like for example; scherzando, dolce, animato to name a few f) would control basic commands like requesting the presence of a specific musician to appear from one orchestra into another, like a special guest g) further commands could be uploaded thereafter like applying special effects to virtual musicians and their instruments, as well as a selection of acoustical surround sound settings The possibilities of the concepts that could be created using this optical microphone virtual reality experiment technology, could crossover into other games and game console technology.

Global Summary of the Virtual Reality Composer Process

The following can be seen as a brief, on what occurs with the V.R.C.P. particularly using the FIG. 15A & FIG. 15B as guides. For specifics only the Serial Orchestra is selected here.

User switches V.R.C.P.S. on along with all other components

User utilizes the Graphics Tablet 74 and Digital Stylus 78 to browse System

User selects a Serial 202*b* or Parallel 202*k* Virtual Orchestra in synch with a Virtual Sheet Music Template (the latter occurring automatically)

User chooses a Specific Music Genre 202*c*

User selects amount of Virtual band/orchestral members 202*d*

User chooses Music Fundamentals 204*b* like Tempo and Time Signature

User defaults to Serial 204c Music Fundamental occurring on one instrument in synch with option chosen at point 202b.

User selects what instruments are going to be played by which Virtual Musicians within Instrument Category Select 204d User selects the Global setting for all External Controllers 206b, specific effects to be used 208b and type of surround sound environment 210b they wish to produce and hear their music through.

User chooses Virtual Musician positional or default Virtual coordinates 202e

User chooses Virtual Musician humorous character representations 202f

User selects play demo 202g to hear sample of all Virtual Musicians playing, allowing editable positional coordinates for musicians, graphic equalization on virtual musical instruments held by the Virtual Musicians or various acoustical, environmental or special effects to be applied to various instruments User stops Demo 202h User chooses a Virtual Musician 202i to begin composing example: pianist 202j User using the Virtual Synthesizer 6 composes in real-time by physically playing the instrument or by Input into Virtual Sheet Music Processor 10 via physically inputting numeric values using the fundamentals for instruments mentioned in U.S. application Ser. No. 11/016,438 through the Graphics Tablet 74 and Digital Stylus 78.

The Playback Mechanism 16 is used to Record, Stop, Play, Pause, Rewind, Forward in the composition of their music.

The Result at point 212a i.e., the recorded composition is then fully editable using waveform, score, matrix editing, mixing of tracks used as examples. Also it would be more than obvious that the authors Morpheus Music Processor and Morpheus Root Processor described in PCT Application No. PCT/US-07/12751 will be integrated into this entire Virtual Reality Composer Platform. These would operate in conjunction with Virtual Reality Interfaces 8 and 10.

Editing goes through manipulation via Vari Dimensional Editing Suites 206c, External Controllers Suite 206d, Special Effects Editing Suite 208c and Surround Sound Editing Suite 210c The Result at point 212b arrives back with all manipulation completed.

Mastering or production on all tracks occur 212c

Composition is saved to Hardisk Mainframe 36 or digital record-able medium 212d.

Concise Description of the Virtual Reality Recording Process

To further explain the workflow of the above and elements within FIG. 15A and FIG. 15B an example of the process involved would be as follows:

User switches on all components within the Virtual Reality Composer Platform (V.R.C.P.). Using the Music Orchestra Interface 8 the User 28 selects whether they will be using a Serial Orchestra 202b or a Parallel Orchestra 202k, in simple language one or more orchestras respectively. We will continue along the Serial Path, which means only one orchestra has been selected. Using the Graphics Tablet 74 and Digital Stylus 78 the user would go through the menu option screens, following each step as they prepare each interface 8 and 10 for the composition of music either through inputting via the Digital Stylus 78, voice recognition technology via 80c and 118, or through physically playing the musical instrument 6. The Music Genre 202c would contain a basic menu screen from which the user 28 chooses a specific genre from say General & Popular Music, Blues, Classical Music, Country, Electronica, Folk, Heavy Metal, Hip-Hop, Industrial, Jazz, Reggae and Rock. For specifics the User 28 selects a Classical Music genres in this instance the user will be selecting from a list of default orchestras within the Classical Music genre. On selection the User 28 then selects how many members they wish to have in the band or orchestra through the Virtual Musician Band Member Set 202d.

Moving on to band coordinates the user 28 selects where they wish to have the band members positioned upon the Virtual Interface within the Virtual Environment. For specifics within the Band Member Coordinates 202e the user 28 selects a Default option, which places all virtual musicians within default coordinates. Next, the User 28 chooses from a vast selection of Virtual Musical Characters like for example a character in the representation and likeness of Wolfgang Mozart can be chosen to be placed somewhere within the Orchestra and so on. For specifics within the Band Member Type Select 202f the User 28 selects a Scott Joplin Virtual Character along with other default member types within the orchestra. The selection of the Orchestra is complete and the user 28 moves onto communicating with the Virtual Sheet Music Interface 10. These following commands could also be organized within interface 8, to save the user 28 from switching between interfaces prior to composing music.

The next phase is the selecting between the fundamentals of music like tempo and Time Signature. Within the Music Fundamentals Select 204b the User 28 chooses Tempo i.e., speed of the music in beats per minute (BPM) and Time Signature measured in Bars of music like for example 4/4 time or 6/4 time signatures. While the earlier process of Serial and Parallel selection 202b and 202k determines how many orchestras are to be blended together this selection between Serial 204c and Parallel 204e determines whether each Virtual Musicians' complex sound will be affected Serial 204c or the entire orchestra is affected as a whole 204e.

The External Controllers Select 206b should have a vast amount of global setting applicable to the entire V.R.C.P. where the user 28 can choose from a variety of controls they wish to use in the composition of their music. For example whether to manipulate the sound via the vari-dimensional controllers patch 100 allowing multi-directional variants Pitch 102a, Timbre 102b, Harmonics 102c, Loudness 102d, Rhythm 102e, Attack 102f, Sustain 102g, Decay 102h, Speed 102i via the Editing Suite Number One 206c or via the Editing Suite Number Two 206d, for example 20, 22 or the Various Optical Mice 18 and 24 & Joystick Controllers 138. Additionally the User 28 also selects at this stage whether to use the Effects Processor 208b and also the Surround Sound Environmental Option 210b.

On completion of all these choices the User 28 moves on to whether they wish to hear a sample piece of music or demo played through their created orchestra or continue to the option of actually composing their own music. The sample piece should give the user 28 an idea of what their orchestra sounds like and can attempt global settings at various areas, like changing an instrument associated with a Virtual Musician or altering the effects associated with individual virtual musicians or global settings affecting the entire orchestra. The Effects whether acoustic or surround sound are situated like the analogy of a standard mixing desk after tape monitoring, which allows the user 28 to change the effects produced, where they could ruin a piece of music by applying to many effects during the composing process. This would be disastrous where all the effort the musician has put into the composition of the music, has been lost due to too much use of effects on the initial recording process. This area of the design should be well analyzed to ensure the composer is allowed to save various settings and upload default and saved settings. In plain language, before the production process commences after the composition has been created, clean unprocessed tracks have been recorded and are not drowned with special effects.

Moving on the user 28 has finally come to the section where they can now begin to compose their own music. After selecting the Virtual Musician 202i, this specific musician moves forward along with their instrument to the center of the screen at 54f from FIG. 5. Alternatively, they can remain at their default position coordinates. In this example the User 28 chooses the Pianist 202j. The Pianist takes center stage at point 54f and awaits instructions from the User 28, who communicates within a Virtual Environment with the Virtual Musician via the Optical Microphone 12. The User 28 then can begin to compose via the Virtual Synthesizer 6 and chooses to play in Real-time in synch with the Virtual Sheet Music Processor 10 by using the Playback mechanism 16 or wishes to create or practice without using the Virtual Music Processor.

When they are ready, they just select the Record button 112a from the Playback Mechanism 16 and begin playing in synch with the Tempo and Time Signature pre selected during the initial stages. The user then presses Stop 112e and listens to playback by depressing 112c from FIG. 9B. Depending on technology capabilities the Virtual Musician could duplicate the playing of their musical instrument or in advanced fundamentals could be playing within playback the exact keys the user 28 is actually playing or has inputted utilizing the Digital Stylus 78 upon the Graphics Tablet 74. Closeups upon the Virtual musician could enable the User 28 to learn from preprogrammed technical dexterity of the virtual musician in various moods of music. So in essence the user inputs their music, the virtual musician performs the music during playback and the user 28 analyses how the virtual musician is actually playing the piece, in turn learning from the experience.

The User 28 has the option to manipulate the process by entering various numeric values from the keys of the Virtual Synthesizer 6 upon the Virtual Sheet Music Processor and listen to what it would sound like, without even having to actually play the Virtual Synthesizer in the first place. An analogy of this would be in the times of Wolfgang Mozart, who was said that he could see in his head what he wished to put down on paper and could also hear in his head what it would sound like, before he even notated it upon paper. By way of this Virtual Reality Composer Platform it would permit masterful pieces of music to be written without the user being able to play an instrument. What in essence they would be doing is, using the Virtual Musicians to play the work for them, while they sit back and enter numeric values into the Sheet Music Processor.

The User 28, then has the option to communicate with the Virtual Musician through a vast list of pre-installed commands like for example. "Please play the piece at a slower tempo" or "Please play Bar 33 a bit softer" or "Please only play Bar 30 from the entire piece". These commands could use the Voice Morphing Technology recently developed where it would not matter what voice spoke into the Microphone, in which the Virtual Musician would obey all commands. The User 28 would then using the various controllers manipulate the sound, feel, emotion, coordinates of the virtual musicians and of course the Acoustical and Surround Sound Effects in the composition of their music.

The final areas 212a, 212b, 212c, 212d all deal with the Editing and Mastering Process in which the Editing Suite Number One (ES1) 206c concerns the components of sound like Pitch and Timbre; Editing Suite Number Two (ES2) 206d which concerns the External Controllers; Editing Suite Number Three (ES3) 208c which concerns the Special Effects Area, Editing Suite Number Four (ES4) 210c which concerns the Surround Sound environment. Within the Mastering Suite 212c you have similar editing areas 206e, 208d and 210d, which manipulate the sounds of all instruments at the final Mastering & Production process, which is then recorded to digital tape, or some other record-able medium 212d.

Advantages of the Virtual Reality Composer Platform

The advantages to this new Virtual Reality Composer Platform (V.R.C.P.S.) are immense and will be categorized into the following areas:
  Non-Musicians
  Musicians
  Music Standards
  Record Companies
  Instrument Development
  Transcription & Engraving of Music Non-Musicians This type of person could either be a child, adult, elderly person with or without sight who has never played a musical instrument. Because the V.R.C.P. has as its fundamental the embodiment outlined in U.S. application Ser. No. 11/016, 438, the entire standard and conventional sheet music theoretical concept, can now be understood by any person from five years of age to infinity within a few minutes. The statistical quota applicable to understanding the absolute vocabulary of conventional sheet music is rated at three thousand hours study. Using this (N.G.M.N.S.), all complexities of conventional notation can now be understood within two minutes, enabling any individual young or old to play any musical instrument instantly, without ever having to learn conventional sheet music. What this does is, it opens up music to a whole new area of society, in which before this—based on a family's wealth, depended greatly on whether a young child could achieve a full education in music up to a degree level. This tradition has now been thankfully changed where irrespective of a persons status or wealth, will not impede them from achieving the highest degree or level in music. Applying this N.G.M.N.S., to the virtual reality experience, will allow a novel person to create masterful pieces of music without actually ever having to play an instrument. Even though, this may be seen as a disadvantage to music theorists, they must realize that some of us no matter what degree of training we learn or receive—some people can play instruments with greatness and others cannot. Having this disability should not impede an individual. What the V.R.C.P.S. does is permit any person young or old to compose music, by inputting the V.R.C.P.S. and utilizing virtual masters of specific musical instruments to play the music for them.

A myriad of abilities can be uploaded into these virtual musicians, be it in the moods or dynamics of playing a musical instrument. This changes the tradition, where a person can now virtually hire as it were an orchestra and get them to play the music that is within the person, who does not necessarily have the ability to physically express this music in the playing of a specific musical instrument. It will open up music composition to a wide variety of people and will make the composing of music a fun experience, in which people of all ages can share their creations offline with friends and family through small portable devices like iPods and DVDs' or online over the internet with millions of members. A manufacturer could along with other sites form a membership in which such a concept could be imagined. It could also be envisioned, that companies could setup rehearsal studios in which V.R.C.P s' are installed and consumers could arrive in off the street, hire the V.R.C.P and its engineer in-house for the day and walk away by the end of the day or weekend with an accomplished composition, irrespective of how brilliant or bad it could be. Composing music is a fun pastime and it should not matter the level at which one has created it at. That's how we learn and improve our abilities. Wolfgang Mozart began composing when he was just five years old, and because of the difficulties in translating his music to conventional sheet music, his father Leopold Mozart would do it for him. Such is this concept, this N.G.M.N.S., can be instantly translated by a five year old up to infinity, without any tuition or training.

Musicians

This type of person could either be a child, adult, elderly person with or without sight who has or can play a musical instrument. I think this would be where the new generation of composers will arise more rapidly within society. The V.R.C.P.S. design will be used by musicians who have some sort of background in music and will enable them to jump from a relatively average level of musical dexterity, to a masterful level of dexterity within a very short period of time. This masterful level of dexterity is achieved, in the form of using masterful virtual musicians to perform the ideas and concepts created within a musician or composer. It will permit them to use the highest standards of musicians within a virtual reality experience, without the hassle of having to worry about them walking out over an argument, or failing to express the composition in the way the composer wished it to be played. The highest level of musicians will be utilized in real-time at whatever moment the composer creates it at, rather than waiting around for the next rehearsal session, or next occasion they can afford to gather a section of an orchestra or set of musicians together.

Music Standards

It is not new to society on how stressed the music standards are within the world today. Governments are not budgeting finance toward music education as they once did and millions of children around the world are missing out on a unique experience, when one plays or composes music. Many philosophers and professors have commented for centuries that society cannot function in tranquility without music. As examples:

"Music is the universal language of mankind."—Henry Wordsworth Longfellow

"If I were not a physicist, I would probably be a musician. I often think in music. I live my daydreams in music. I see my life in terms of music . . . . I get most joy in life out of music."—Albert Einstein When asked about his theory of relativity—"it occurred to me by intuition, and music was the driving force behind that intuition. My discovery was the result of musical perception."—Albert Einstein "Music gives a soul to the universe, wings to the mind, flight to the imagination, and life to everything"—Plato "Music is a higher revelation than all wisdom and philosophy. Music is the electrical soil in which the spirit lives, thinks and invents"—Ludwig Van Beethoven God is the Supreme Musician. It is He who is playing with us, on us and in us. We cannot separate God from His music. The universal Consciousness is constantly being played by the Supreme Himself, and is constantly growing into the Supreme Music—Sri Chimnoy The V.R.C.P.S. will change all this, in which before—private and institutionalized music education was only afforded by the wealthy, where now—using this (N.G.M.N.S.), it's for everyone. The most difficult piano concertos and high levels of music, can now be played by any person young or old instantly, without ever having played an instrument. A young person can select this new generation for music, whether it be within a book format or within a virtual reality experience and play high levels of music almost instantly, irrespective of how difficult it would traditionally be. Music has been considered by many to be ninety percent theory and ten percent effort. If this ninety percent theory has been removed, one wonders the abilities people will achieve using this (N.G.M.N.S.). Then applying this concept to the V.R.C.P.S. a composer can now write the music they wish and utilizing the virtual musicians hear instantly what it would sound like.

Record Companies

It is not news to many, of how record companies have manipulated the media into only giving airplay to the roster of musicians and bands upon their payroll. This monopoly creates a vacuum of endless similarity where if a precise formula works in obtaining a hit record, then why should a record company change it. No one can blame a record company for this as these corporations are out to make a profit and if the formula was ineffective, consumers would not buy the product. However, what has occurred over the last eighty years particularly in the last thirty years, is that society has run out of musicians and composers who created the music over the previous generation. It is not unusual in current society for a Pop Artist of teenage years to release a record, written by a composer forty or fifty years older than him/her. Through the help) of the media, an enormous backlog of singers has been created trying to make into the big time in which these artists have forgotten to actually learn how to play a musical instrument during the process. After all, who will compose the music that they wish to sing. With the V.R.C.P.S. this is about to change. These same singers or artists do have the music within them, but due to the large amount of hours required to learn in the conventional manner, learning a musical instrument has been put aside for a quicker route, that is—sing the music written by a generation older than them, or by the generations prior to them being born.

The V.R.C.P.S. due to its simplicity and design as well as having the N.G.M.N.S., at its fundamental, will permit any person young or old with little or no knowledge of music. It will permit them to compose very high standards of music, utilizing a host of parameters of sound manipulation and special effects, all via a wide variety of virtual musicians who are at their beck and call, whatever time the inspiration of music comes to them. As well as the possibility of these artists composing music through input upon the Graphics Tablet 74, it will undoubtedly lead them to push the envelope further by learning to play a musical instrument. What then occurs is, record companies will be forced to rethink the formula as they are currently, and because consumers are not purchasing music in the way they once did, citing irreparable damage to the standard of music today. Utilizing the V.R.C.P.S. a whitewash of masterful music will percolate into the music industry, giving the record companies no option but to commercialize and publish it. A similar prevalence occurred in society within the generation born prior to Wolfgang Mozart. During that period of history, the public was very disappointed in the apparent standard of music that was present and public appearances by musicians during that time were not well attended. However, during the generation of Mozart a long list of magnificent composers were born, who pushed the envelope way beyond the standard it had ever been and a standard still untouched to this day. What occurred thereafter was history, in which the public showed their appreciation for this wondrous music, by supporting it everywhere in Europe. These great musicians could tour around Europe and mix with the aristocracy who purchased their music. A similar situation has occurred in society today and with this (N.G.M.N.S.), the tide is thankfully set to change.

Instrument Development

What is being proposed within this application is both new and novel in the creation of a new musical medium, which allows a user to experience unparalleled levels of realism in the composition of music. The Virtual Synthesizer 6 will be constructed using the fundamentals of U.S. application Ser. No. 11/016,438 in which, all musical instruments are categorized and each of their complex waveforms created undistinguishable from the real instrument. Additionally, the fundamentals where each instrument is represented within the N.G.M.N.S., in which an instruments notes is divided accordingly depending on the instrument and finger coordination indicators via alpha or other characters. These values are either labeled or embossed upon the real instruments and the numeric value principle is applied to the keys of the Virtual Synthesizer 6. These new developed instruments using technology proposed in PCT/US-07/12751 will be integrated into the V.R.C.P. if applicable and virtual windows within interfaces 8 and 10, will support the fundamentals of how they are played and how the notes are transcribed. The Virtual Synthesizer 6 as mentioned prior within this application will contain more than the eighty-eight keys normally associated with pianos and keyboards. A new set of fundamental frequencies will be developed, in order to represent the harmonics and partial harmonics of musical instruments, thus assigning a set of new principles and ranges to each key of 6 above the eighty-eighth key of the instrument 6. All areas of the N.G.M.N.S., will be represented within the interfaces 8 and 10, allowing any user in an effortless manner to understand it, duplicate it and the push the envelope further.

Transcription & Engraving of Music

In music, transcription is the mechanical act of notating a piece or a sound which was previously un-notated. Transcription has also come to mean arranging a piece of music which was originally written for one instrument or group of instruments so that it may be performed on a different instrument or group of instruments; the latter meaning is almost synonymous with arrangement. An Arrangement refers either to a rewriting of a piece of existing music with additional new material or to a fleshing-out of a compositional sketch, such as a lead sheet. Music Transcription is basically the act of producing a piece of music having some particular notes of music, which was not noted. A music composer like Paul McCartney of The Beatles may not read or write music. A music transcriber converts the musical melody to a printed or computer-based form. Alternatively, if some piece of music was written to be played for, say, harmonium and was to be performed on other musical instrument, say, flute, then transcription comes into the picture. Transcription may also include the transference from sound to some graphic form by or mechanical means. To aid this mechanical process there are various tools aimed at helping people to transcribe music from recordings. Chord Transcriber by Musician's Ear, Frequency Analyzer by Reliable Software, Transcribe! by Seventh String Software and WIDI Recognition System by Widisoft to name a few. All these various tools use conventional notation fundamentals as their basis for transcription. So by definition without a music transcriber going through this mechanical process as a service to the public, all audible music would not be playable by musicians. In principle, musicians will listen to music and provide comprehensive notation in any format, note for note. They can accurately transcribe any instrument present in selected music including percussion and create professional sheet music, tablatures, chord charts, and even MIDI. With regard to the visually impaired transcription systems occur in various forms, one of which is the Dancing Dots Braille Music Technology, founded in 1992 to develop and adapt music technology for the blind. In 1997 Dancing Dots released its first product, the Good-Feel Braille Music Translator. It was the first in a series of high-tech tools to harness the power of the personal computer for creative people with disabilities.

Several attempts have been made at automatic transcription of music. In general, musical recordings are sampled at a given recording rate. Common file formats for storing raw sound on computers are 'wav' (Windows) and 'snd' (Unix). Each of these formats represents sound by digitally sampling. Rates of 44100 hertz are common, which is the equivalent of CD-quality sound. In order to transcribe music automatically, several problems must be solved:

Notes must be recognized—this is typically done by changing from the time domain into the frequency domain. This can be accomplished through the Fourier Transform. Computer algorithms for doing so are common in signal processing. The Fast Fourier transform algorithm computes the frequency content of a signal, and is therefore very useful in processing musical excerpts.

A beat and tempo needs to be detected—this is a very difficult, and many-faceted problem.

Modern sheet music may come in different formats. If a piece is composed for just one instrument or voice such as a piano or an a cappella song, the whole work may be written or printed as one piece of sheet music. If an instrumental piece is intended to be performed by more than one person, each performer will usually have a separate piece of sheet music, called a part, to play from. This is especially the case in the publication of works requiring more than four or so performers, though invariably a full score is published as well. The sung parts in a vocal work are not usually issued separately today, although this was historically the case, especially before music printing made sheet music widely available. Sheet music can be issued as individual pieces or works for example a popular song or a Beethoven sonata, in collections for example works by one or several composers, or as pieces performed by a given artist.

Another area of transcription is Music Engraving. This is the art of drawing music notation at high quality for the purpose of mechanical reproduction. The term music copying is almost equivalent, though music engraving implies a higher degree of skill and quality. Plate engraving, the process engraving derives from, became obsolete around 1990. The term engraving is now used to refer to any high-quality method of drawing music notation, particularly on a computer or by hand. The author wishes to disclose the relevance of how the transcription and engraving of music could be applied to this new generation music notation system. Early music engraving techniques were Plate engraving which was the traditional process of engraving music, directly onto a zinc or pewter plate in mirror image. Staff lines were created by dragging a five-pronged scoring tool across the plate, thus the designation, score for printed music. Fixed symbols, like note heads and clefs, were punched into the metal with dies, and variable symbols, such as beams or slurs, were engraved by hand. Plate engraving produced high-quality results, but was only one of several competing technologies in use for reproducing music. Others included:

Moveable type with music symbols on—a centuries-old method, often used for hymn books, but which produced low-quality results Music typewriters—like moveable type, this produced low-quality results and was never widely used Hand copying with pen and ruler, which if done by an expert music copyist can produce high-quality results Notaset—dry transfer symbols similar to Letraset Brushing ink through stencils, a high-quality technique used by Halstan & Co.

In the distant past, a composer was required to draw his own staff lines (staves) onto blank paper. Eventually, staff paper was manufactured pre-printed with staves as a labor-saving technique. The composer could then compose music directly onto the lines in pencil or ink. In the 20th century, music staff paper was often printed onto vellum or onionskin: a durable, semi-transparent paper which made it easier for the composer to correct mistakes and revise his work, and also enabled copies of the manuscript to be reproduced through the ozalid process. The Ozalid process is the name for a process of printing positive images on paper from patterns on film or other translucent media. It is akin to creating a photogram, using chemically treated paper. Also at this time, a music copyist was often employed to hand-copy individual parts for each musician from a composer's musical score. Neatness, speed, and accuracy were desirable traits of any skilled copyist. With the advent of the personal computer in the late 1980s and beyond, hand engraving had become a lost art, as all of the drawing of each note, symbol, staff, written instructions, can now be accomplished by computer software made especially for this purpose. There are numerous computer programs, known as Score-Writers, designed for writing, organizing, editing, and printing music, though only a few produce results of a quality comparable to plate engraving. Even individual parts of an orchestral score can be extracted and printed using such programs. MIDI software is also available, which enables the composer to play notes, melodies, chords, etc. on a piano-type keyboard and have the result transcribed into manuscript format. There are many music engraving programs available to consumers, such as Finale, Sibelius, and LilyPond.

In the late $20^{th}$ and into the $21^{st}$ century, significant interest developed in representing sheet music in a computer-readable format via Music Notation Software, as well as downloadable files. Music OCR, software to read scanned sheet music so that the results can be manipulated, has been available since 1991. In 1998, Virtual Sheet Music evolved further into what was to be termed Digital Sheet Music, which for the first time allowed for copyright sheet music to be made available for purchase online by the publishers. Unlike their hard copy counterparts these files allowed for manipulation such as instrument changes, transposition and even midi playback. The Dutch student Marco Leoné developed software for Tablet PC called MusicReader for his Master assignment at the University of Twente in the The Netherlands. This software is currently only used for research, but will become available to the public. A Tablet PC is a notebook- or slate-shaped mobile computer. Its touch-screen or digitizing tablet technology allows the user to operate the computer with a stylus or digital pen, or a fingertip, instead of a keyboard or mouse.

In typography, a typeface is a coordinated set of glyphs designed with stylistic unity. A typeface usually comprises an alphabet of letters, numerals, and punctuation marks; it may also include ideograms and symbols, or consist entirely of them, for example, mathematical or map-making symbols. The term typeface is typically conflated with font, which had distinct meanings before the advent of desktop publishing. These terms are now effectively synonymous when discussing digital typography. One still valid distinction between font and typeface is that a font may designate a specific member of a type family such as Roman, bold or italic type, possibly in a particular size, while typeface designates a visual appearance or style, possibly of a related set of fonts. For example, a given typeface such as Arial may include Roman, bold, and italic fonts. A font is a set of glyphs or images representing the characters from a particular character set in a particular typeface. In professional typography the term typeface is not interchangeable with the word font, which is defined as a given alphabet and its associated characters in a single size. For example, eight-point Caslon is one font, and ten-point Caslon is another.

All the above mediums utilize prior art conventional notation as their output. The disclosure of the above methods, highlights the applications that this new generation music notation system could be used in. The author wishes to relate that as conventional sheet music has been represented, transcribed and engraved in various forms for many centuries, similar representation, transcription and engraving of this new generation music notation is applicable. So in essence, novelty will occur with all these applications when applied to this new generation music notation system, whether it be by way of a music copyist, plate engraving, computer translator or engraving software formats and programs. The moment the music transcription mechanical process begins through any of these above methods, novelty occurs upon using the authors' fundamental new generation music notation system as the output means, whether in printed or software mediums.

As mentioned prior within this application it is more than obvious that information disclosed, should not be seen in a limiting sense where are myriad of possibilities will become apparent to a manufacturer, during the construction of all elements in the V.R.C.P.S.

Following is a listing of the components used in the best mode preferred embodiment and the alternate embodiments for use with OEM as well as retrofit markets. For the ready reference of the reader the reference numerals have been arranged in ascending numerical order.

002=System Core
004=Sound Card Portal
006=Virtual Synthesizer
008=Virtual Music Orchestra Interface
010=Virtual Sheet Music Interface
012=Optical Microphone
014=Record-able Medium CD/DVD ROM Drive
016=Playback Mechanism
018=External Optical Mouse Controller Type I
020=External Foot Pedal Controller Type I
022=External Foot Pedal Controller Type II
024=External Optical Mouse Controller Type II
026a=Surround Sound Speaker (C) Center
026b=Surround Sound Speaker (B-R) Back Right
026c=Surround Sound Speaker (F-R) Front Right
026d=Surround Sound Speaker (R-R) Rear Right
026e=Surround Sound Speaker (R-L) Rear Left
026f=Surround Sound Speaker (F-L) Front Left
026g=Surround Sound Speaker (B-L) Back Left
028=User/Student Position
030a=Audio Signal Flow from Surround Sound System
030b=Electronic Signal Flow from/to Virtual Interfaces 032=Acoustic Surround Sound Processor
034=Environmental & Special Effects Processor
036=Hardisk Mainframe
038a=Category One Sound Card Slot
038b=Category Two Sound Card Slot
038c=Category Three Sound Card Slot
038d=Category Four Sound Card Slot
038e=Category Five Sound Card Slot
038f=Category Six Sound Card Slot
038g=Category Seven Sound Card Slot
038h=Category Eight Sound Card Slot
038i=Category Nine Sound Card Slot
038j=Category Ten Sound Card Slot
040=Virtual Reality Interfaces Component Design
042=Acoustic Effects Component Design
044=Hardisk Mainframe Component Design
046=External Controllers Component Design
048=Sound Component Design
050=System Core & CPU Component Design
052a=Exact Numeric Value/Note/Key Fundamental
052b=Finger Coordination Fundamental Structure-Right Thumb
052c=Category Select Menu Display Window
052d=Vertical Scroll Bar
052e=Horizontal Scroll Bar
052f=Color Designation Formula Example: Blue Font Color
052g=Color Designation Formula Example: Brown Font Color
052h=Color Designation Formula Example: Black Font Color
052i=Color Designation Formula Example: Red Font Color
052j=Color Designation Formula Example: Orange Font Color
052k=Color Designation Formula Example: Green Font Color
052l=Color Designation Formula Example: Purple Font Color
052m=Color Designation Formula Example: Pink Font Color
054a=Virtual Musician Character within Virtual Orchestra
054b=Surround Sound Virtual icon example: Back Left Speaker
054c=Vertical Scroll Bar
054d=Horizontal Scroll Bar
054e=Virtual Command Screen Display
054f=Virtual Musician Stage Platform
054g=Virtual Musician Character Selection from Orchestra
054h=Virtual Musician Character within Virtual Orchestra
054i=Virtual Musical Instrument Selection for Virtual Musician
056=Virtual Synthesizer Keyboard Type I
058=$52^{nd}$ Key on the Virtual Keyboard Type I
060=$58^{th}$ Key on the Virtual keyboard Type I
062=Virtual Synthesizer Keyboard Type II
064=Middle C/$40^{th}$ Key on the Virtual Keyboard Type I
066=C Sharp/$41^{st}$ Key on the Virtual Keyboard type I
068a=Middle C Key on a Standard Classical Piano
068b=C Sharp Key on a Standard Classical Piano
070=Instrument Category Select Patch-bay Area
072a=Instrument Category One Select Menu
072b=Instrument Category Two Select Menu
072c=Instrument Category Three Select Menu
072d=Instrument Category Four Select Menu
072e=Instrument Category Five Select Menu
072f=Instrument Category Six Select Menu
072g=Instrument Category Seven Select Menu
072h=Instrument Category Eight Select Menu
072i=Instrument Category Nine Select Menu
072j=Instrument Category Ten Select Menu
074=Graphics Tablet Touch Screen Control Center
076a=Output to System Core
076b=Control Center Menu Options
076c=Graphics Tablet Touch Screen for Menu & Global Settings
076d=Touch Screen Infra Red Sensory Antennae
076e=Touch Screen Composer Layout
076f=Touch Screen Composer Platform
076g=Compact Disc or DVD Drive
076h=Specialized New Generation MIDI File Format Drive
076i=Headphone Socket
076j=Numerical Value Input Example
078=Digital Stylus
080a=Pressure Sensitive Tip
080b=Infra Red Antennae
080c=Mike On/Off Switch for Voice Input Entry
080d=Menu Buttons for input Value Selection
082=Collective Representation of External Controllers
100=Vari-Dimensional Patch-bay for Components of Sound
102a=Vari Dimensional Hand Controller for Pitch
102b=Vari Dimensional Hand Controller for Timbre
102c=Vari Dimensional Hand Controller for Harmonics
102d=Vari Dimensional Hand Controller for Loudness
102e=Vari Dimensional Hand Controller for Rhythm
102f=Vari Dimensional Hand Controller for Attack
102g=Vari Dimensional Hand Controller for Sustain
102h=Vari Dimensional Hand Controller for Decay
102i=Vari Dimensional Hand Controller for Speed
102j=Virtual Reality Main Menu Navigation Controller
104=Vari Dimensional Hand Controller Mechanism
106=Hand Controller Multi-Directional Indicators
108=Playback Mechanism Hand Surface Area
110=Playback Mechanism Cross Section
112a=Record Sensor
112b=Rewind/Fast Rewind Sensor
112c=Play/Pause Sensor
112d=Forward/Fast Forward Sensor
112e=Stop Sensor
114=Finger Sensor Holder
116=Optical Microphone Flexible Support
118=Microphone Speak Sensor
120=Mike On/Off Switch
122a=LCD Screen for Type I Pedal
122b=Multi Directional Indicator for Foot Pedal Type I
122c=Foot Surface Area on Type I Foot Pedal
124a=LCD Screen for Type II Pedal
124b=Multi Directional Indicator for Foot Pedal Type II
124c=Foot Surface Area on Type II Foot Pedal
126=Type I Optical Mouse Controller Page Left Click Area
128=Type I Optical Mouse Controller Page Right Click Area
130=Type I Optical Mouse Controller Lock Area
132=Type II Optical Mouse Controller Menu Scroll Click Area
134=Type II Optical Mouse Controller Grid Select Click Area
136=Type II Optical Mouse Controller Select Value Click Area
138=Joystick Controller for Visually impaired Users
140a=Type I Joystick Controller Page Left Click Area 140*b*=Type I Joystick Controller Lock Area
140*c*=Type I Joystick Controller Page Right Click Area
140*d*=Joystick Fulcrum for altering Positional Coordinates
142=Virtual Reality Orchestra Positioning Coordinate (minus two)
144=Virtual Representation Signal Flow Coordinate
146*a*=Virtual Reality Orchestra Positioning Coordinate (minus six)
146*b*=Virtual Reality Orchestra Positioning Coordinate (minus five)
146*c*=Virtual Reality Orchestra Positioning Coordinate (minus four)
146*d*=Virtual Reality Orchestra Positioning Coordinate (minus three)
146*e*=Virtual Reality Orchestra Positioning Coordinate (minus one)
146*f*=Virtual Reality Orchestra Positioning Coordinate (plus one)
146*g*=Virtual Reality Orchestra Positioning Coordinate (plus two)
146*h*=Virtual Reality Orchestra Positioning Coordinate (plus three)
146*i*=Virtual Reality Orchestra Positioning Coordinate (plus four)
146*j*=Virtual Reality Orchestra Positioning Coordinate (plus five)
146*k*=Virtual Reality Orchestra Positioning Coordinate (plus six)
148=Virtual Reality Environment Indicators
150*a*=Virtual Reality Vertical 3D Help Indicator One
150*b*=Virtual Reality Vertical 3D Help Indicator Two
152*a*=Virtual Reality Positional Coordinate for VR Musician (+)
152*b*=Virtual Reality Positional Coordinate for VR Musician (−)
154=Horizon/Default Position on Joystick Controller
156=Joystick Controller Positional Coordinate (minus two off horizon or default position)
158*a*=Maximum Left Rotational Point for Joystick Controller
158*b*=Centre Default Position for Joystick Controller
158*c*=Maximum Right Rotational Point for Joystick Controller
160=Distance Indicator between two Positioning Coordinates
162=Marker between two Positioning Coordinates
164=Joystick Source or Origin Point
166*a*=Joystick Controller Positional Coordinate (minus one off horizon or default position)
166*b*=Joystick Controller Positional Coordinate (minus three off horizon or default position)
166*c*=Joystick Controller Positional Coordinate (minus four off horizon or default position)
168*a*=Joystick Controller Positional Coordinate (plus one off horizon or default position)
168*b*=Joystick Controller Positional Coordinate (plus two off horizon or default position)
168*c*=Joystick Controller Positional Coordinate (plus three off horizon or default position)
168*d*=Joystick Controller Positional Coordinate (plus four off horizon or default position)
200*a*=Imaginary Guideline for Virtual Reality Positioning Coordinates example: minus six coordinates
200*b*=Imaginary Guideline for Virtual Reality Positioning Coordinates example: plus six coordinates
202*a*=File Menu within the Virtual Music Orchestra Program Software
202*b*=Serial Menu Select
202*c*=Serial Music Genre Menu Select
202*d*=Serial Virtual Musicians Band Members Set
202*e*=Serial Positioning & Coordinates Menu Select
202*f*=Serial Band Member Type Menu Select
202*g*=Serial Demo Default Playback Menus
202*h*=Serial Additional Options like Stop, Pause, Continue
202*i*=Global Specific Virtual Musician Menu Select
202*j*=Global Virtual Synthesizer Menu Select
202*k*=Parallel Menu Select
202*l*=Parallel Music Genre Menu Select
202*m*=Parallel Virtual Musicians Band Members Set
202*n*=Parallel Positioning & Coordinates Menu Select
202*o*=Parallel Band Member Type Menu Select
202*p*=Parallel Demo Default Playback Menus
202*q*=Parallel Additional Options like Stop, Pause, Continue
204*a*=Virtual Sheet Music Program Software
204*b*=Music Fundamentals Menu Select
204*c*=Serial Menu Select
204*d*=Instrument Category Virtual Sheet Music Template Serial Menu
204*e*=Parallel Menu Select
204*f*=Instrument Category Virtual Sheet Music Template Parallel Menu
204*g*=Synchronized Sheet Musical Instrument Select
206*a*=File Menu within the Musical Instrument Acoustic Program Software
206*b*=External Controllers Menu Select
206*c*=Vari-Dimensional Components of Sound Suite (ES1)
206*d*=Global Settings External & Internal Controllers Menu Select (ES2)
206*e*=Master Editing Suite Menu Select
208*a*=Musical Instrument Special Effects Program Software
208*b*=Professional Acoustic, Environmental Special Effects Processor Menu
208*c*=Editing Special Effects Suite (ES3)
208*d*=Master Editing Suite Menu Select
210*a*=Surround Sound Acoustic Program Software
210*b*=Surround Sound Entertainment Menu Select
210*c*=Editing Surround Sound Suite (ES4)
210*d*=Virtual Reality Enhancement Processor Menu Select
212*a*=Synchronized Initial Track Editing
212*b*=Synchronized Editing Suites Menu Select
212*c*=Synchronized Mastering Suites Menu Select
212*d*=Synchronized Record-able Medium Menu Select

DEFINITIONS AND ACRONYMS

A great care has been taken to use words with their conventional dictionary definitions. Following definitions are included here for clarification in alphabetical order.

Anubis=A tree like structure that integrates morpheus notation with prior art notation for easy transition along with specific tempo of music in the form of dots which indicate each beat of a bar of music.

Audio Sample=Can come in many forms in which a specific piece of audio is recorded by a device and this audio is then manipulated into other sounds with the addition of special effects or other forms of digital technology.

Augmented Reality=Augmented Reality (AR) is a field of computer research which deals with the combination of real world and computer generated data. At present, most AR research is concerned with the use of live video imagery, which is digitally processed and augmented by the addition of computer generated graphics. Advanced research includes the use of motion tracking data, fiducial marker recognition using machine vision, and the construction of controlled environments containing any number of sensors and actuators.

Breath/Wind Controller=A breath or wind controller, sometimes referred to as a wind synth or wind synthesizer, can loosely be defined as an electronic wind instrument. Wind controllers are most commonly played and fingered like a saxophone though models have been produced that play and finger like other acoustic instruments such as the trumpet, recorder, tin whistle, and others. A wind controller might convert fingering, breath pressure, bite pressure, finger pressure, and other sensors into control signals which are then used to control internal or external devices such as analog synthesizers, MIDI synthesizers, MIDI softsynths, MIDI sequencers, MIDI lighting systems, etc. . . . . A wind controller usually does not make a sound on its own. It usually is connected to some sort of sound generating device such a MIDI or analog synthesizer or sound module/generator which is then connected to an amplifier. For this reason, a wind controller generally can sound like anything depending on the capabilities of the connected sound generator. The fingering and shape of the controller are not related to how the wind controller sounds. For example, woodwind type wind controller could sound like a trumpet, drum, or barking dog, while a brass type wind controller could sound like a saxophone.

Capacitive Plus=Capacitive Plus Controller Technology by TouchKo is a surface projected capacitive touch system. This intelligent technology recognizes a touch through two layers of surgical gloves or the equivalent. It is a perfect fit for applications where other technologies, such as resistive would be needed, but greater durability is required. Further it is ideal for applications where Surface Acoustic Wave or Infrared is thought to be needed, but seal-ability is required.

Captive-Motion=Captive-Motion is a bridging technology. With its high fidelity motion capture it allows the film industry to convey the character and emotion required for film production without excessive, difficult and custom processes. Embody is designed to allow casting of digital characters and eliminates the traditional gap between the human element and the technological requirement. The process is designed around film making shots and maintains continuity with standard production techniques. All aspects were built from the ground up to support and improve film level motion capture processes and techniques.

Color Designation Formula=This represents a specific formula created by the author to indicate the rhythm of music, whereby assigning a specific color namely Blue, Brown, Black, Red, Orange, Green, Purple and Pink to a specific note value of which there are eight of used in conventional notation namely, Semibreve, Minim, Crotchet, Quaver, Semiquaver, Demisemiquaver, Hemidemisemiquaver and Semihemidemisemiquaver. For example: Black indicates a Crotchet, while Purple indicates a Hemidemisemiquaver.

Conventional Piano=This refers to a standard Grand or Upright Piano made available to consumers by a host of manufacturers like Yamaha or Steinway to name a couple.

Dolby Surround=Dolby Surround was the earliest consumer version of Dolby's multi-channel analog film sound format Dolby Stereo. When a Dolby Surround soundtrack is produced, four channels of audio information—left, center, right, and mono surround—are matrix-encoded onto two audio tracks. The stereo information is then carried on stereo sources such as videotapes, laserdiscs and television broadcasts from which the surround information can be decoded by a processor to recreate the original four-channel surround sound. Without the decoder, the information still plays in standard stereo or monaural. The Dolby Surround decoding technology was updated during the 1980s and re-named Dolby Pro Logic. The term Dolby Surround is used to describe soundtracks that are matrix-encoded using this technique.

Drum Loop=A drum loop involves taking a digital sample of a specific bar of music played by a drum kit and repeating this bar to the desired cycle of repeats.

Ensembles=Are groups of two or more musicians that perform instrumental or vocal music.

Graphics Tablet=A graphics tablet is a computer input device that allows one to hand-draw images and graphics, similar to the way one draws images with a pencil and paper. It consists of a flat surface upon which the user may draw an image using an attached stylus, a pen-like drawing apparatus. The image generally does not appear on the tablet itself but, rather, is displayed on the computer monitor or other interface.

Grid Select=this refers to how the fundamental proposed in U.S. application Ser. No. 11/016,438 could be integrated into the V.R.C.P and its interfaces 8 and 10. To analyze tempos and various time signatures a simple click of a button upon the V.R.C.P. will display various grids, which are applied to the interfaces 8 and 10 in which the user 28 can clearly see, how the music is divided up into sections and how to manipulate those sections.

Interface=Allows users to interact with a computer and computer controlled devices which utilize graphical icons, visual indicators or special graphical elements called widgets, along with text, labels or text navigation to represent the information and actions available to the user. This can occur within the interaction between a conventional computer monitor or wide screen television, or in this case disclosed, within virtual reality interfaces that allow users to have perspective and interaction within many dimensional environments.

Mastering=Mastering, is a form of audio post-production, is the process of preparing and transferring recorded audio from a source containing the final mix to a data storage device, thus creating the master; the source from which all copies will be produced, via methods such as pressing, duplication or replication.

MIDI=MIDI (Musical Instrument Digital Interface) is an industry-standard electronic communications protocol that enables electronic musical instruments, computers and other equipment to communicate, control and synchronize with each other in real time. MIDI does not transmit an audio signal or media—it simply transmits digital data event messages such as the pitch and intensity of musical notes to play, control signals for parameters such as volume, vibrato and panning, cues and clock signals to set the tempo. As an electronic protocol, it is notable for its success, both in its widespread adoption throughout the industry, and in remaining essentially unchanged in the face of technological developments since its introduction in 1983. MIDI IN refers to these transmissions being inputted into a device, MIDI OUT refers to these transmission being outputted to a device and MIDI THRU refers to how a chain of these devices can be connected allowing both transmission to be accepted and passed on. The PCT Application No. PCT/US-07/12751 mentions a new generation of MIDI in which finger configuration for playing musical instruments as well as the exact key played by the musician in the form of a numeric value is proposed and will be integrated into this design of the V.R.C.P.S.

MIDI Files=MIDI messages (along with timing information) can be collected and stored in a computer file system, in what is commonly called a MIDI file, or more formally, a Standard MIDI File (SMF). An SMF consists of one header chunk and one or more track chunks. There exist three different SMF formats; the format of a given SMF is specified in its file header. A Format 0 file contains a single track and represents a single song performance. Format 1 may contain any number of tracks, enabling preservation of the sequencer track structure, and also represents a single song performance. Format 2 may have any number of tracks, each representing a separate song performance. Sequencers do not commonly support Format 2. As discussed earlier within PCT/US-07/12751 a new generation Midi File is mentioned in which new messages will be created in which one signal flow acknowledges a message coordination hand configuration to play musical instruments, while another signal flow acknowledges a message coordinating the exact key depressed by the user while playing along with exact time it has been depressed. This technology will be introduced into the V.R.C.P.

Morpheus=Two hands independent of each other with global approach all human audio range musical instruments including key, string, wind and percussion and permutations and combinations thereof.

Multi-Touch Multi-touch technology is a human-computer interaction technique and the hardware devices that implement it. Multi-touch consists of a touch screen or touch tablet (touch pad) that recognizes multiple simultaneous touch points and software to interpret simultaneous touches. This frequently includes the position and pressure or degree of each touch point independently, which allows gestures and interaction with multiple fingers or hands, similar to chording and can provide rich interaction, including direct manipulation through intuitive gestures. Depending largely on their size, some multi-touch devices support more than one user on the same device simultaneously. One salient aspect of this technique is that it makes easy to zoom in or out in a Zooming User Interface with two fingers, thereby providing a more direct mapping than with a single-point device like a mouse or stylus. Multi-touch has at least a 25 year history, beginning in 1982, with pioneering work being done at the University of Toronto (multi-touch tablets) and Bell Labs (multi-touch screens). Recently Microsoft have unveiled its new line of devices using this technology.

Musion Eyeliner=This is a unique high definition video projection system allowing freeform three dimensional pre-recorded moving images to appear within a live stage setting. For example the live pre-recorded stage performance of "Feels Good" by the pop band Gorillaz at the recent MTV Music Awards. Video projection systems are nothing new, in which a fundamental example is how movies are projected upon screens within a cinema. In cinemas this projection occurs upon a flat screen, which permits three dimensional images to appear within that flat screen. With Musion Eyeliner technology this pre-recorded projection is upon a screen which relays a holographic image within a three dimensional cube. This cube allows people to walk within it, as if they are among these three dimensional pre-recorded images. Unlike this technology, the authors application revolves around real-time performances by virtual musicians within interface 8 in synchronization with interface 10, mimicking in synch the exact movements of the user 28, using the fundamentals of the new generation music notation system. This virtual relationship between the user 28 and a virtual musician within interface 8 will allow unprecedented realism to the composers performance.

N.G.M.N.S.=This abbreviation references the design first proposed in earlier U.S. application Ser. No. 11/016,438 referred to as the New Generation Music Notation System. Originally proposed within a sheet music format for books, this formula has developed into an entire new language of music whether within analog or digital technology, with embodiment disclosed inside this new application with virtual reality elements.

Photosynth=Photosynth is a technology developed by Microsoft Live Labs in which it takes a number of digital photos of an environment and knits them together with a three dimensional experience of that space, that you can move through also as if you were in a three dimensional game. The theory is to take a series of digital photos and jigsaw puzzle them together into a three dimensional environment, which would inevitably lead to this technology being brought to the Internet. It allows incredible amounts of gigabyte data from lots of different types of cameras to be manipulated instantaneously in real-time without the disadvantages in limitations of memory and processor technology in standard consumer computers. This large infinite limitation of data allows users to examine or explore in microscopic detail, images and video. When harnessed for consumers it will also allow users to knit together their own photos and create environments out of spaces the user photographs oneself.

Platform=An area upon which all elements required to use the V.R.C.P. are accessible by the user 28.

Pulse of Music=In music, a pulse is a series of identical, yet distinct periodic short-duration stimuli perceived as points in time. A pulse that is regularly accented is a meter. The Meter is then the measurement of a musical line into measures of stressed and unstressed beats, indicated in conventional music notation by a symbol called a time signature. The meter is often combined with a rhythmic pattern to produce a particular style. This is true of dance music, such as the waltz or tango, which have particular patterns of emphasizing beats, which are instantly recognizable. This is often done to make the music coincide with slow or fast steps in the dance, and can be thought of as the musical equivalent of prosody in linguistics.

Real Instrument=This term refers to the musical instrument in its physical form rather than a digital representation of its fundamental frequencies, which makes up the actual sound of the instrument.

Score-Writer=A Score-Writer, or music notation program, is software used to automate the task of writing and engraving sheet music. A Score-Writer is to music notation what a word processor is to written text. All Score-Writers allow the user to input, edit and print music notation, to varying degrees of sophistication. They range from programs, which can write a simple song, to those that can handle the complexities of orchestral music, specialist notations, and high-quality music engraving. Within this application a new custom Score-Writer is proposed created within Package 204a. This custom writer displays a collection of thirty-six different notation system designs each referencing a specific musical instrument. All elements of all notation systems are fully editable and can be displayed upon interface 10 or outputted to external printers and saved in Adobe PDF format. Unlike conventional Score-Writers, which display conventional sheet music in digital form, this new custom Score-Writer will display the authors new generation music notation system.

Serial/Parallel=Electrical circuit components can be connected together in one of two ways: series or parallel. These two names describe the method of attaching the components that is one after the other or next to each other. If two or more circuit components are connected end to end like a daisy chain, it is said they are connected in series. A series circuit is a single path for a current through all of its components. If two or more circuit components are connected like the rungs of a ladder it is said they are connected in parallel. A parallel circuit is a different path for current through each of its components. A parallel circuit provides the same voltage across all its components.

Soundcard=This is a computer expansion card that facilitates the input and output of sound under the control of computer programs. Typical uses of sound cards include providing the audio component for multimedia applications such as music composition, editing video or audio, presentation/education, and entertainment (games). Many computers have sound capabilities built in, while others require these expansion cards if audio capability is desired.

Spatial Capacitive=Spatial Capacitive Technology by TouchKo is a projected field capacitive touch system. This intelligent technology recognizes movement as the projected energy field is penetrated. The control system discerns between a hand, arm or other object and a finger, with the intent to execute a touch response. As the finger remains stationary for a short period of time, a timer initiates. If the timer is allowed to wind completely down or the finger accelerates toward the display, a click is executed.

Synchronization=Synchronization is a problem in timekeeping which requires the coordination of events to operate a system in unison. The familiar conductor of an orchestra serves to keep the orchestra in time. Systems operating with all their parts in synchrony are said to be synchronous or in sync. Some systems may be only approximately synchronized, or plesiochronous. For some applications relative offsets between events need to be determined, for others only the order of the event is important. Time codes are often used as a means of synchronization in film, video, and audio applications.

THX=THX (Techsurround High eXpert) is the trade name of a high-fidelity sound reproduction system for movie theaters, screening rooms, home theaters, computer speakers, gaming consoles, and car audio systems. THX was developed by Tomlinson Holman at George Lucas's company Lucasfilm in 1982 to ensure that the soundtrack for the third Star Wars film, Return of the Jedi, would be accurately reproduced in the best venues.

Touch Sensitive=This is a term used to describe an application when a device can be activated by human touch rather than a flip, pushbutton, or other mechanical switch. It also refers to a term used in sound technology manipulation where sound devices and programs can apply specific frequencies to certain pressure points upon keys of a digital keyboard or synthesizer.

Tuning Software=Auto Tuner is an example of this technology in which a specific vocal track can be sampled into a computer program. The program then analyses all the pitches and frequencies of the vocal track, recognizes the key the music is in and then adjusts accordingly to the correct pitch it should be at. In other words making an awful vocalist into a magnificent singer, which dupes the consumer into thinking the artist has a good set of vocal chords, when in fact they do not.

Variant=This implies the altering of a sounds components whether it be the length of reverb time applied to a sound, the frequency of its waveform or other attributes. The variant is the change be it represented in plus, minus or other forms.

Vari-Dimensional=References the various environments that audio and visual technology is represented within realtime. Acoustically centers around surround sound technology, visually via two, three and four dimensional or more representations of a holographic or virtual reality.

Virtual Console=Can come in many forms, in the case disclosed revolves around a Virtual Recording Console in which a virtual representation of a recording consoles' functions are displayed upon an interface or computer monitor. The user then can adjust or selects these functions via controllers, such as the click of a mouse or other input controller.

Voice Recognition=Is the task of recognizing people from their voices. Such systems extract features from speech, model them and use them to recognize the person from his/her voice. Some systems can apply a general recognition frequency in which all voices will operate a specific application, while others can apply a specific voice to operate a specific application and only that specific voice will operate it.

V.R.C.P.=This abbreviation references the entire system design referred to as the Virtual Reality Composer Platform. It is a one stop virtual reality recording console and display device that integrates various controllers and other devices to achieve various goals within these environments XLR Connector=The XLR connector is an electrical connector design. XLR plugs and sockets are used mostly in professional audio and video electronics cabling applications.

The reader can now readily see how the above detailed description results in the following benefits of the invention over the prior art.

a) User Friendly self teaching of any musical instrument b) Suitable for people of all ages and gender in all types of situations.

c) Multiple uses in a wide range of situations and circumstances.

d) Easily adaptable for other uses.

e) Intuitive new generation music notation system

While this invention has been described with reference to illustrative embodiments, this description is not intended to be construed in a limiting sense. Various modifications and combinations of the illustrative embodiments as well as other embodiments of the invention will be apparent to a person of average skill in the art upon reference to this description. It is therefore contemplated that the appended claim(s) cover any such modifications, embodiments as fall within the true scope of this invention.

The inventor claims:

1. An integrated interactive electronic virtual reality multimedia recording and learning platform and system adapted for a top down butterfly morpheus music notation comprising:
   a) a central processing unit complete with plurality of input means, output means and a variety of memory means;
   b) a butterfly morpheus musical instrument with plurality of manual input means each with a first unique visible indicia interfaced to said central processing unit;
   c) a plurality of finger adapters each with a second unique visible indicia donned on respective fingers;
   d) a first custom butterfly morpheus music notation computer interface comprising a plurality of bars, staves, scales, keys chords, arpeggios, notes frequencies customized to said music instrument and said finger adapters;

e) a second custom butterfly morpheus music notation computer interface comprising a plurality of virtual characters assigned to specific positional coordinates, virtual musical instruments representations vertical/horizontal scroll bars and a virtual command screen display;

f) a custom graphics tablet connected to said computer with plurality of input means, output means and a variety of memory means;

g) a custom Digital Stylus interfaced between said plurality of input means and said central processing unit;

h) a custom set of external controllers for controlling and executing said input and output of commands requested by the user utilizing a new generation music notation system, routed through said central processing unit;

i) a custom playback means with plurality of input and output means interfaced to said CPU of said system;

j) a custom color designation means applied upon said first unique visible indicia to indicate eight specific note value lengths; and k) a custom midi interactive program operable in said central processing unit to display program messages and specific notes utilizing said first visible indicia, specific hand configurations utilizing said second visible indicia and specific note value lengths utilizing said eight specific colors.

2. The integrated interactive electronic virtual reality multimedia recording and learning environment adapted for a top down butterfly morpheus music notation system of claim 1, wherein said musical instrument is a new generation synthesizer which comprises a set of one hundred and seventy six keys with visible first indicia, sound manipulation controllers and software means.

3. The integrated interactive electronic virtual reality multimedia recording and learning environment adapted for a top down butterfly morpheus music notation system of claim 2 wherein said software means indicates to a user the exact notes to play using embossed keys.

4. The integrated interactive electronic virtual reality multimedia recording and learning environment adapted for a top down butterfly morpheus music notation system of claim 2 wherein said software means indicates to a user the exact notes to play utilizing light emitting diodes as a display means.

5. The integrated interactive electronic virtual reality multimedia recording and learning environment adapted for a top down butterfly morpheus music notation system of claim 1, wherein
a) said finger adapters are a glove readily don-able upon the hand of a user which comprises output signals, indicating exact hand co-ordination to said user in the playing of said musical instrument using said second unique visible indicia;
b) said computer interface displays said new generation music notation system design using visible said first indicia, said second indicia and also musical symbols and characters of conventional music notation, which includes musical styles, tempo/speed, music dynamics and moods of music;
c) said computer interface displays using positional coordinates a selection of said virtual musicians, which perform musical compositions as delineated via controllers by said user using said input and output means;
d) said Graphics Tablet integrates with said central processing unit in the input and output of said characters of music and selection of said menu options within said control center; and e) said Digital Stylus is an input device of which integrates with duplicating the options of a conventional mouse controller, permitting said menu options within said control canter to be selected or input by the user.

6. The integrated interactive electronic virtual reality multimedia recording and learning environment adapted for a top down butterfly morpheus music notation system of claim 1, wherein said finger adapters are silicone finger rings.

7. The integrated interactive electronic virtual reality multimedia recording and learning environment adapted for a top down butterfly morpheus music notation system of claim 1, wherein said input output means comprise at least one selected from group comprising:
a) an optical microphone;
b) an optical mouse and controller;
c) at least one foot pedal; and
d) a graphics tablet.

8. The integrated interactive electronic virtual reality multimedia recording and learning environment adapted for a top down butterfly morpheus music notation system of claim 1, wherein said playback means includes a touch sensitive electronic mechanism that integrates with said central processing unit.

9. The integrated interactive electronic virtual reality multimedia recording and learning environment adapted for a top down butterfly morpheus music notation system of claim 1, wherein:
a) said music instrument is an electronic synthesizer;
b) said input means comprises keys;
c) said first visible indicia is numeric;
d) said plurality of fingers are ten;
e) said second visible indicia are alpha; and
f) said color designation formula contain the colors Blue, Brown, Black, Red, Orange, Green, Purple and Pink.

10. The integrated interactive electronic virtual reality multimedia recording and learning environment adapted for a top down butterfly morpheus music notation system of claim 9 wherein
a) said keys are 1 thru 88; and
b) said first visible indicia comprises 1 thru 88 consecutively numbered from left to right and a second set of first visible indicia comprises 1 thru 88 consecutively numbered from left to right said second unique visible indicia comprise A thru J.

11. The integrated interactive electronic virtual reality multimedia recording and learning environment adapted for a top down butterfly morpheus music notation system of claim 9 wherein
a) said keys are 1 thru 176; and
c) said visible indicia comprises 1 thru 176, consecutively numbered from left to right.

12. The integrated interactive electronic virtual reality multimedia recording and learning environment adapted for a top down butterfly morpheus music notation system of claim 10, wherein said second visible indicia on said fingers are:
a) 'A' on left hand little pinkie finger;
b) 'B' on left hand ring finger;
c) 'C' on left hand middle finger;
d) 'D' on left hand index finger;
e) 'E' on left hand thumb;
f) 'F' on right hand thumb;
g) 'G' on right hand index finger;
h) 'H' on right hand middle finger;
i) 'I' on right hand ring finger; and
j) 'J' on right hand little pinkie finger.

13. The integrated interactive electronic virtual reality multimedia recording and learning environment adapted for a top down butterfly morpheus music notation system of claim 1, wherein said music instrument is a keyed instrument selected from group consisting of pianos, keyboards, organs, harpsichords, clavichords, pianofortes, pipe organs and synthesizers.

14. The integrated interactive electronic virtual reality multimedia recording and learning environment adapted for a top down butterfly morpheus music notation system of claim 1, wherein said music instrument is a musical instrument selected from group consisting of dulcimers, vibraphones, xylophones and cimbaloms.

15. The integrated interactive electronic virtual reality multimedia recording and learning environment adapted for a top down butterfly morpheus music notation system of claim 1, wherein said music instrument is an accordion.

16. The integrated interactive electronic virtual reality multimedia recording and learning environment adapted for a top down butterfly morpheus music notation system of claim 15 wherein said accordion is a button accordion.

17. The integrated interactive electronic virtual reality multimedia recording and learning environment adapted for a top down butterfly morpheus music notation system of claim 15 wherein said accordion is a piano accordion.

18. The integrated interactive electronic virtual reality multimedia recording and learning environment adapted for a top down butterfly morpheus music notation system of claim 1, wherein said music instrument a string instrument selected from group consisting of guitars, mandolins, banjos and sitars.

19. The integrated interactive electronic virtual reality multimedia recording and learning environment adapted for a top down butterfly morpheus music notation system of claim 1, wherein said music instrument is a string plucked instrument.

20. The integrated interactive electronic virtual reality multimedia recording and learning environment adapted for a top down butterfly morpheus music notation system of claim 19, wherein said string plucked instrument is a harp.

21. The integrated interactive electronic virtual reality multimedia recording and learning environment adapted for a top down butterfly morpheus music notation system of claim 1, wherein said music instrument is one selected from group consisting of consisting of recorders, flutes, tin whistles and piccolos.

22. The integrated interactive electronic virtual reality multimedia recording and learning environment adapted for a top down butterfly morpheus music notation system of claim 1, wherein said music instrument selected group consisting of clarinets, bassoons, bagpipes, saxophones, trumpets, French horns, trombones, baritone horns, oboes, and tubas.

23. The integrated interactive electronic virtual reality multimedia recording and learning environment adapted for a top down butterfly morpheus music notation system of claim 1, wherein said music instrument a percussion instrument.

24. The integrated interactive electronic virtual reality multimedia recording and learning environment adapted for a top down butterfly morpheus music notation system of claim 23, wherein said percussion instrument is a standard non-artificial drum kit.

25. The integrated interactive electronic virtual reality multimedia recording and learning environment adapted for a top down butterfly morpheus music notation system of claim 23, wherein said percussion instrument is an artificial drum kit.

26. The integrated interactive electronic virtual reality multimedia recording and learning environment adapted for a top down butterfly morpheus music notation system of claim 1 wherein a plurality of virtual characters are directed and manipulated in real-time within a virtual reality environment, utilizing said first unique visible indicia indicating specific notes upon its virtual musical instrument and said second unique visible indicia for its specific virtual hand coordination.

27. The integrated interactive electronic virtual reality multimedia recording and learning environment adapted for a top down butterfly morpheus music notation system of claim 26 wherein these said plurality of virtual characters are directed and manipulated in real-time within a virtual reality environment via a plurality of said controllers using said input and output means.

28. The integrated interactive electronic virtual reality multimedia recording and learning environment adapted for a top down butterfly morpheus music notation system of claim 1 wherein a custom said color designation means applied upon said first unique visible indicia indicates the eight specific note value lengths of music.

29. The integrated interactive electronic virtual reality multimedia recording and learning environment adapted for a top down butterfly morpheus music notation system of claim 1 wherein said color designation formula comprises blue, brown, black, red, orange, green, purple and pink.

30. The integrated interactive electronic virtual reality multimedia recording and learning environment adapted for a top down butterfly morpheus music notation system of claim 29 wherein said colors represent the conventional note values of Semibreve, Minim, Crotchet, Quaver, Semiquaver, Demisemiquaver, Hemidemisemiquaver, Semihemidemisemiquaver respectively.

31. The integrated interactive electronic virtual reality multimedia recording and learning environment adapted for a top down butterfly morpheus music notation system of claim 1 wherein said midi interactive formula creates specific unique midi program input and output messages which utilize said color designation formula indicating note values, said first unique alphanumeric visible indicia indicating specific notes upon said selected group of musical instruments and said second unique visible indicia indicating hand coordination.

32. The integrated interactive electronic virtual reality multimedia recording and learning environment adapted for a top down butterfly morpheus music notation system of claim 29 wherein;
   a) said colors are Blue, Brown, Black, Red, Orange, Green, Purple and Pink;
   g) said note values are Semibreve, Minim, Crotchet, Quaver, Semiquaver, Demisemiquaver, Hemidemisemiquaver, Semihemidemisemiquaver;
   h) said first visible indicia is numeric;
   i) said plurality of fingers are ten; and
   j) said second visible indicia are alpha.

33. The integrated interactive electronic virtual reality multimedia recording and learning environment adapted for a top down butterfly morpheus music notation system of claim 29 wherein said Graphics Tablet displays specific input and output means utilizing said Digital Stylus by way of said color designation formula indicating note values, said first unique alphanumeric visible indicia indicating specific notes upon said selected group of musical instruments and said second unique visible indicia indicating hand coordination.

\* \* \* \* \*